(12) United States Patent
Hoshino et al.

(10) Patent No.: US 10,987,652 B2
(45) Date of Patent: Apr. 27, 2021

(54) GAS ABSORPTION MATERIAL, USE OF SAME FOR GAS ABSORPTION, GAS ABSORPTION BODY, GAS ABSORPTION METHOD, ACIDIC GAS ABSORPTION DEVICE, ACIDIC GAS RECOVERY DEVICE, WATER VAPOR ABSORPTION DEVICE, WATER VAPOR RECOVERY DEVICE, HEAT EXCHANGER, AND HEAT RECOVERY DEVICE

(71) Applicant: KYUSHU UNIVERSITY, NATIONAL UNIVERSITY CORPORATION, Fukuoka (JP)

(72) Inventors: Yu Hoshino, Fukuoka (JP); Yoshiko Miura, Fukuoka (JP); Yukinori Ohshiro, Fukuoka (JP)

(73) Assignee: KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 683 days.

(21) Appl. No.: 15/504,110

(22) PCT Filed: Aug. 14, 2015

(86) PCT No.: PCT/JP2015/072954
§ 371 (c)(1),
(2) Date: Feb. 15, 2017

(87) PCT Pub. No.: WO2016/024633
PCT Pub. Date: Feb. 18, 2016

(65) Prior Publication Data
US 2017/0259245 A1    Sep. 14, 2017

(30) Foreign Application Priority Data
Aug. 15, 2014   (JP) .............................. JP2014-165452

(51) Int. Cl.
| | | |
|---|---|---|
| *B01J 20/26* | (2006.01) | |
| *F28F 13/18* | (2006.01) | |
| *B01J 20/28* | (2006.01) | |
| *B01J 20/32* | (2006.01) | |
| *B01D 53/52* | (2006.01) | |
| *B01D 53/62* | (2006.01) | |
| *B01D 53/81* | (2006.01) | |
| *B01D 53/96* | (2006.01) | |

(52) U.S. Cl.
CPC .......... *B01J 20/261* (2013.01); *B01D 53/526* (2013.01); *B01D 53/62* (2013.01); *B01D 53/81* (2013.01); *B01J 20/26* (2013.01); *B01J 20/28028* (2013.01); *B01J 20/28035* (2013.01); *B01J 20/28047* (2013.01); *B01J 20/327* (2013.01); *F28F 13/18* (2013.01); *F28F 13/185* (2013.01); *B01D 53/96* (2013.01); *B01D 2253/202* (2013.01); *B01D 2253/25* (2013.01); *B01D 2257/504* (2013.01)

(58) Field of Classification Search
CPC .... B01J 20/26; B01J 20/261; B01J 20/28028; B01J 20/28035; B01J 20/28047; B01D 53/526; B01D 53/62; B01D 53/81; F28F 13/18; F28F 13/185
USPC ....................................................... 423/228
See application file for complete search history.

(56) References Cited

U.S. PATENT DOCUMENTS

| | | | |
|---|---|---|---|
| 7,740,689 B2 * | 6/2010 | Fradette ............. | B01D 53/1475 252/184 |
| 2011/0059845 A1 * | 3/2011 | Fryxell .................. | B01D 53/02 502/402 |
| 2013/0213229 A1 | 8/2013 | Shahin et al. | |

FOREIGN PATENT DOCUMENTS

| | | |
|---|---|---|
| EP | 0163404 A2 | 4/1985 |
| EP | 1832341 A1 | 12/2007 |
| JP | 1986167919 U | 10/1986 |
| JP | 2010155753 A | 7/2010 |
| JP | 2012030222 A | 2/2012 |
| JP | 2012-179584 A | 9/2012 |
| JP | 2013013854 A | 1/2013 |
| JP | 2013501608 A | 1/2013 |
| WO | 2011018479 A1 | 2/2011 |
| WO | 2012158911 A2 | 11/2012 |
| WO | 2013027668 A1 | 2/2013 |

OTHER PUBLICATIONS

International Preliminary Report on Patentability of Chapter II, i.e., International Search Opinion which we received from the WIPO as the International Bureau of the PCT. Corresponding to application No. PCT/JP2015/072954 dated Feb. 16, 2017.
International Search Report and Search Opinion in corresponding application No. PCT/JP2015/072954 dated Nov. 17, 2015.
Hoshino et al "Reversible Absorption of CO2 Triggered by Phase Transition of Amine-Containing Micro- and Nanogel Particles" Journal of the American Chemical Society, 134, 10.23 : 18177-18180 (2012).

(Continued)

*Primary Examiner* — Edward M Johnson
(74) *Attorney, Agent, or Firm* — Browdy and Neimark, PLLC

(57) ABSTRACT

A gel particle film of amino group-having polymer compound particles has a large acid gas absorption amount and desorption amount per unit volume, and has a high acid gas absorption rate and desorption rate per unit mass, and further has high stability. A gas absorber having the gel particle film supported on a carrier is useful as an acid gas separation material having good energy efficiency.

31 Claims, 23 Drawing Sheets

(56) References Cited

OTHER PUBLICATIONS

Yue et al "Temperature-Responsive Microgel Films as Reversible Carbon Dioxide Absorbents in Wet Environment" Angewandte. Chem. Intl Ed., 53, 2654—, (2014).
Extended European Search Report for corresponding European Application No. 15831682.8, dated Mar. 19, 2018.
Office Action dated Jun. 9, 2020 issued in the corresponding Japanese patent application No. 2016-542612 with its English Machine Translation.

\* cited by examiner

[FIG. 1]
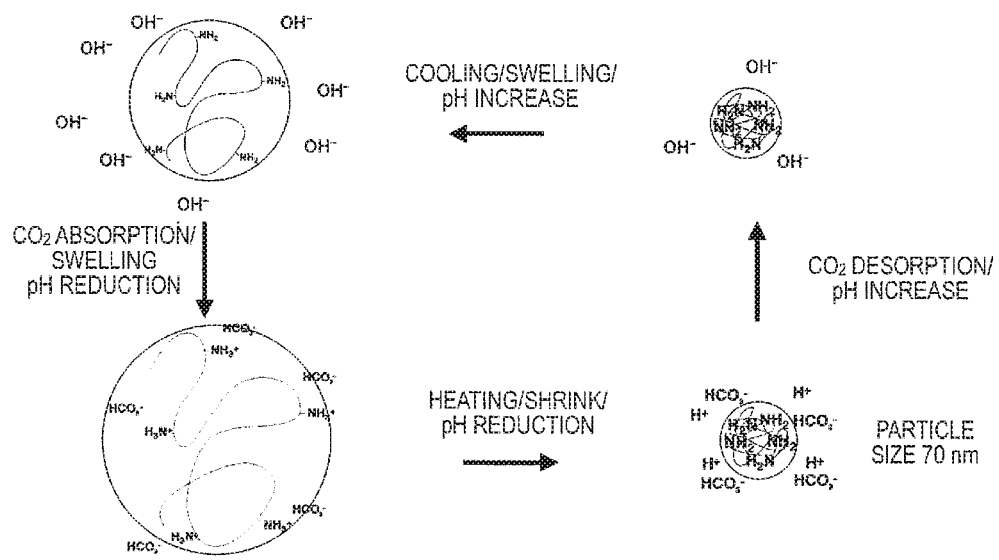
[FIG. 2]
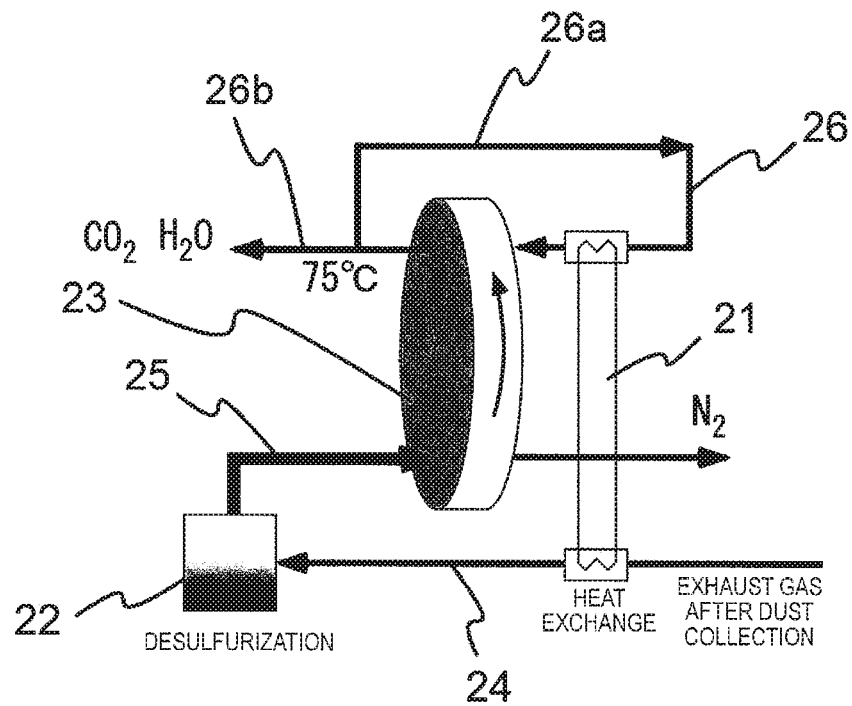

[FIG. 3]
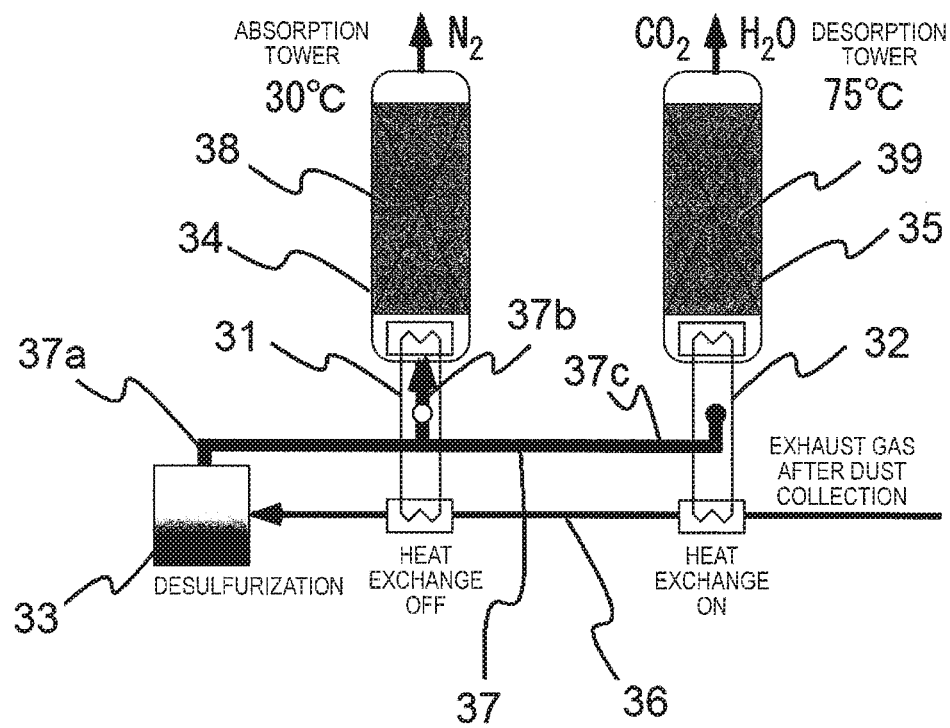
[FIG. 4]
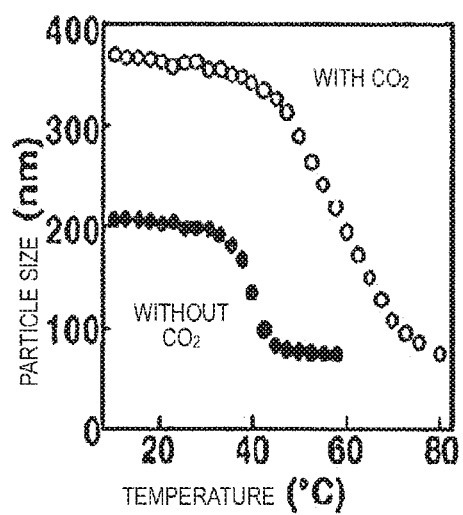

[FIG. 5]
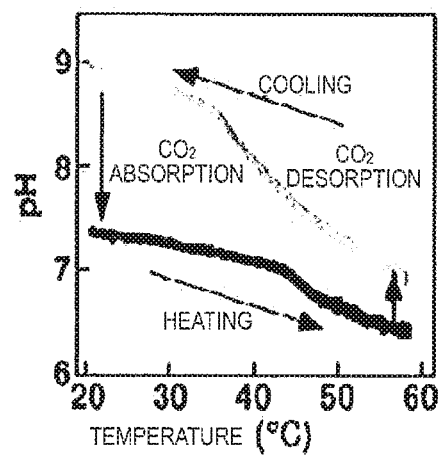
[FIG. 6]
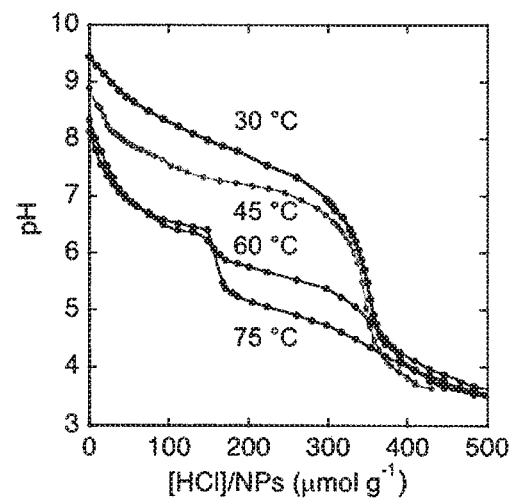
[FIG. 7]
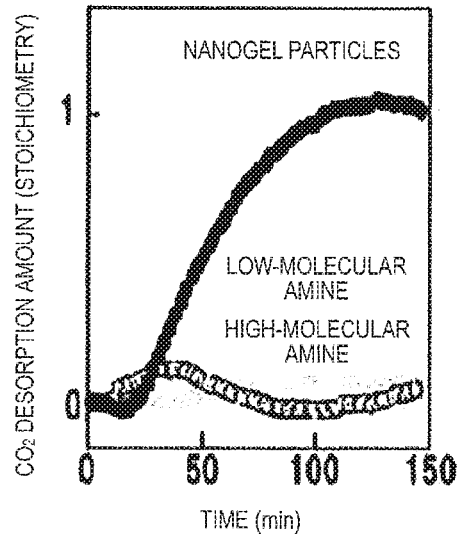

[FIG. 8]
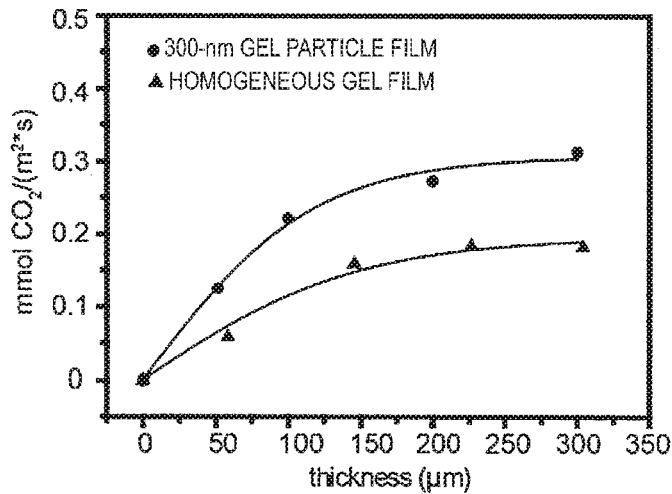
[FIG. 9]
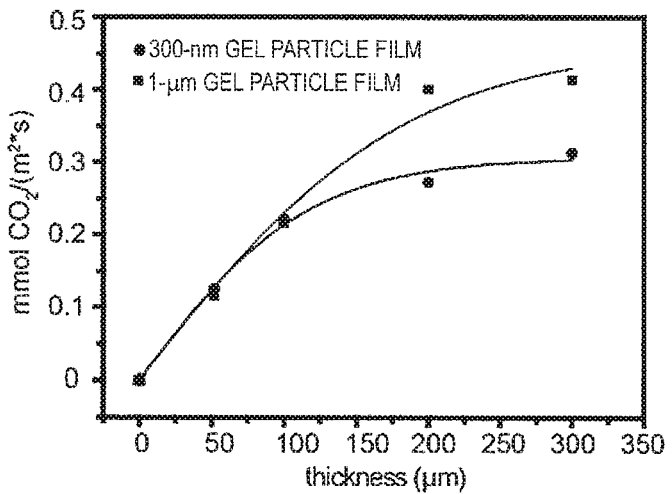
[FIG. 10]
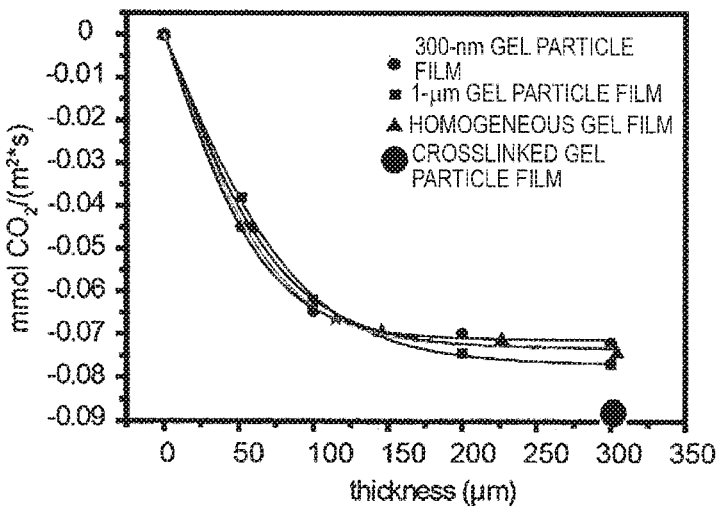

[FIG. 11]
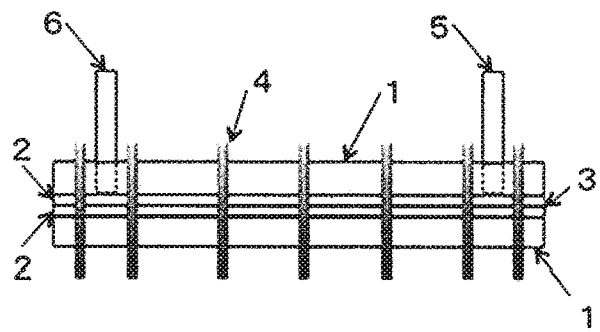
[FIG. 12]
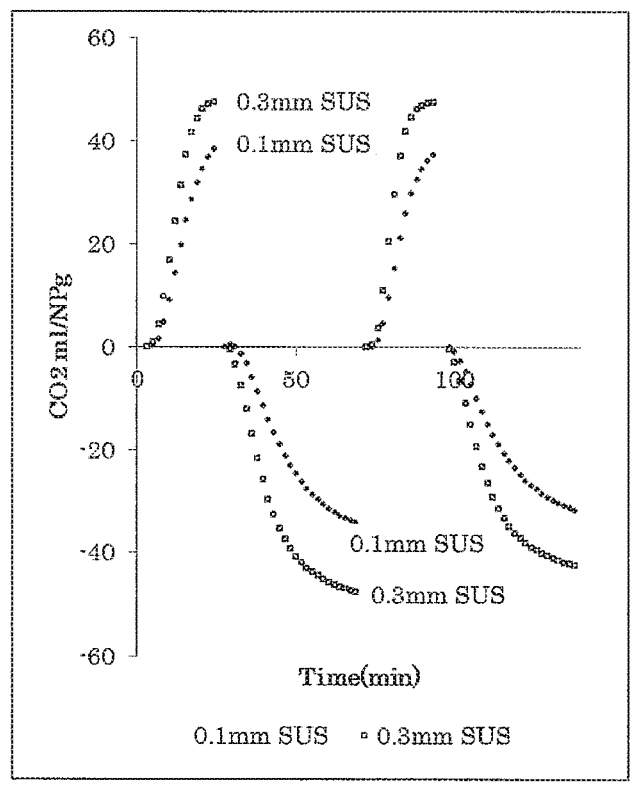

[FIG. 13]
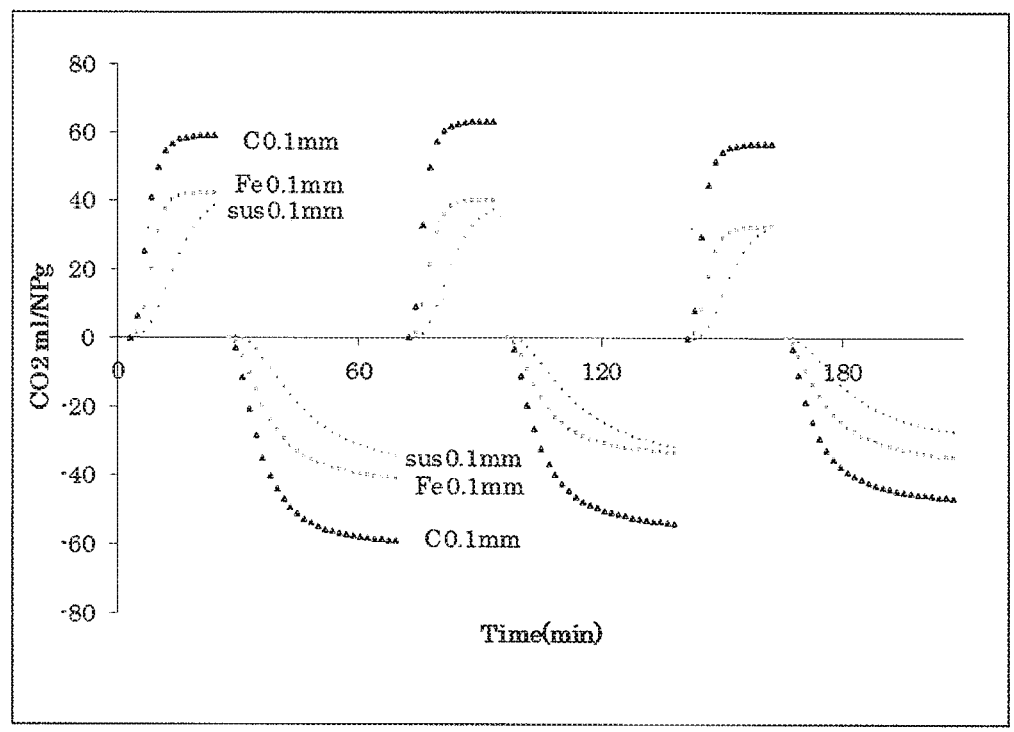
[FIG. 14]
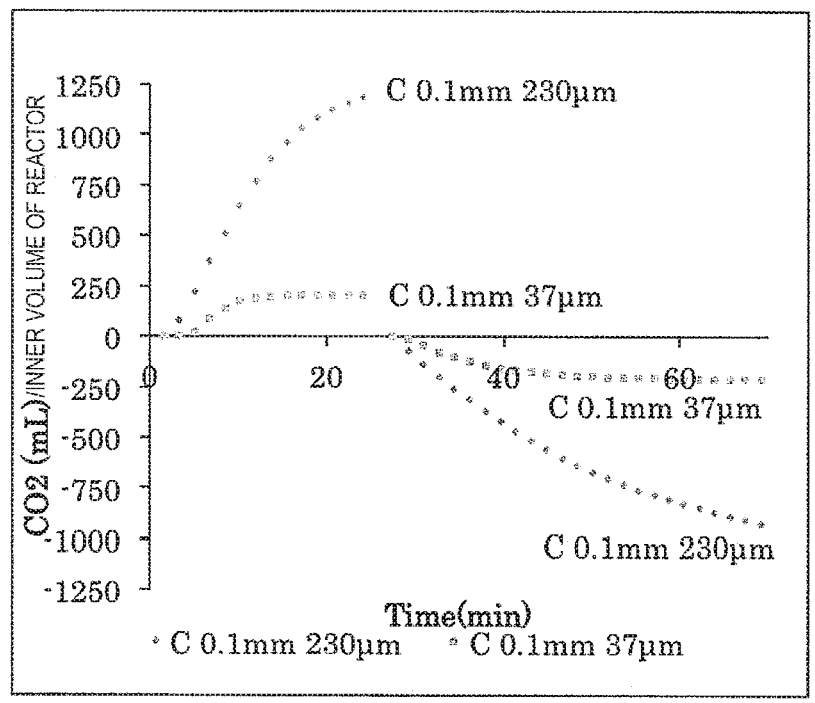

[FIG. 15]
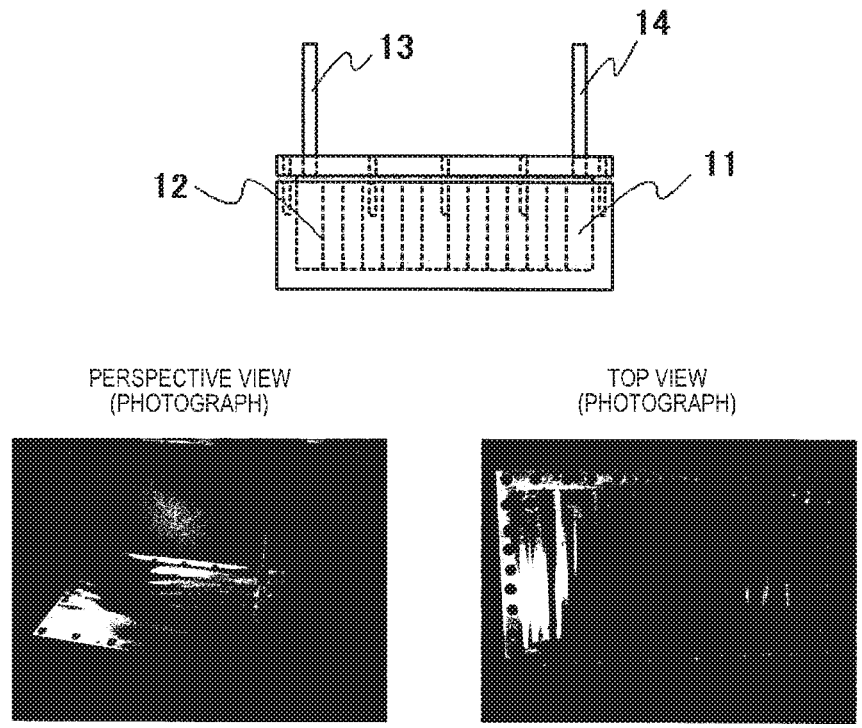
[FIG. 16]
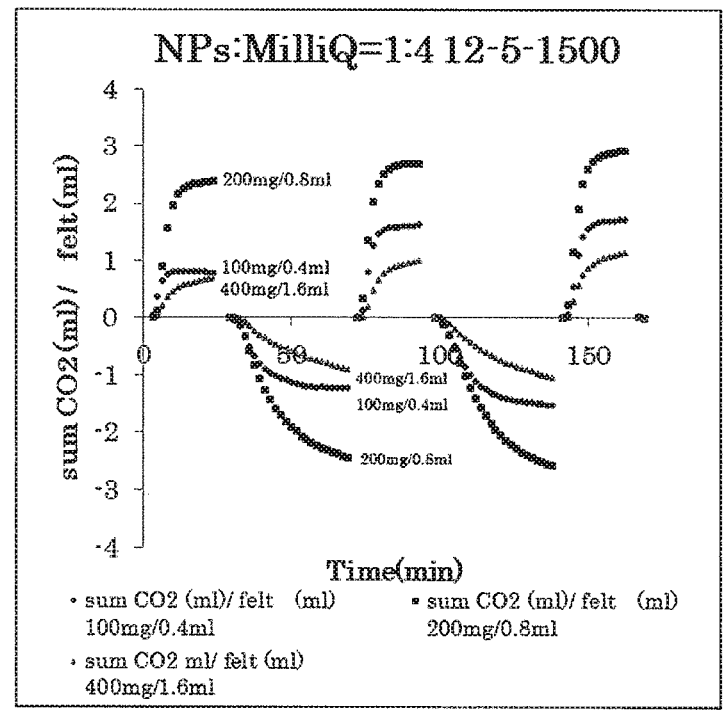

[FIG. 17]
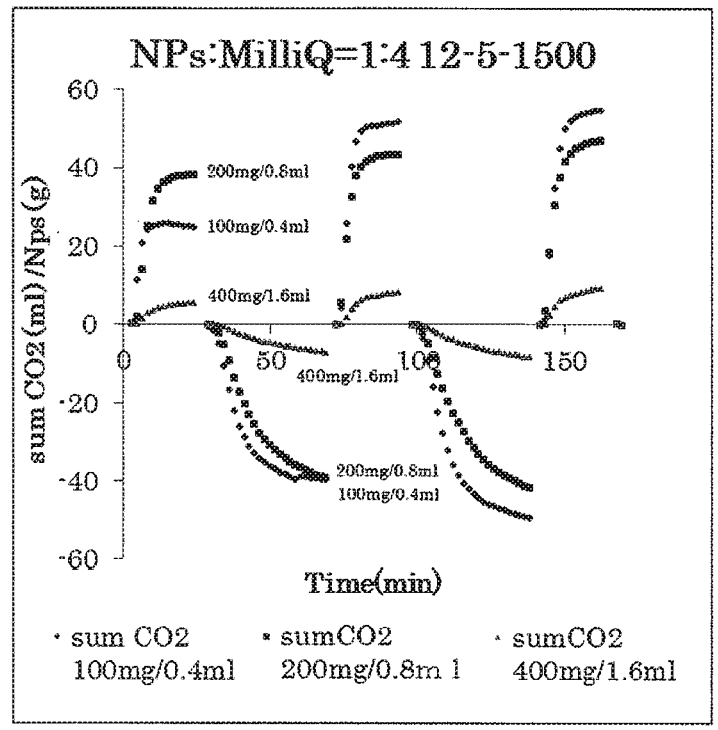
[FIG. 18]
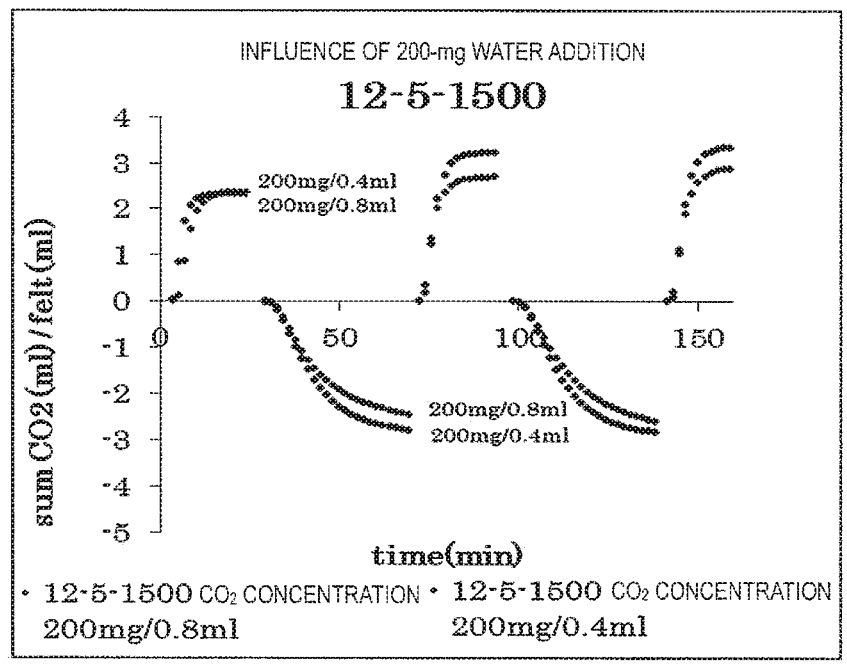

[FIG. 19]
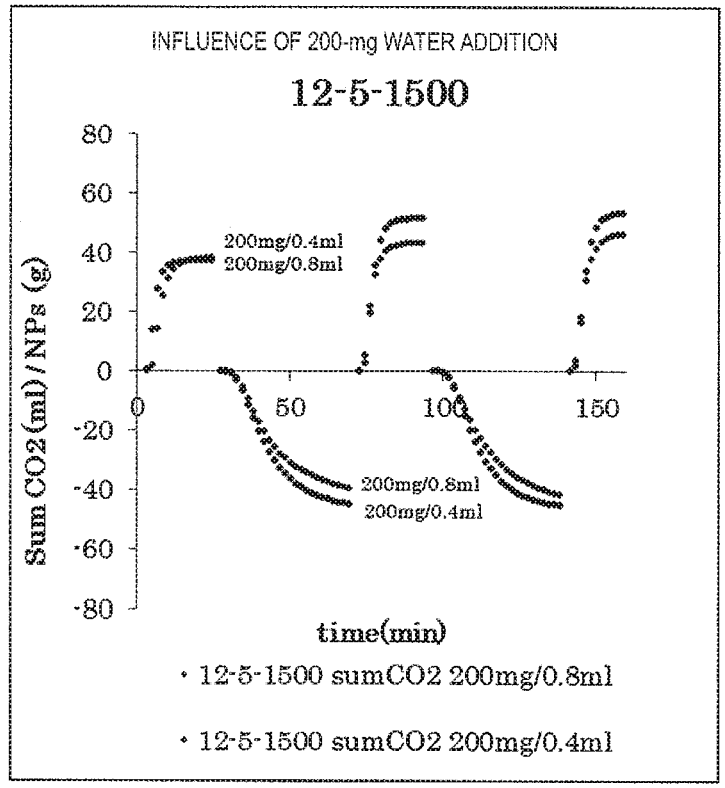
[FIG. 20]
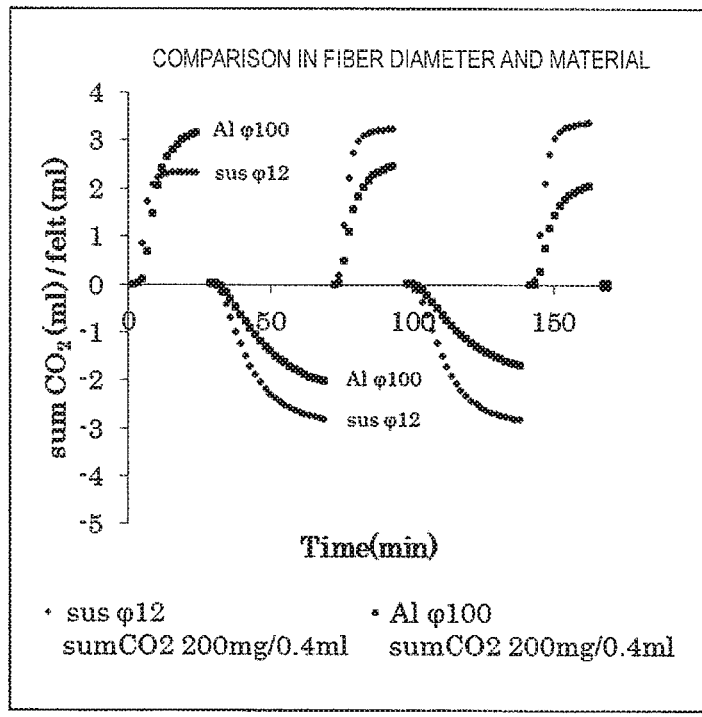

[FIG. 21]
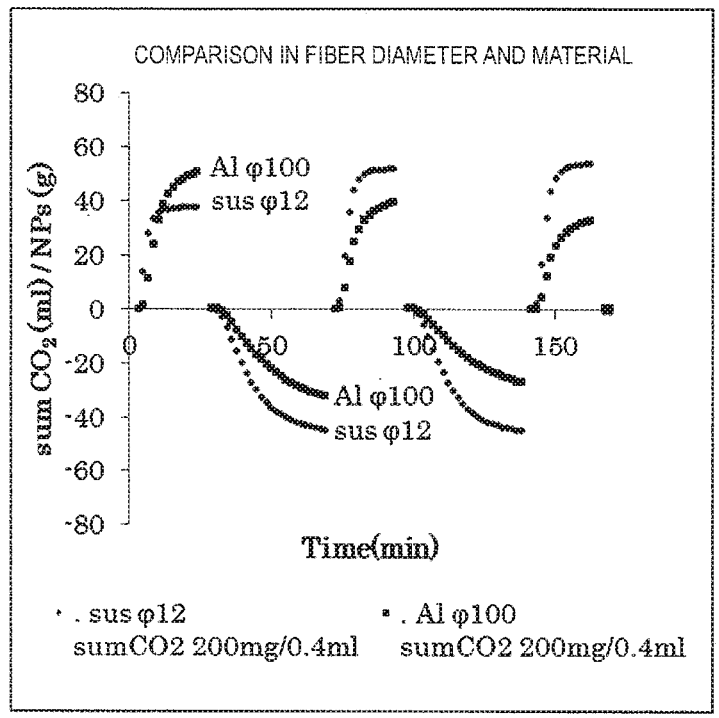
[FIG. 22]
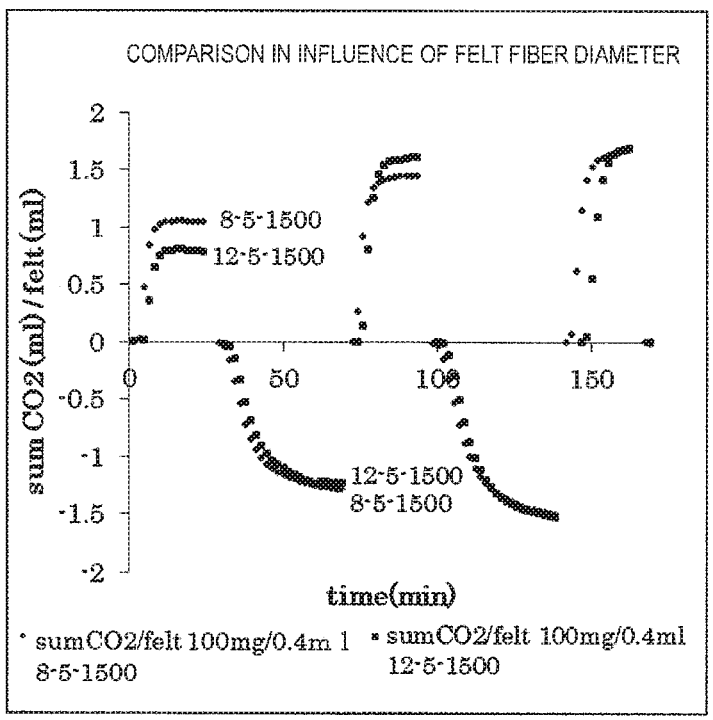

[FIG. 23]
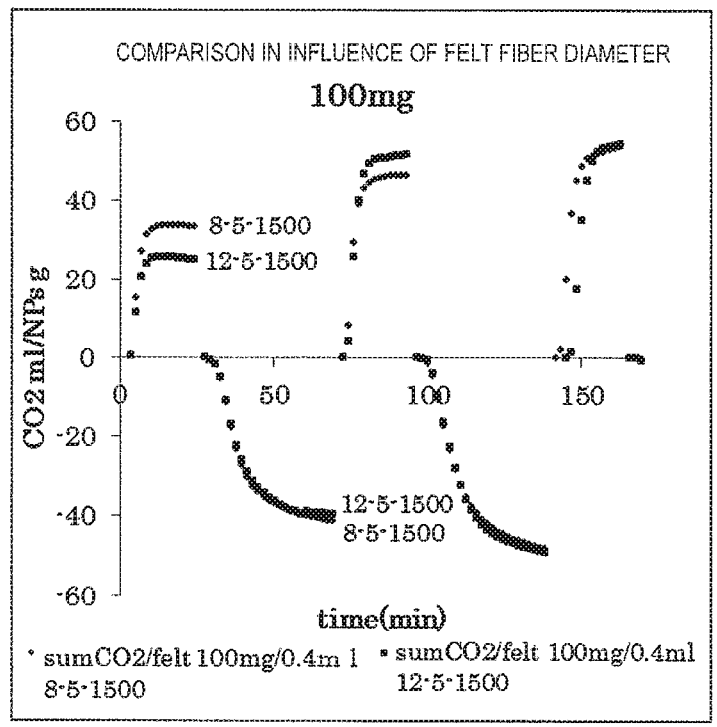
[FIG. 24]
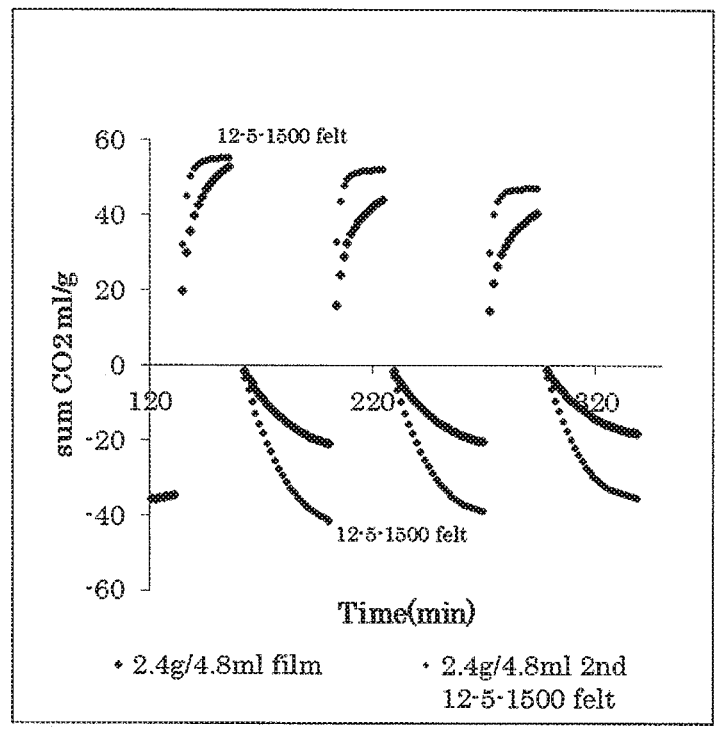

[FIG. 25]
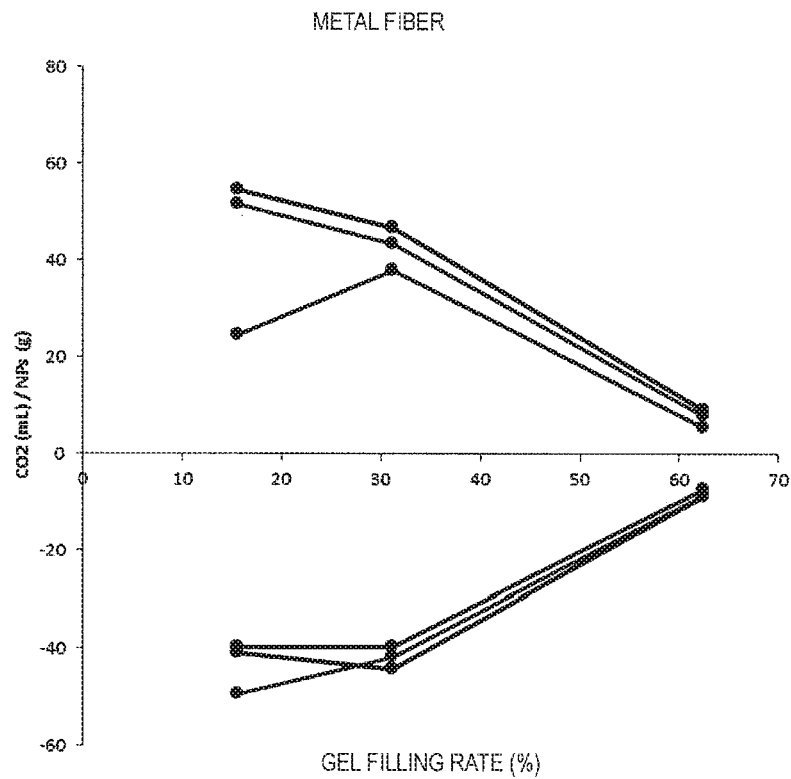
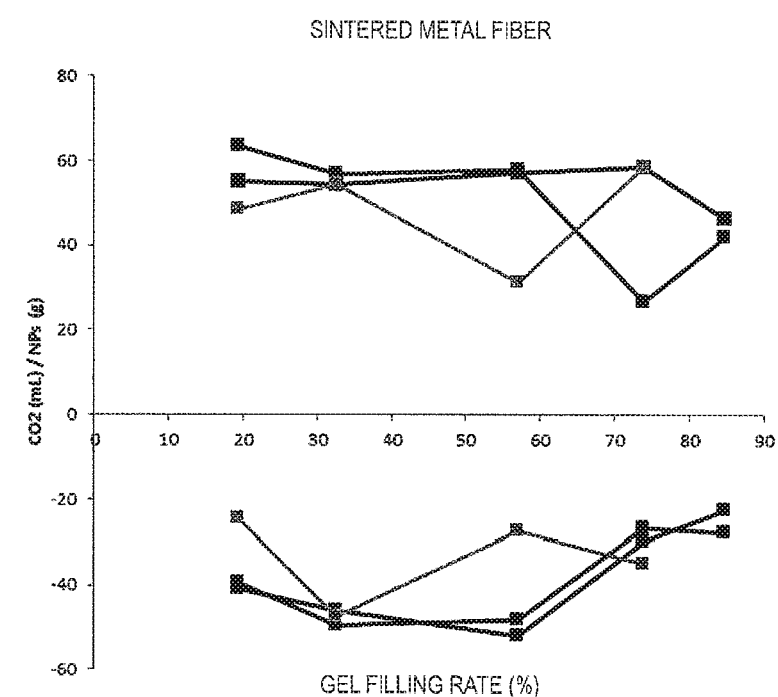

[FIG. 26]
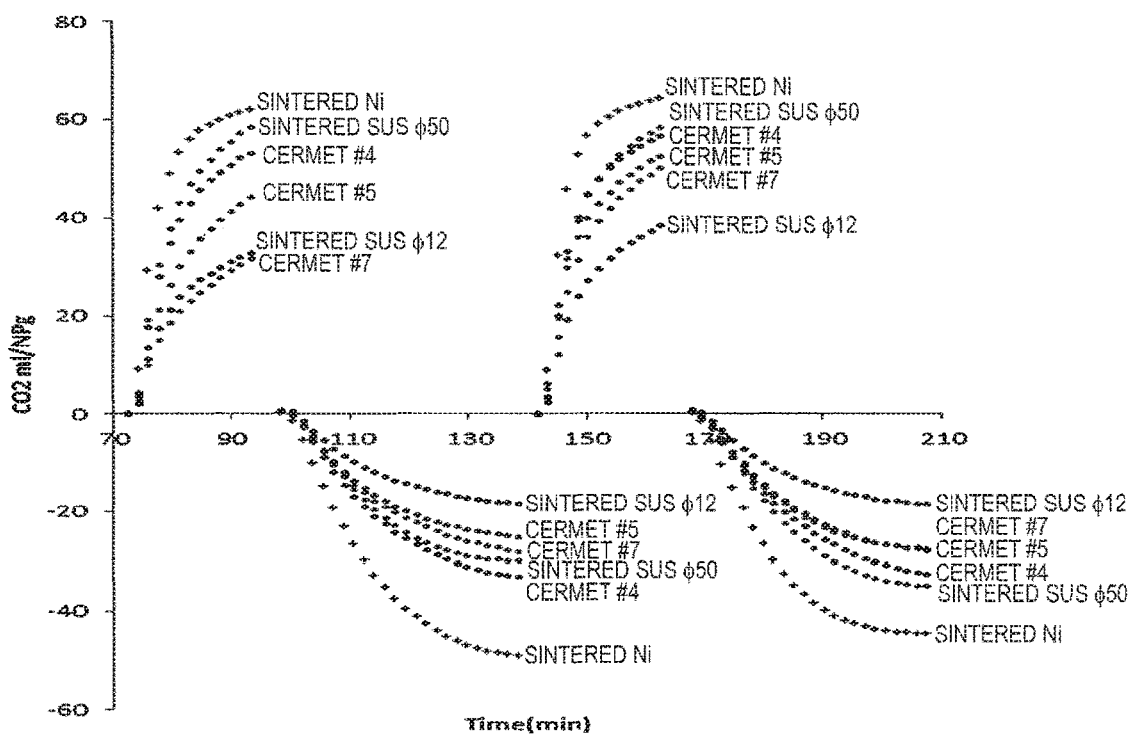
[FIG. 27]
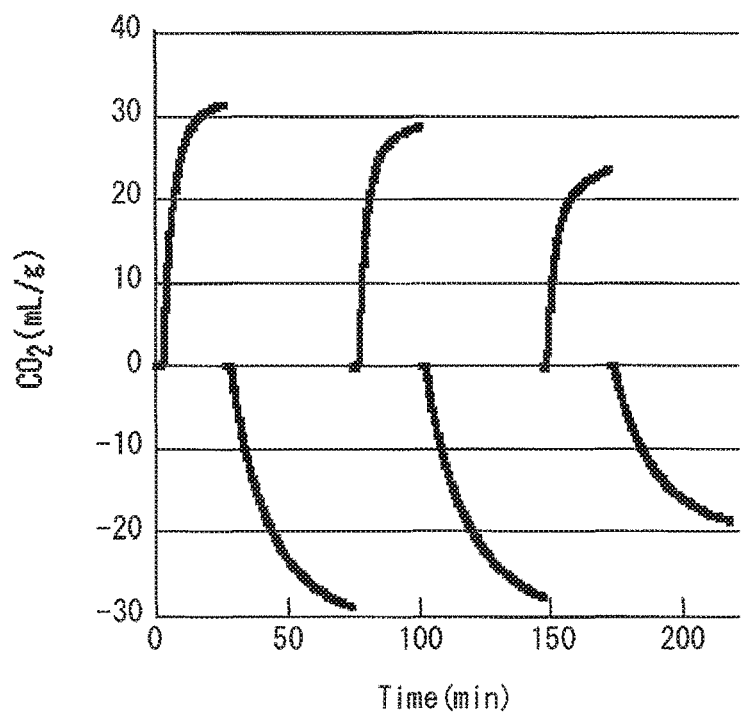

[FIG. 28]
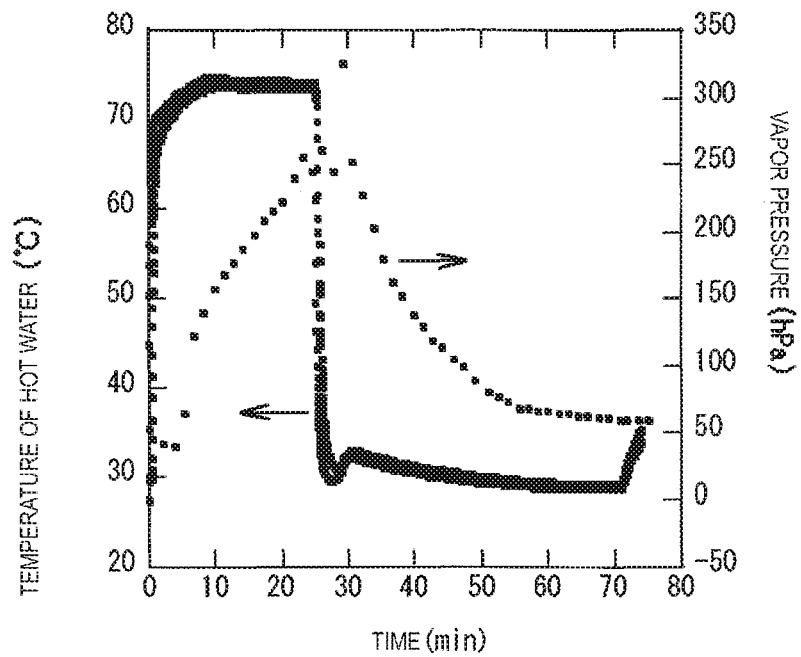
[FIG. 29]
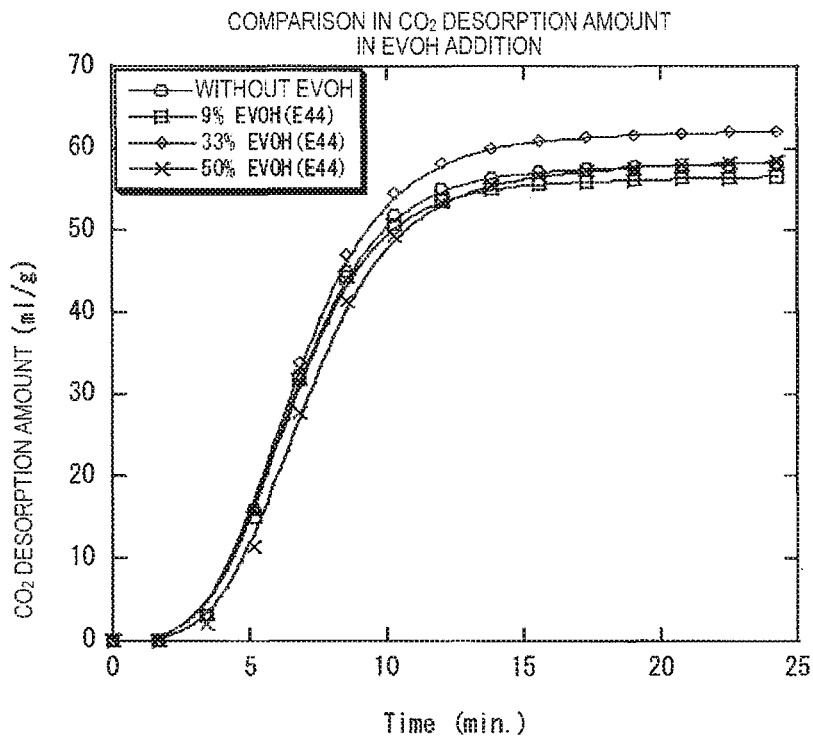

[FIG. 30]
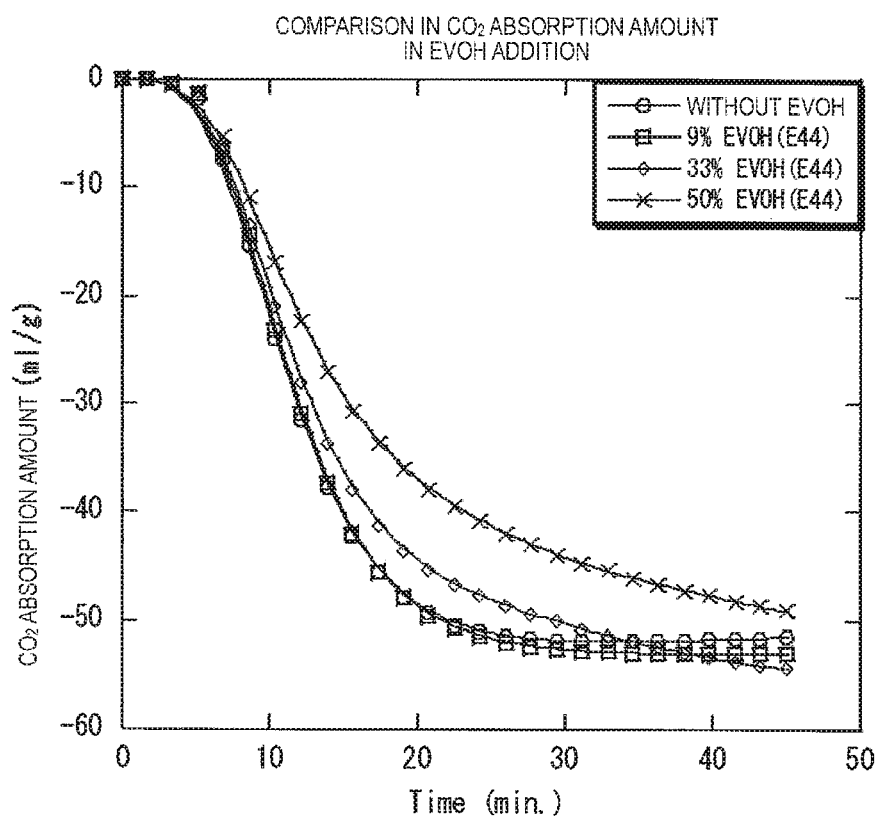

[FIG. 31]
(A)
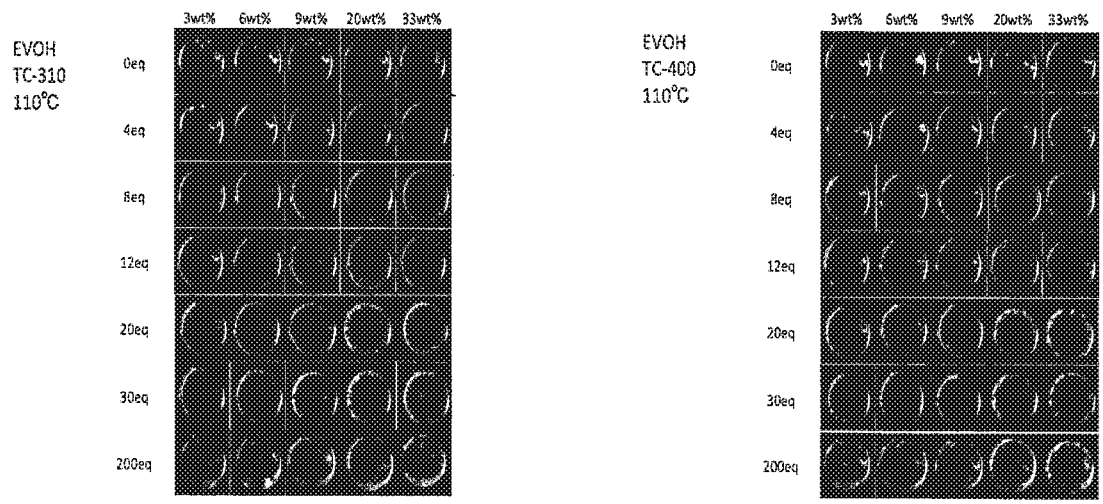
(B)
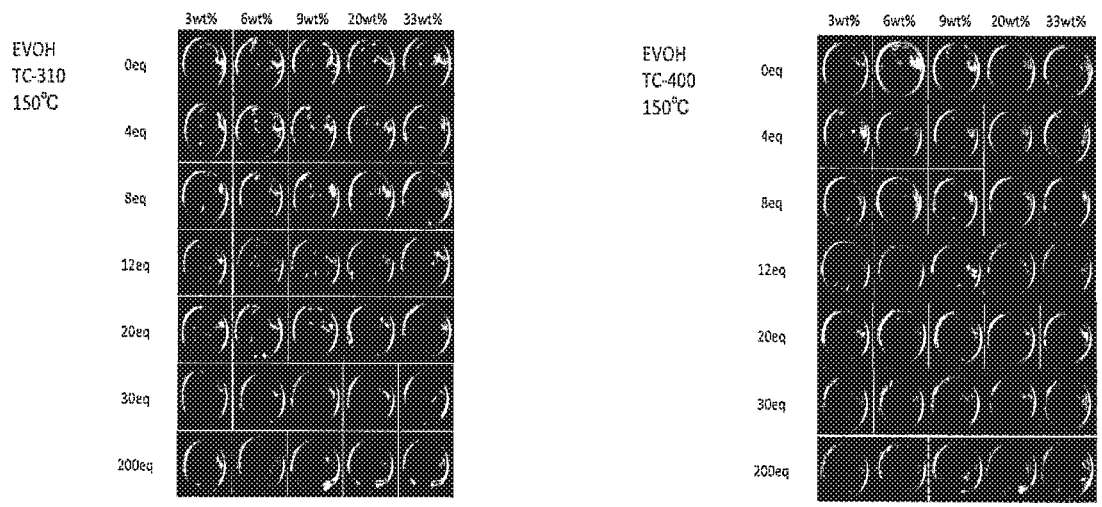
(C)
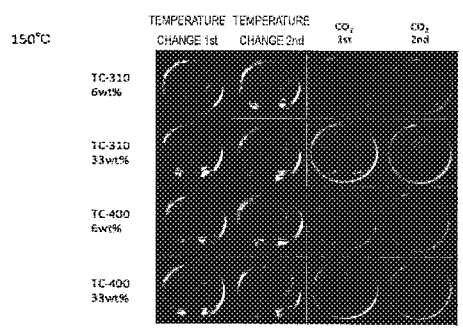

[FIG. 32]
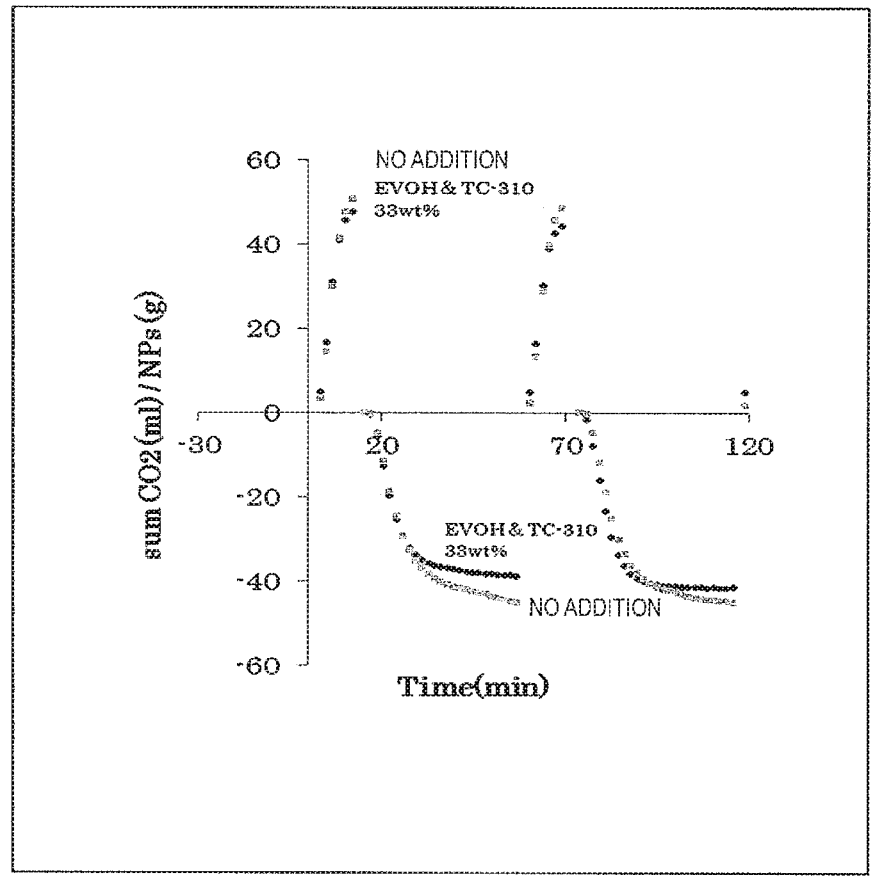
[FIG. 33]
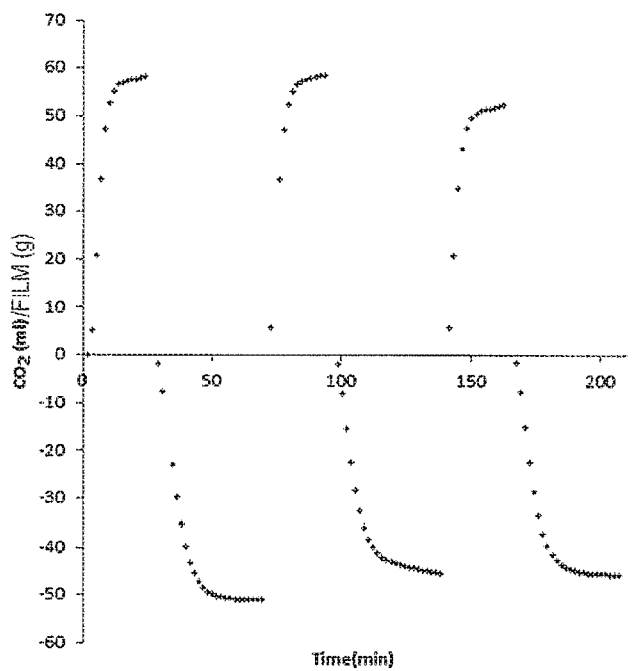

[FIG. 34]
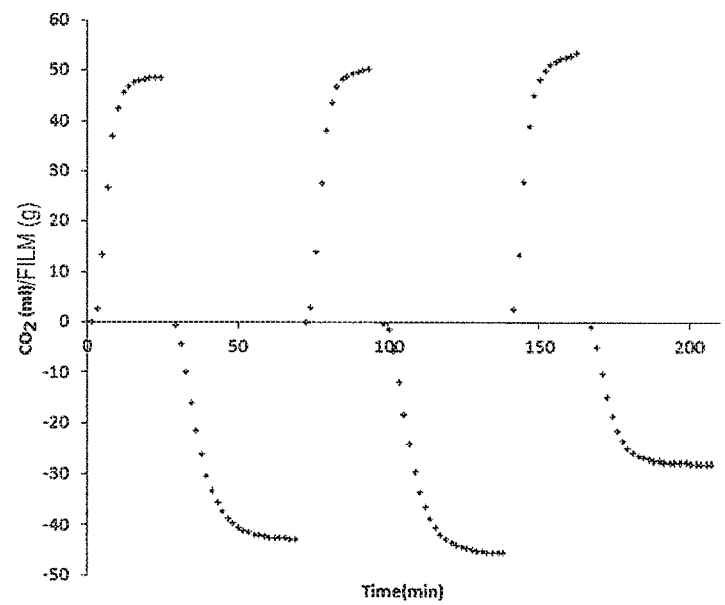
[FIG. 35]
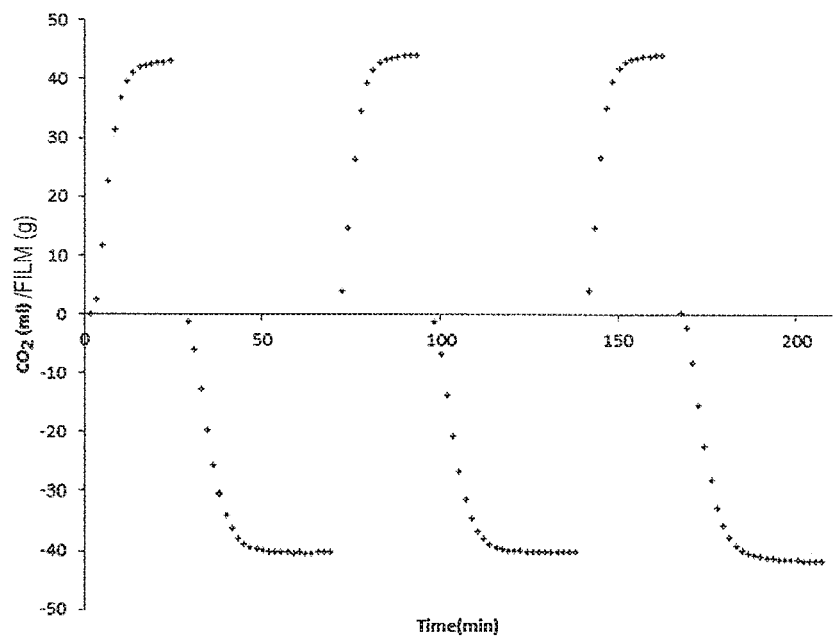

[FIG. 36]
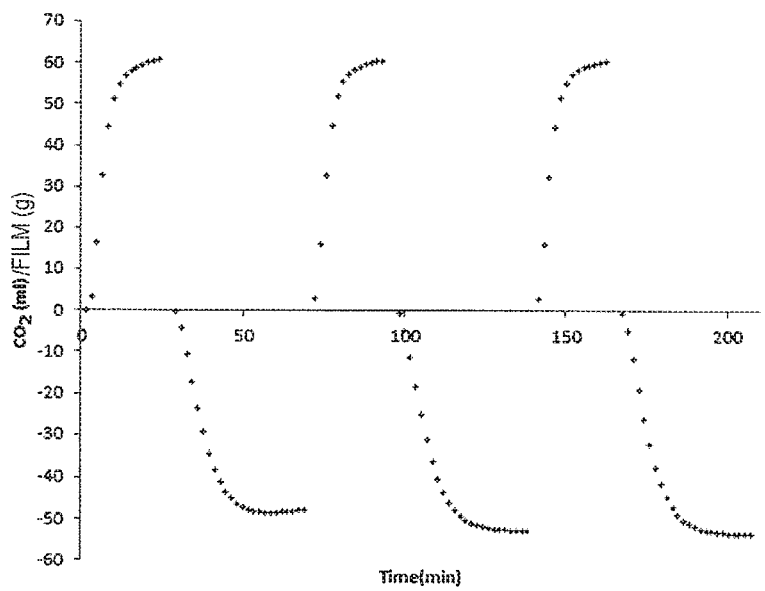
[FIG. 37]
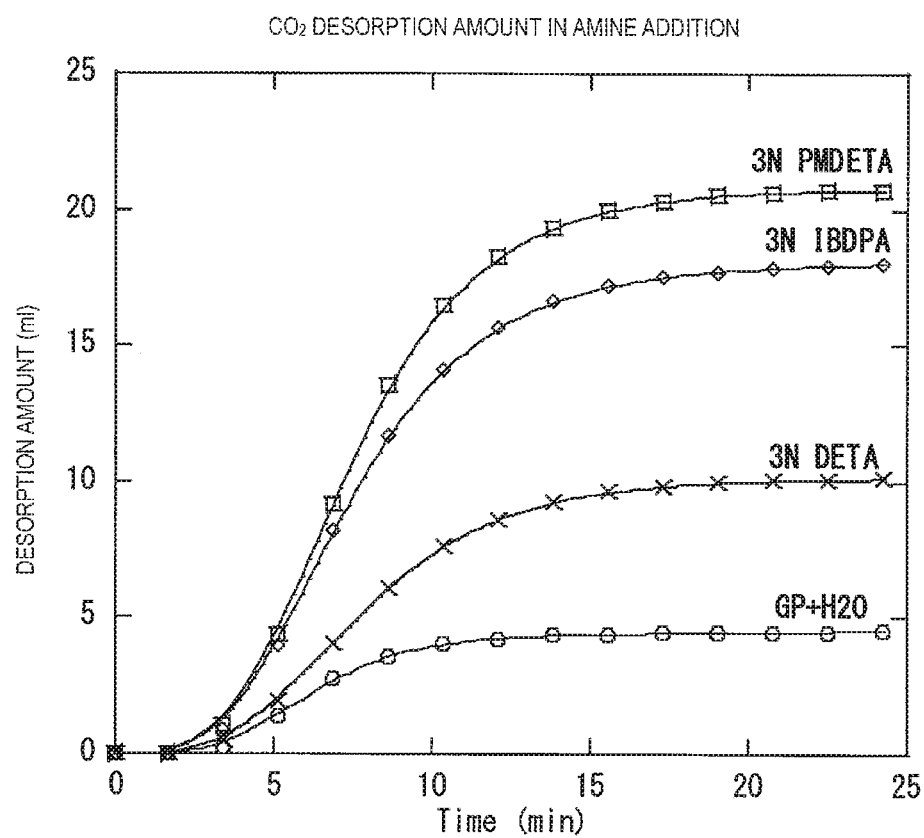

[FIG. 38]
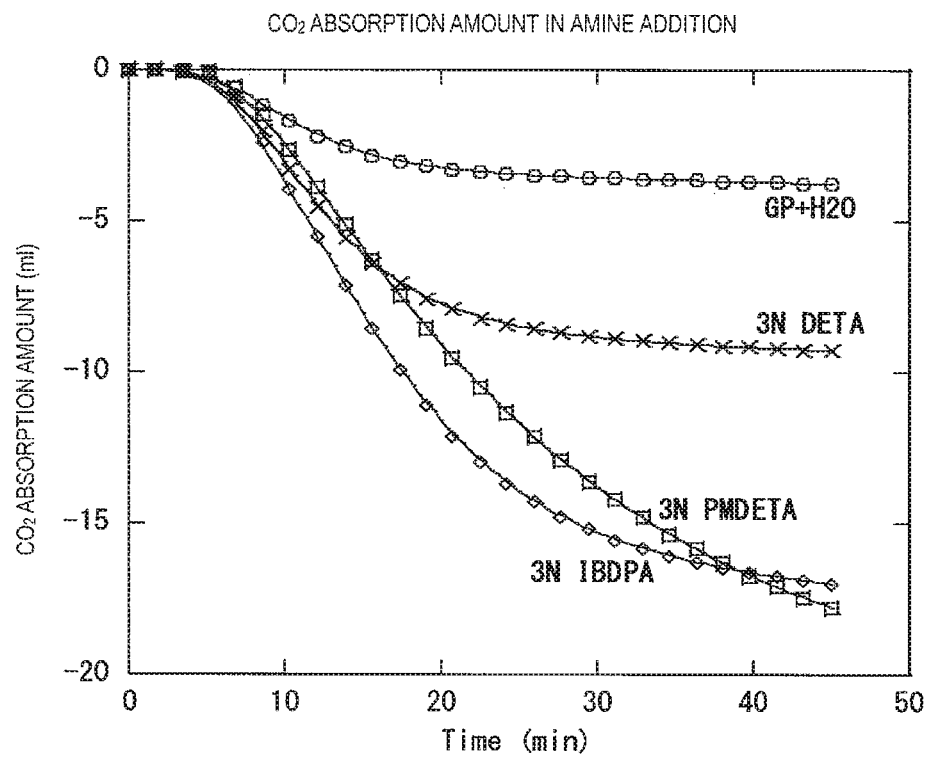
[FIG. 39]
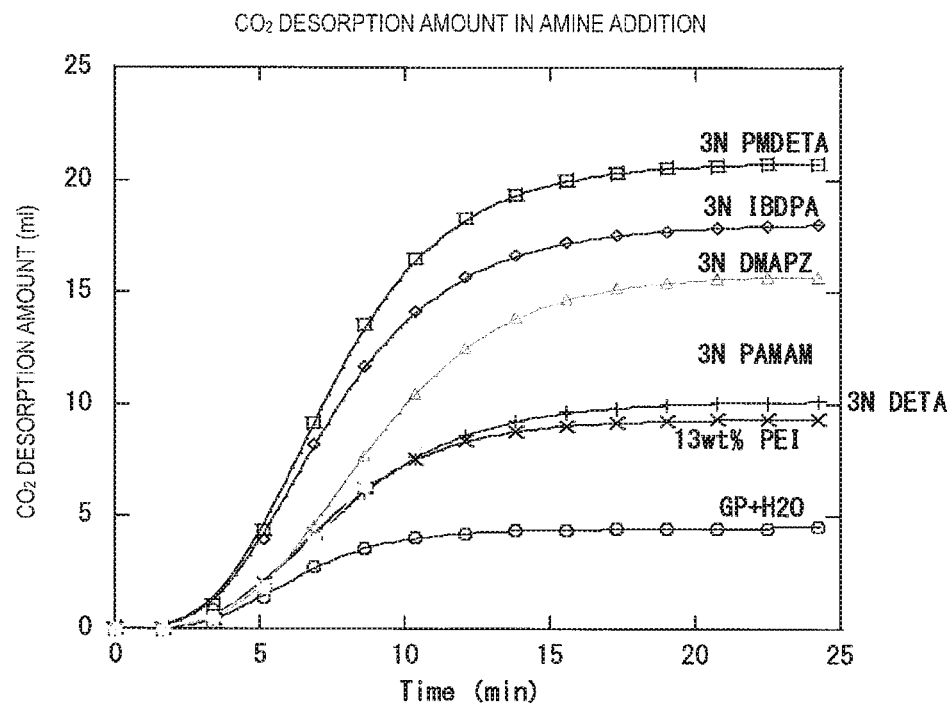

[FIG. 40]
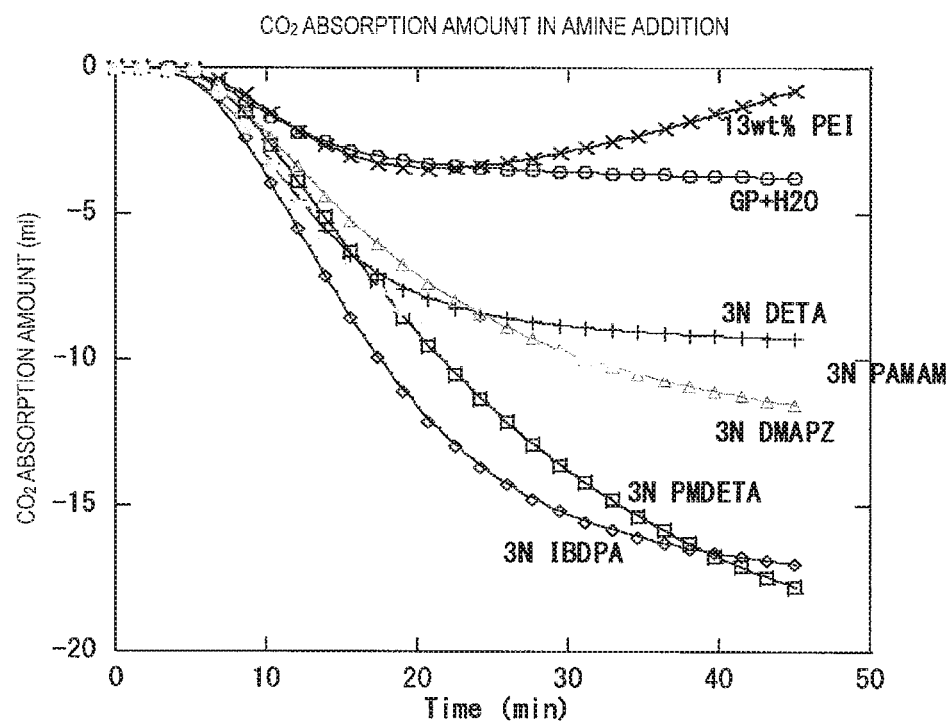
[FIG. 41]
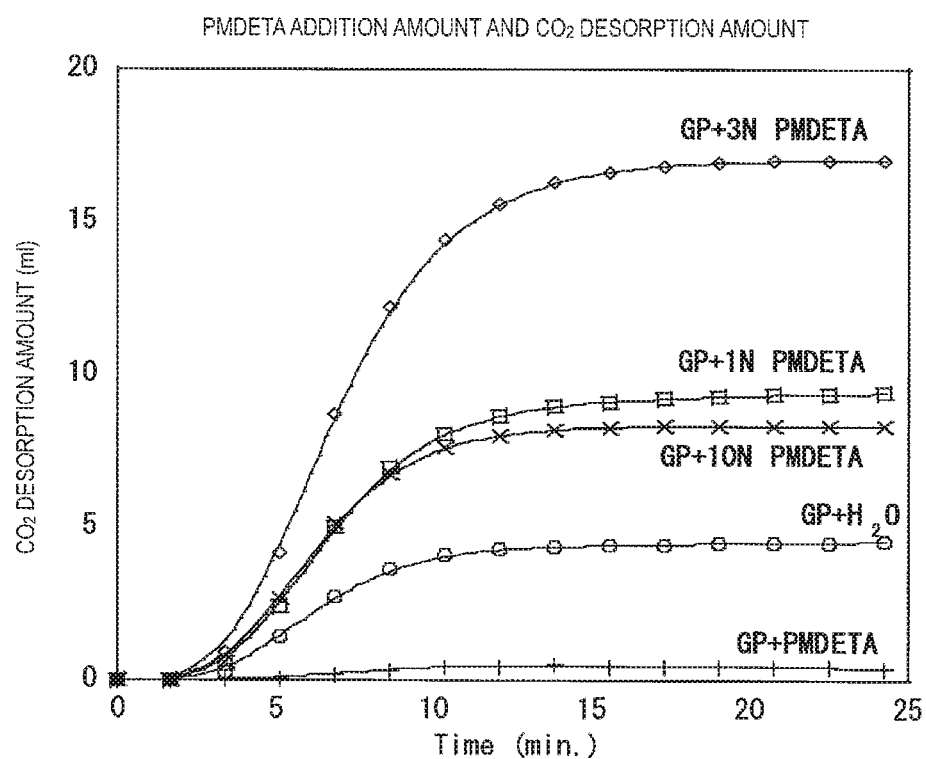

[FIG. 42]
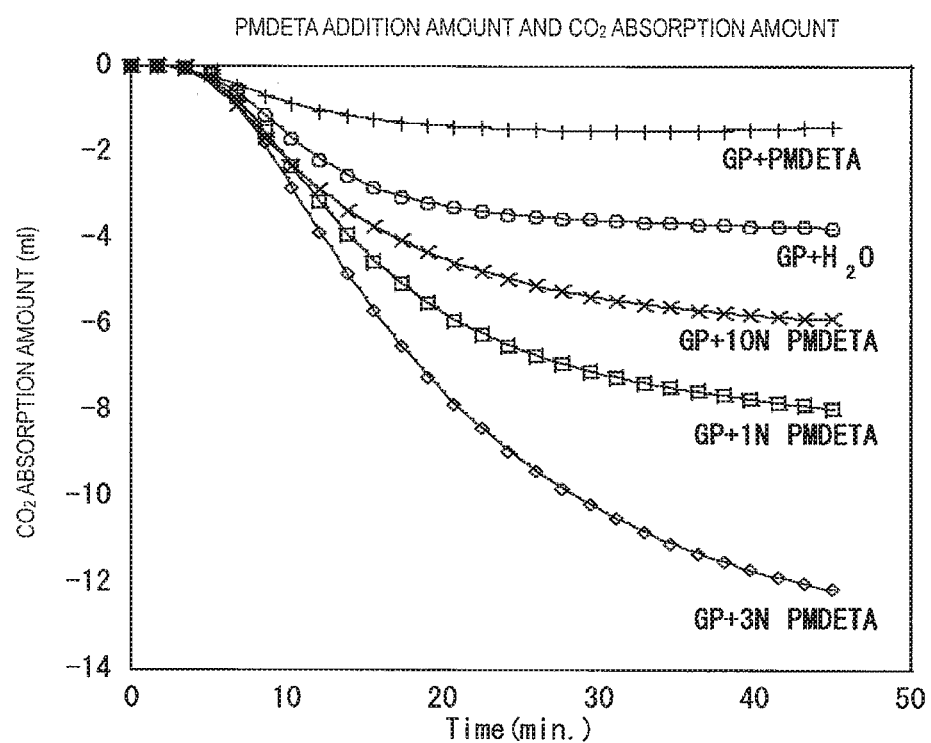
[FIG. 43]
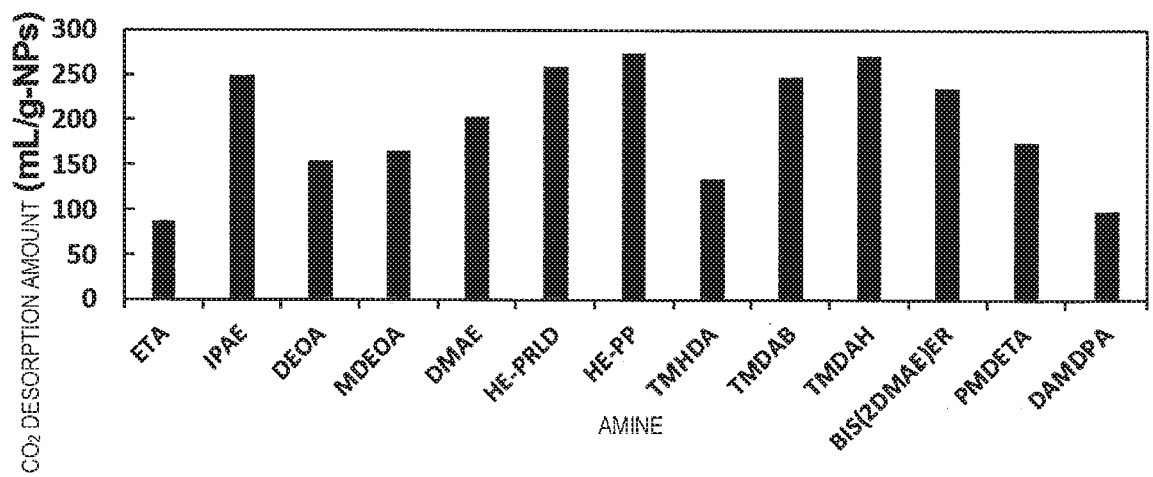

[FIG. 44]
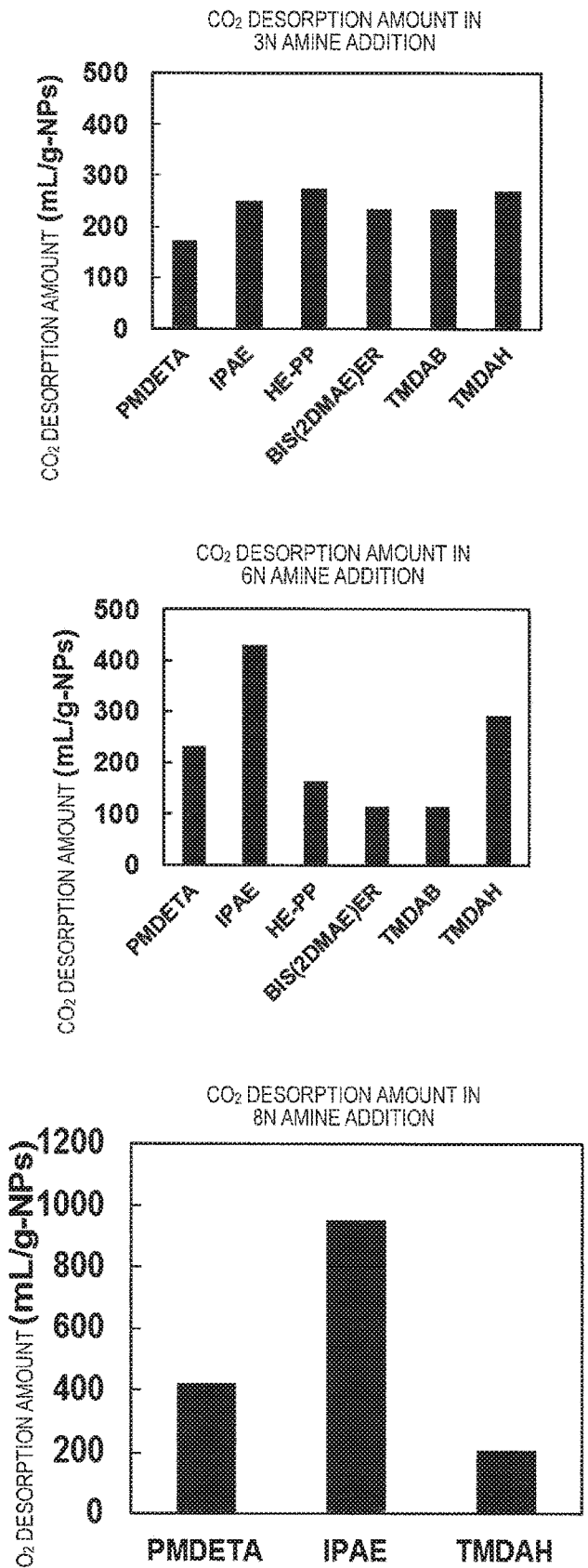

GAS ABSORPTION MATERIAL, USE OF SAME FOR GAS ABSORPTION, GAS ABSORPTION BODY, GAS ABSORPTION METHOD, ACIDIC GAS ABSORPTION DEVICE, ACIDIC GAS RECOVERY DEVICE, WATER VAPOR ABSORPTION DEVICE, WATER VAPOR RECOVERY DEVICE, HEAT EXCHANGER, AND HEAT RECOVERY DEVICE

TECHNICAL FIELD

The present invention relates to a gas absorption material capable of reversibly absorbing acid gas or the like, a gas absorber, and to an acid gas absorption device using the gas absorber, an acid gas recovery device, a water vapor absorption device, a water vapor recovery device, a heat exchanger and a heat recovery device.

BACKGROUND ART

Recently, global warming by carbon dioxide and water vapor discharged from large-scale facilities such as thermal power plants, ironworks, cement plants and the like, and environmental pollution by hydrogen sulfide and the like have become problems. For preventing such climatic change and environmental pollution and for realizing low-carbon society, studies of a method of separating and recovering acid gas such as carbon dioxide, hydrogen sulfide and the like and water vapor discharged from such large-scale facilities and capturing and storing them in the ground or on the sea bottom (CCS: carbon dioxide capture and storage) are under way. However, in the current technology, the energy cost for CCS is extremely high, and significant reduction in the energy cost is desired. In particular, the separation and recovery process for carbon dioxide accounts for about 60% of the energy cost in CCS, and therefore, for reducing the energy cost in CCS, efficiency increase and significant energy conservation in the separation and recovery process for carbon dioxide is absolutely imperative. Also in the field of energy supply, a process for separation and recovery of acid gas such as carbon dioxide, hydrogen sulfide or the like as well as water vapor from natural gas having a high carbon dioxide concentration, coal gas formed in an integrated gasification combined cycle (IGCC), or fuel gas such as hydrogen or the like for use in fuel batteries is carried out, and efficiency increase and energy conservation in the separation and recovery process for carbon dioxide and the like is also important for energy cost reduction in that field.

As a method for separating carbon dioxide from exhaust gas, a chemical absorption method using an aqueous amine solution is known. The chemical absorption method is a method where a low-temperature absorption liquid (aqueous amine solution) is brought into contact with exhaust gas in an absorption tower to make the absorption liquid selectively absorb carbon dioxide and then the absorption liquid is transported to a desorption tower and heated therein to desorb the carbon dioxide. The chemical absorption method is actually applied to treatment for exhaust gas from large-scale facilities. However, the absorption liquid must be heated up to 130° C. or higher for carbon dioxide desorption, which is therefore problematic in that the necessary energy amount is large.

As opposed to this, PTL 1 and NPLs 1 and 2 propose use of a temperature-responsive electrolyte whose basicity varies before and after the phase transition temperature for separation and recovery of carbon dioxide. PTL 1 describes an example where carbon dioxide is absorbed by a temperature-responsive electrolyte under a condition of 30° C. and then the carbon dioxide is desorbed from the temperature-responsive electrolyte by heating at 75° C.

CITATION LIST

Patent Literature

PTL 1: WO2013/027668

Non-Patent Literature

NPL 1: J. Am. Chem. Soc., 134, 18177, (2012).
NPL 2: Angew. Chem. Intl Ed., 53, 2654, (2014).

SUMMARY OF INVENTION

Technical Problem

As described above, the temperature-responsive electrolyte described in PTL 1 and NPLs 1 and 2 can absorb carbon dioxide at 30° C. and can desorb the absorbed carbon dioxide at 75° C., and therefore as compared with a conventional chemical absorption method, the disclosed technology can greatly lower the heating temperature in carbon dioxide recovery. However, the present inventors have investigated the temperature-responsive electrolyte, and have revealed that the reversible absorption amount of acid gas per unit volume is small and the absorption and desorption speed of acid gas is small, and therefore, the electrolyte is insufficient for use in treatment for exhaust gas from large-scale facilities and for various types of fuel gases.

Accordingly, for solving the technical problem in the related art, the present inventors have made further investigations for the purpose of providing a gas absorption material that can realize a gas absorber having a large reversible gas absorption amount per unit volume, capable of attaining high-speed gas absorption and desorption and capable of suppressing the quantity of heat necessary for gas desorption, and providing such a gas absorber. Using the gas absorber, the present inventors have also made investigations for the purpose of providing an acid gas absorption device and an acid gas recovery device capable of efficiently absorbing and/or recovering acid gas, and further providing a water vapor absorption device, a water vapor recovery device, a heat exchange and a heat recovery device.

Solution to Problem

As a result of assiduous studies that the present inventors have made for the purpose of solving the above-mentioned problems, the inventors have found that, by using amino group-having polymer compound particles as a gas absorption material, a gas absorber can be realized, which has a large reversible gas absorption amount per unit volume, which can attain high-speed gas absorption and desorption and which can suppress the quantity of heat necessary for gas desorption.

In particular, the present inventors have found that a gas absorber having any of the following constitutions can have improved gas absorption/desorption performance.

(1) A gel particle film is supported by a carrier such as a thin sheet, film, fiber or the like of a metal, a carbon material or a polymer compound.

(2) The carriers each supporting the gel particle film are layered and cumulated.

(3) A stabilizer is added to stabilize and immobilize the gel particle film.

(4) For promoting the absorption amount and the absorption rate of acid gas, an absorption promoter is added to the gel particle film.

Specifically, the present invention includes the following constitutions.

[1] A gas absorption material containing amino group-having polymer compound particles.

[2] The gas absorption material according to [1], wherein the polymer compound particles are hydrogel particles.

[3] The gas absorption material according to [2], wherein the polymer compound particles have a water content of 0.1 mL or more per gram of the solid content thereof.

[4] The gas absorption material according to any one of [1] to [3], which is for absorbing an acid gas from a gas containing a water vapor and an acid gas.

[5] The gas absorption material according to any one of [1] to [4], wherein the polymer compound that constitutes the polymer compound particles is a polymer of a monomer component containing an amino group-having monomer.

[6] The gas absorption material according to [5], wherein the monomer that the monomer component contains is a substituted acrylamide monomer.

[7] The gas absorption material according to [5] or [6], wherein the amino group-having monomer is an N-(aminoalkyl)acrylamide.

[8] The gas absorption material according to any one of [5] to [7], wherein the amino group-having monomer is a tertiary amino group-having monomer.

[9] The gas absorption material according to any one of [5] to [8], wherein the proportion of the amino group-having monomer in the monomer component is 5 to 95 mol %.

[10] The gas absorption material according to any one of [5] to [9], wherein the monomer component contains an amino group-having monomer and a hydrophobic group-having monomer, and the molar ratio of the amino group-having monomer to the hydrophobic group-having monomer is 5/95 to 95/5.

[11] The gas absorption material according to [10], wherein the amino group-having monomer is an N-(aminoalkyl)acrylamide and the hydrophobic group-having monomer is an N-alkylacrylamide.

[12] The gas absorption material according to any one of [1] to [11], wherein the polymer density in the particles in a dispersion state after the polymer compound particles have been swollen in water is 0.3 to 80%.

[13] The gas absorption material according to any one of [1] to [12], wherein the particle size of the polymer compound particles in a dry state is 5 nm to 10 μm.

[14] The gas absorption material according to any one of [1] to [13], wherein the polymer compound particles undergo phase transition by temperature change, and the phase transition temperature of the polymer compound particles falls within a range of 10 to 95° C.

[15] The gas absorption material according to any one of [1] to [14], wherein a crosslinked structure is formed between at least a part of the polymer compound particles among the polymer compound particles.

[16] The gas absorption material according to any one of [1] to [15], wherein the hydrodynamic particle size of the polymer compound particles that have been swollen and dispersed in water is 10 nm to 50 μm.

[17] The gas absorption material according to any one of [1] to [16], which is for gas absorption and desorption.

[18] The gas absorption material according to [17], which is for repeating a gas absorption and desorption cycle.

[19] The gas absorption material according to any one of [1] to [16], which is for carbon dioxide gas absorption.

[20] Use of amino group-having polymer compound particles for gas absorption.

[21] Use of amino group-having polymer compound particles for absorption of an acid gas from a gas containing a water vapor and an acid gas.

[22] A gas absorber having a gel particle film of an amino group-having polymer compound, and a carrier for supporting the gel particle film.

[23] The gas absorber according to [22], wherein the gel particle film contains a gas absorption material of any one of [1] to [19].

[24] The gas absorber according to [22] or [23], wherein the gel particle film is a hydrogel particle film containing water in an amount of 10% by mass or more relative to the total amount of the gel particle film.

[25] The gas absorber according to any one of [22] to [24], wherein the carbon dioxide gas desorption rate is 0.1 mmol/m$^2$/sec or more.

[26] The gas absorber according to any one of [22] to [25], wherein the carbon dioxide gas absorption rate is 0.05 mmol/m$^2$/sec or more.

[27] The gas absorber according to any one of [22] to [26], wherein the carrier is a thin sheet or a roll.

[28] The gas absorber according to any one of [22] to [26], wherein the carrier is a laminate prepared by layering plural thin sheets.

[29] The gas absorber according to [27] or [28], wherein the thin sheet is a metal foil.

[30] The gas absorber according to [27] or [28], wherein the thin sheet is a carbon material.

[31] The gas absorber according to [27] or [28], wherein the thin sheet is a resin film.

[32] The gas absorber according to any one of [22] to [26], wherein the carrier is a fiber aggregate.

[33] The gas absorber according to any one of [22] to [26], wherein the carrier is an integrated laminate prepared by layering plural fiber aggregates.

[34] The gas absorber according to [32] or [33], wherein the fiber aggregate contains inorganic fibers.

[35] The gas absorber according to [34], wherein the inorganic fibers are metal fibers.

[36] The gas absorber according to [35], wherein the metal fibers contain at least any of stainless steel fibers and aluminum fibers.

[37] The gas absorber according to [35], wherein the metal fibers contain nickel fibers.

[38] The gas absorber according to any one of [35] to [37], wherein the metal fibers are sintered metal fibers.

[39] The gas absorber according to [34], wherein the inorganic fibers are carbon fibers.

[40] The gas absorber according to any one of [32] to [39], wherein the fiber aggregate contains organic fibers.

[41] The gas absorber according to [40], wherein the fiber aggregate is paper.

[42] The gas absorber according to any one of [22] to [26], wherein the carrier is a porous substance.

[43] The gas absorber according to [42], wherein the porous substance is a foamed metal.

[44] The gas absorber according to any one of [22] to [43], wherein the carrier is formed of a material having a constant-pressure specific heat of 2500 KJ/(m$^3$K) or less.

[45] The gas absorber according to any one of [22] to [44], wherein the carrier is formed of a material having a thermal conductivity of 10 W/(mK) or more.

[46] The gas absorber according to any one of [22] to [45], wherein the surface of the carrier functions as a heat-conductive face of a heat exchanger.

[47] The gas absorber according to any one of [22] to [46], wherein the carrier functions as a heat exchanger.

[48] The gas absorber according to any one of [22] to [47], wherein the filling rate of the gel particle film is 20% or more.

[49] The gas absorber according to any one of [22] to [48], wherein the gel particle film further contains a film stabilizer.

[50] The gas absorber according to [49], wherein the film stabilizer contains a polymer compound.

[51] The gas absorber according to [49], wherein the film stabilizer contains a polymer compound having at least any of a primary amino group, a secondary amino group and a tertiary amino group.

[52] The gas absorber according to [51], wherein the film stabilizer contains a polyvinylamine or a polyvinylamine derivative.

[53] The gas absorber according to any one of [49] to [52], wherein the film stabilizer contains a polymerizable compound.

[54] The gas absorber according to any one of [49] to [53], wherein the film stabilizer contains a polymer compound formed through polymerization of a polymerizable compound in the gel particle film.

[55] The gas absorber according to [53] or [54], wherein the polymerizable compound is an acrylamide or an acrylamide derivative.

[56] The gas absorber according to [55], which contains a substituted aminoalkylacrylamide and an acrylamide derivative having two polymerizing groups as the polymerizable compound.

[57] The gas absorber according to any one of [49] to [56], wherein the film stabilizer contains a crosslinking agent.

[58] The gas absorber according to [57], wherein the crosslinking agent is a titanium-base crosslinking agent.

[59] The gas absorber according to any one of [49] to [58], wherein the content of the film stabilizer in the gel particle film is 1 to 89% by mass relative to the total amount of the gel particle film.

[60] The gas absorber according to any one of [22] to [59], wherein the gel particle film contains an absorption promoter.

[61] The gas absorber according to any one of [22] to [60], wherein the gel particle film contains an amine-containing compound having a molecular weight of 61 to 10000.

[62] The gas absorber according to [61], wherein the gel particle film contains at least any one of an amine having an amino group and a hydroxyl group, and an amine having three amino groups.

[63] The gas absorber according to [61], wherein the gel particle film contains at least any of isopropylaminoethanol, N,N,N',N'-tetramethyl-1,6-hexanediamine, imino-bis(N,N-dimethylpropylamine) and N,N',N''-pentamethyldiethylenetriamine.

[64] The gas absorber according to any one of [22] to [63], wherein the surface of the gel particle film is supported by a heat-conductive face of a heat exchanger.

[65] The gas absorber according to any one of [22] to [64], wherein the gel particle film can reversibly absorb at least an acid gas.

[66] The gas absorber according to [65], wherein the acid gas is carbon dioxide.

[67] The gas absorber according to [65], wherein the acid gas is hydrogen sulfide.

[68] The gas absorber according to any one of [22] to [67], wherein the gel particle film can reversibly absorb at least a water vapor.

[69] A gas absorption method wherein a gel particle film of an amino group-having polymer compound is made to absorb a gas.

[70] The gas absorption method according to [69], wherein after the gel particle film is made to absorb a gas, the temperature of the film is raised so as to desorb the absorbed gas from the gel particle film.

[71] The gas absorption method according to [70], wherein the temperature raise is carried out until volume phase transition of the polymer compound occurs.

[72] The gas absorption method according to [70] or [71], wherein after the gas desorption, the temperature of the gel particle film is lowered, and the gel particle film is made to again absorb a gas.

[73] The gas absorption method according to any one of [70] to [72], wherein the absorption-desorption cycle is repeated plural times.

[74] An acid gas absorption device having a gas absorber of any one of [22] to [68].

[75] An acid gas recovery device having a gas absorber of any one of [22] to [68].

[76] A water vapor absorption device having a gas absorber of any one of [22] to [68].

[77] A water vapor recovery device having a gas absorber of any one of [22] to [68].

[78] A heat exchanger having a gas absorber of any one of [22] to [68].

[79] A heat recovery device having a gas absorber of any one of [22] to [68].

Advantageous Effects of Invention

The gas absorption material of the present invention can realize a gas absorber having a large reversible gas absorption amount per unit volume, enabling high-speed gas absorption and desorption, and capable of suppressing a quantity of heat necessary for gas desorption.

In addition, the gas absorber of the present invention has a large reversible gas absorption amount per unit volume, enables high-speed gas absorption and desorption, and has high stability of the gel particle film thereof, and therefore even when used for repeated gas absorption and desorption, the gas absorber can surely maintain the initial performance thereof.

The acid gas absorption device, the acid as recovery device, the water vapor absorption device, the water vapor recovery device, the heat exchanger and the heat recovery device of the present invention have such a gas absorber, and therefore can efficiently absorb and recover an acid gas and a water vapor gas, and can greatly contribute toward realizing a low-carbon society.

BRIEF DESCRIPTION OF DRAWINGS

FIG. 1 This is a schematic view for explaining a mechanism of phase transition of amino group-having polymer compound particles for use in the present invention and a mechanism of carbon dioxide absorption and desorption.

FIG. 2 This is a schematic view showing a first embodiment of a carbon dioxide gas recovery device to which an acid gas recovery device of the present invention has been applied.

FIG. 3 This is a schematic view showing a second embodiment of a carbon dioxide gas recovery device to which an acid gas recovery device of the present invention has been applied.

FIG. 4 This is a graph showing a temperature-dependent particle size change of amine-containing gel particles of Synthesis Example 2.

FIG. 5 This is a graph showing a temperature-dependent pH change of a particle solution containing amine-containing gel particles of Synthesis Example 2.

FIG. 6 This is a titration curve with hydrochloric acid of a particle solution containing amine-containing gel particles of Synthesis Example 2.

FIG. 7 This is a graph showing a time-dependent carbon dioxide desorption amount from amine-containing gel particles of Synthesis Example 2.

FIG. 8 This is a graph showing a thickness-dependence of a carbon dioxide desorption rate of a gel particle film of amine-containing gel particles (particle size 300 nm) of Synthesis Example 2 and a gel homogeneous film.

FIG. 9 This is a graph showing a thickness-dependence of a carbon dioxide desorption rate of a gel particle film of amine-containing gel particles (particle size 300 nm) of Synthesis Example 2 and a gel particle film of amine-containing gel particles (particle size 1 μm) of Synthesis Example 3.

FIG. 10 This is a graph showing a thickness-dependence of a carbon dioxide desorption rate of a gel particle film of amine-containing gel particles (particle size 300 nm) of Synthesis Example 2, a gel particle film of amine-containing gel particles (particle size 1 μm) of Synthesis Example 3, a gel homogeneous film, and a gel particle film of amine-containing gel particles (crosslinked gel particles) of Synthesis Example 4.

FIG. 11 This is a schematic view showing a reactor for evaluating gas absorption/desorption performance of a gas absorber.

FIG. 12 This is a graph showing a time-dependent change of carbon dioxide absorption amount and desorption amount per mass of amine-containing dry gel particles of a gas absorber having, as a carrier, a thin stainless sheet with a thickness of 0.1 mm or 0.3 mm and having a gel particle film of amine-containing gel particles supported by the carrier.

FIG. 13 This is a graph showing a time-dependent change of carbon dioxide absorption amount and desorption amount per mass of amine-containing dry gel particles of a gas absorber having, as a carrier, a thin stainless sheet, a thin iron sheet or a graphite sheet with a thickness of 0.1 mm and having a gel particle film of amine-containing gel particles supported by the carrier.

FIG. 14 This is a graph showing a time-dependent change of carbon dioxide absorption amount and desorption amount per volume of reactor in changing the gel film thickness of a gas absorber having, as a carrier, a graphite sheet with a thickness of 0.1 mm and a gel particle film of amine-containing gel particles supported by the carrier.

FIG. 15 This includes a schematic view, a perspective view (photograph) and a top view (photograph) showing another reactor for gas absorption/desorption evaluation of a gas absorber.

FIG. 16 This is a graph showing a time-dependent change of carbon dioxide absorption amount and desorption amount per fiber aggregate volume of various gas absorbers (with water added in an amount of 0.4, 0.8 or 1.6 mL), in which a fiber aggregate is used as a carrier and the amount of amine-containing dry gel particles supported by the carrier is changed to 100, 200 or 400 mg.

FIG. 17 This is a graph showing a time-dependent change of carbon dioxide absorption amount and desorption amount per mass of amine-containing dry gel particles of various gas absorbers (with water added in an amount of 0.4, 0.8 or 1.6 mL), in which a fiber aggregate is used as a carrier and the amount of amine-containing dry gel particles supported by the carrier is changed to 100, 200 or 400 mg.

FIG. 18 This is a graph showing a time-dependent change of carbon dioxide absorption amount and desorption amount per fiber aggregate volume of various gas absorbers, in which a fiber aggregate is used as a carrier and the water content in the gel particle film of amine-containing gel particles supported by the carrier (the amount of the supported amine-containing dry gel particles is 200 mg) differs and is 0.4 mL or 0.8 mL.

FIG. 19 This is a graph showing a time-dependent change of carbon dioxide absorption amount and desorption amount per mass of amine-containing dry gel particles of various gas absorbers, in which a fiber aggregate is used as a carrier and the water content in the gel particle film of amine-containing gel particles supported by the carrier (the amount of the supported amine-containing dry gel particles is 200 mg) differs and is 0.4 mL or 0.8 mL.

FIG. 20 This is a graph showing a time-dependent change of carbon dioxide absorption amount and desorption amount per fiber aggregate volume of a gas absorber in which the fiber diameter of the fiber aggregate used as a carrier is 12 μm or 100 μm.

FIG. 21 This is a graph showing a time-dependent change of carbon dioxide absorption amount and desorption amount per the mass of amine-containing dry gel particles of a gas absorber in which the fiber diameter of the fiber aggregate used as a carrier is 12 μm or 100 μm.

FIG. 22 This is a graph showing a time-dependent change of carbon dioxide absorption amount and desorption amount per fiber aggregate volume of a gas absorber in which the fiber diameter of the fiber aggregate used as a carrier is 8 μm or 12 μm.

FIG. 23 This is a graph showing a time-dependent change of carbon dioxide absorption amount and desorption amount per the mass of amine-containing dry gel particles of a gas absorber in which the fiber diameter of the fiber aggregate used as a carrier is 8 μm or 12 μm.

FIG. 24 This is a graph showing a time-dependent change of carbon dioxide absorption amount and desorption amount per the mass of amine-containing dry gel particles in a case where a gas reactor having a fiber aggregate as a carrier and a gel particle film of amine-containing gel particles supported by the carrier, and in a case where a gel particle film of the same amount of amine-containing gel particles is directly arranged inside the reactor.

FIG. 25 This is a graph showing a relationship between the gel filling rate and the carbon dioxide desorption amount and absorption amount in a case of using metal fibers or sintered metal fibers.

FIG. 26 This is a graph showing a time-dependent change of carbon dioxide absorption amount and desorption amount per mass of amine-containing dry gel particles in a case of using sintered metal fibers, a foamed metal, or sintered nickel fibers.

FIG. 27 This is a graph showing a time-dependent change of carbon dioxide absorption amount and desorption amount per the mass of amine-containing dry gel particles in a gas absorber having a supported gel particle film of amine-containing gel particles of Synthesis Example 1.

FIG. 28 This is a graph showing a water vapor pressure change with the temperature change of a gas absorber having a supported gel particle film of amine-containing gel particles of Synthesis Example 1.

FIG. 29 This is a graph showing a time-dependent change of carbon dioxide desorption amount per mass of amine-containing dry gel particles of a gas absorber in which a polyvinyl alcohol/polyethylene copolymer has been added to the gel particle film of amine-containing gel particles.

FIG. 30 This is a graph showing a time-dependent change of carbon dioxide absorption amount per mass of amine-containing dry gel particles of a gas absorber in which a polyvinyl alcohol/polyethylene copolymer has been added to the gel particle film of amine-containing gel particles.

FIG. 31 This includes photographs showing a change in heat treatment of a film of a solution prepared by adding a titanium-base crosslinking agent solution to a solution of a stabilizer and amine-containing dry gel particles.

FIG. 32 This is a graph showing a time-dependent change of carbon dioxide absorption amount and desorption amount per mass of amine-containing dry gel particles of a gas absorber in which a polyvinyl alcohol/polyethylene copolymer and a titanium-base crosslinking agent have been added to a gel particle film of amine-containing gel particles.

FIG. 33 This is a graph showing a time-dependent change of carbon dioxide absorption amount and desorption amount per mass of amine-containing dry gel particles of a gas absorber in which polymerizable compounds (DMAPM/BIS=95/5) have been added to a methanol solution of amine-containing gel particles and polymerized therein.

FIG. 34 This is a graph showing a time-dependent change of carbon dioxide absorption amount and desorption amount per mass of amine-containing dry gel particles of a gas absorber in which polymerizable compounds (DMAPM/BIS/NIPAM=55/5/45) have been added to a methanol solution of amine-containing gel particles and polymerized therein.

FIG. 35 This is a graph showing a time-dependent change of carbon dioxide absorption amount and desorption amount per mass of amine-containing dry gel particles of a gas absorber in which polymerizable compounds (DMAPM/BIS/NIPAM=30/5/65) have been added to a methanol solution of amine-containing gel particles and polymerized therein.

FIG. 36 This is a graph showing a time-dependent change of carbon dioxide absorption amount and desorption amount per mass of amine-containing dry gel particles of a gas absorber in which polymerizable compounds (DMAPM/BIS=95/5) have been added to an aqueous solution of amine-containing gel particles and polymerized therein.

FIG. 37 This is a graph showing a time-dependent change of carbon dioxide desorption amount from a gas absorber in which a different amine has been added to the gel particle film of amine-containing gel particles.

FIG. 38 This is a graph showing a time-dependent change of carbon dioxide absorption amount of a gas absorber in which a different amine has been added to the gel particle film of amine-containing gel particles.

FIG. 39 This is a graph showing a time-dependent change of carbon dioxide desorption amount from a gas absorber in which a different amine has been added to the gel particle film of amine-containing gel particles.

FIG. 40 This is a graph showing a time-dependent change of carbon dioxide absorption amount of a gas absorber in which a different amine has been added to the gel particle film of amine-containing gel particles.

FIG. 41 This is a graph showing a time-dependent change of carbon dioxide desorption amount from a gas absorber in which an aqueous PMDETA solution having a different concentration (0 M, 1 M, 3 M or 10 M in terms of amine concentration) or PMDETA containing little water has been added to amine-containing dry gel particles of the gel particle film.

FIG. 42 This is a graph showing a time-dependent change of carbon dioxide absorption amount of a gas absorber in the form of a gel film of amine-containing dry gel particles to which an aqueous PMDETA solution having a different concentration (0 M, 1 M, 3 M or 10 M in terms of amine concentration) or PMDETA containing little water has been added.

FIG. 43 This is a graph showing carbon dioxide desorption amount from a gas absorber in the form of a gel film of amine-containing dry gel particles with an aqueous 3 N amine solution added thereto.

FIG. 44 This is a graph showing carbon dioxide desorption amount from a gas absorber in the form of a gel film of amine-containing dry gel particles with an aqueous 3 N, 6 N or 8 N amine solution added thereto.

DESCRIPTION OF EMBODIMENTS

The present invention is described in detail hereinunder. The description of the constituent features given below may be made on the basis of specific embodiments and examples, but the present invention is not limited to such embodiments. In this description, the numerical range made by an expression "from (a numerical value 1) to (a numerical value 2)" means a range including the numerical values 1 and 2 as the lower limit and the upper limit, respectively. Also in this description, a term "(meth)acrylamide" means "acrylamide" and "methacrylamide".

<Gas Absorption Material>

The gas absorption material of the present invention contains amino group-having polymer compound particles.

The amino group-having polymer compound particles change in point of the swelling degree and the internal structure of the particles as well as the acid dissociation constant of the amino group and the like, when given a small temperature change, and owing to the change, the gas absorption capacity thereof changes. Accordingly, the gas absorption material can switch the gas absorption state and the gas desorption state thereof. The switching between the two states is presumed to be attained according to the following mechanism. In the following description where a specific gas contained in a gas to be treated is absorbed and desorbed, the specific gas may be referred to as "a target gas".

First, when a gas is brought into contact with amino group-having polymer compound particles, the gas-derived anion and the amino group of the polymer compound particle form a salt, and the polymer compound particles come to be in a state of reversibly absorbing the gas. When the polymer compound particles in that state are heated, the swelling degree and the internal structure of the particles as well as the acid dissociation constant and the like of the amino group may change by a slight temperature increase, and owing to the change, the polymer compound particles come to be in a state that can readily desorb the gas. As a result, the gas is desorbed from the polymer compound particles and with that, an amino group is regenerated in the polymer compound. When the amino group-regenerated polymer compound particles are further subsequently subjected to a repetition of cooling and heating at a specific temperature, a cycle of gas-absorbing state and gas-desorbing state according to the same mechanism as above is repeated.

In the gas absorption material of the present invention, the amino group-having polymer compound particles have such a function, and therefore the material can be effectively used as a material for a gas absorber of absorbing and desorbing gas. In addition, the material can reduce the quantity of heat necessary for gas desorption therefrom.

In the gas absorption material of the present invention, the amino group-having compound is in the form of particles, and when a deposited film of the particles that have been deposited is exposed to a gas to be treated, the gas being treated is absorbed by the surface of the deposited film and the absorbed carbon dioxide molecules and bicarbonate ions diffuse at a high speed inside the film via the voids between the particles. When the absorbed target gas is diffused, carbon dioxide particles and bicarbonate ions diffuse at a high speed after having passed through the voids between the particles so that the target gas desorbs from the surface of the deposited film and also desorbs from the inside of the deposited film, as a vapor phase is formed in the voids between the particles. Consequently, the gas absorber produced using the gas absorption material has a large reversible gas absorption amount per unit volume, as compared with a homogeneous gas absorber not having voids, and therefore can attain high-speed gas absorption and desorption.

In the gas absorption material of the present invention, the gas targeted for absorption and desorption is not specifically limited, but is preferably an acid gas such as carbon dioxide, hydrogen sulfide or the like as being able to be readily absorbed by the particles, and is more preferably carbon dioxide. The gas absorption material of the present invention can efficiently attain reversible gas absorption and desorption according to the above-mentioned mechanism, and can be therefore effectively used for separation and recovery of an acid gas such as carbon dioxide, hydrogen sulfide and the like, and is, in particular, favorably used for separation and recovery of carbon dioxide whose desorption is large.

Different from an adsorbent, the gas absorption material of the present invention can absorb a large amount of an acid gas even though a high-concentration water vapor exists in the gas. Accordingly, for example, in the case of treating a gas to be treated that contains water vapor and carbon dioxide, carbon dioxide can be directly separated and recovered even when water vapor is not previously removed, and consequently, the process necessary for treatment for the gas to be treated can be simplified.

The amino group-having polymer compound particles to be used in the gas absorption material of the present invention will be described in detail hereinunder.

(Chemical Structure and Preparation of Amino Group-Having Polymer Compound Particles)

The amino group-having polymer compound particles are particles of an amino group-having polymer compound, and are preferably formed of an amino group-having polymer compound alone, but may contain a material used in preparing the particles, for example, a particle size controlling component such as a surfactant or the like, an unreacted monomer, etc.

The amino group-having polymer compound is not specifically limited, including (meth)acrylamide polymers and derivatives thereof, polyethyleneimines and derivatives thereof, polyvinyl alcohols and derivatives thereof, polyallylamines and derivatives thereof, etc. Specific examples of the constituent monomers include N,N-dimethylaminopropylmethacrylamide, N,N-diethylaminopropylmethacrylamide, N,N-dimethylaminoethylmethacrylamide, N,N-diethylaminoethylmethacrylamide, N,N-dimethylaminopropylmethacrylamide, N,N-diethylaminopropyl methacrylate, N,N-dimethylaminoethyl methacrylate, N,N-diethylaminoethyl methacrylate, N,N-dimethylaminopropylacrylamide, N,N-diethylaminopropylacrylamide, N,N-dimethylaminoethylacrylamide, N,N-diethylaminoethylacrylamide, 3-aminopropylmethacrylamide hydrochloride, 3-aminopropylacrylamide hydrochloride, N,N-dimethylaminopropyl acrylate, N,N-diethylaminopropyl acrylate, N,N-dimethylaminoethyl acrylate, N,N-diethylaminoethyl acrylate, 3-aminopropyl methacrylate hydrochloride, 3-aminopropyl acrylate hydrochloride, etc., and acrylamide polymers are preferred.

The amino group of the amino group-having polymer compound may be any of a primary amino group, a secondary amino group or a tertiary amino group, but preferably, the acid dissociation constant of the conjugated acid thereof changes in response to stimulation such as temperature change, etc. In particular, it is preferable that the acid dissociation constant in absorbing carbon dioxide is equal to or larger than the acid dissociation constant of carbonic acid and that the acid dissociation constant in desorbing carbon dioxide is equal to or smaller than the acid dissociation constant of carbonic acid. Above all, a tertiary amino group is preferred as capable of increasing acid gas desorption efficiency, and a dialkylamino group such as a dimethylamino group or the like is more preferred. The amino group of the polymer compound may bond to the main chain thereof or may bond to the side chain, but preferably bonds to the side chain.

Also preferably, the amino group-having polymer compound has a hydrophobic group. With that, the swelling degree and the internal structure of the polymer compound particles can significantly change (phase transition) in accordance with temperature change, and therefore the polymer compound particles can efficiently absorb and desorb a gas such as a carbon dioxide gas or the like in response to temperature change. In the following, the phase transition of the polymer compound particles having an amino group and a hydrophobic group is described with reference to an example of a case where carbon dioxide is absorbed and desorbed as a target gas. FIG. 1 is a schematic view showing a carbon dioxide gas absorption/desorption cycle in a case where the polymer compound particles having an amino group and a hydrophobic group are hydrogel particles.

As shown on the upper left in FIG. 1, the gel particles do not have steric hindrance around the amino group at a low temperature, and are therefore in a state where the amino group can readily absorb an acid gas (as having a high basicity). When a gas to be treated that contains a carbon dioxide gas is brought into contact with the gel particles, bicarbonate anions form through nuclear attack of hydroxy anions against carbon dioxide, and one molecule of the bicarbonate anion forms a base with one amino group. Accordingly, the gel particles come to be in a state that has absorbed carbon dioxide gas. At the same time, the pH of water lowers and the gel particles swell. From this state, when the gel particles are heated, the hydrophobicity interaction inside the particle becomes large and the gel particles shrink (phase transition). As a result, the area around the amino group is covered with polymer chains having low polarity and the steric hindrance becomes large, and therefore the amino group comes to be in a state that can readily desorb an acid gas (as having a low basicity). Accordingly, carbon dioxide gas is desorbed and at the same time, the pH of water increases. Next, when the gel particles are cooled, the pH of water further increases and with that, the gel particles swell and are restored to the initial state thereof.

As in the above, the gel particles of a polymer compound having an amino group and a hydrophobic group can be switched from a state of absorbing an acid gas to a state of desorbing the gas through a slight temperature difference that may cause phase transition. Consequently, using a gas absorbing material containing such gel particles, the energy amount necessary in an acid gas separation and recovery process can be reduced.

The hydrophobic group to be introduced into the polymer compound includes a hydrocarbon group represented by $C_xH_{2x}$ or $C_xH_{2x+1}$, and is preferably a methyl group, an ethyl group, a propyl group, an isopropyl group, a butyl group, an isobutyl group, a tert-butyl group, a pentyl group, a cyclopentyl group, an isopentyl group, a hexyl group, a cyclohexyl group. Above all, an isobutyl group and a tert-butyl group are more preferred. Alternatively, the group may also be one formed by bonding a hydroxyl group to the above-mentioned hydrophobic group, such as a hydroxyethyl group, a hydroxypropyl group, a hydroxybutyl group.

Of the amino group-having polymer compound, the polymer density in the particles in a dispersed state after the polymer compound particles have been swollen in water is preferably 0.3 to 80%, more preferably 1 to 60%.

The amino group-having polymer compound particles may be prepared using a solution that contains a monomer component (hereinafter this may be referred to as "particle preparation liquid"). In this description, the "monomer component" includes all the monomers to be used for synthesis of the polymer of the amino group-having polymer compound particles. A method for producing the polymer compound particles is not specifically limited, and any conventional known method such as an emulsion polymerization method, a dispersion polymerization method, a suspension polymerization method, a seed polymerization method or the like is employable.

The monomer component for use in preparing particles contains at least an amino group-having monomer, but preferably contains an amino group-having monomer and a monomer not having an amino group. Specifically, the amino group-having polymer compound may be a homopolymer or a copolymer of an amino group-having monomer, and may also be a copolymer of an amino group-having monomer and a monomer not having an amino group. Accordingly, by controlling the proportion of these monomers, the density of the amino group in the polymer compound particles can be controlled to fall within a suitable range. The amino group-having monomer and the optional monomer not having an amino group are preferably substituted (meth)acrylamide monomers, more preferably substituted acrylamide monomers.

For the description and the preferred range of the amino group of the amino group-having monomer, the description and the preferred range of the amino group of the amino group-having polymer compound may be referred to. The number of the amino group that the monomer has is not specifically limited, and may be one, or may be 2 or more. In the case where the monomer has two or more amino group, the amino groups may be the same or different.

The amino group-having monomer includes, though not specifically limited thereto, N-(aminoalkyl)acrylamide, N-(aminoalkyl)methacrylamide, etc., and N-(aminoalkyl) acrylamide is preferred.

The monomer component preferably contains a hydrophobic group-having monomer along with the amino group-having monomer. For the description and the preferred range of the hydrophobic group of the hydrophobic group-having monomer, the description and the preferred range of the hydrophobic group employable in the amino group-having polymer compound may be referred to. Preferably, the hydrophobic group exists at the terminal. The hydrophobic group-having monomer may further have or may not have an amino group.

The hydrophobic group-having monomer includes, though not specifically limited thereto, N-alkylacrylamide, N-alkylmethacrylamide, N-alkyl acrylate, N-alkyl methacrylate, N,N-dialkylacrylamide, N-(hydroxyalkyl)methacrylamide, N,N-dialkyl acrylate, N-(hydroxyalkyl) methacrylate, N,N-dialkylmethacrylamide, N-(hydroxyalkyl) acrylamide, N,N-dialkyl methacrylate, N-(hydroxyalkyl) acrylate, etc., and N-alkylacrylamide is preferred.

A preferred combination of the amino group-having monomer and the hydrophobic group-having monomer is a combination of an N-(aminoalkyl)(meth)acrylamide and an N-alkyl(meth)acrylamide, and a combination of an N-(aminoalkyl)methacrylamide and an N-alkylacrylamide is preferred. In the particles of a copolymer of an N-(aminoalkyl) (meth)acrylamide and an N-alkyl(meth)acrylamide, the hydrophobic alkyl group and the hydrogen-bonding amide are uniformly distributed in a well-balanced manner in the molecule. Accordingly, the copolymer forms gel particles that are swollen to be easily soluble in water at a low temperature, and can efficiently absorb a gas contained in a gas to be treated. When the gel particles having absorbed the gas are heated, they shrink by a slight temperature increase with the result that the gas absorption capacity thereof significantly lowers and the particles efficiently desorb the gas. Consequently, using the particles of the copolymer as a gas absorption material, gas absorption and desorption can be attained at a high speed and the quantity of heat necessary for gas desorption can be suppressed. In addition, the gel particles of the copolymer hardly form precipitates even through heated at a phase transition temperature or higher, and can maintain extremely stable solution characteristics.

The proportion of the amino group-having monomer in the monomer component is preferably 5 to 95 mol % relative to the total molar number of the monomer component, more preferably 30 to 70 mol %, even more preferably 50 to 65 mol %. In the case where the monomer component contains a hydrophobic group-having monomer, the molar ratio of the amino group-having monomer to the hydrophobic group-having monomer is preferably 95/5 to 5/95, more preferably 2/1 to 1/2. A monomer having both an amino group and a hydrophobic group is grouped in the category of the amino group-having monomer. The acid gas absorption capacity of the polymer compound may tend to increase with the increase in the number of the amino group, but when the number of the amino group increases too much, the above-mentioned particle shrink and acid gas desorption at a high temperature may hardly occur owing o mutual electric repulsion of the amino groups. By controlling the proportion of the amino group-having monomer as well as the molar ratio of the amino group-having monomer to the hydrophobic group-having monomer each to fall within the above-mentioned range, polymer compound particles that can readily undergo phase transition by heating and can efficiently desorb an acid gas can be obtained.

The particle preparation liquid may contain the monomer component alone or may contain any other component. The other component includes a surfactant, a crosslinking agent, a polymerization initiator, etc. Using a surfactant, the concentration of the particle preparation liquid can be varied and the particle size of the polymer compound particles to be obtained can be controlled. Using a crosslinking agent, a crosslinked structure can be formed in the polymer compound inside the particles to thereby control the swellability of the particles in such that the particles could not swell excessively. In the case where a crosslinking agent is used in a relatively large amount or in the case where the monomer concentration in polymerization is set at a relatively high level, a crosslinked structure may be formed between the particles. Accordingly, a relatively large-size continuous void structure can be formed between the composite particles bonding to each other via a crosslinked structure therebetween, and can promote gas absorption and desorption.

As the surfactant, a cationic surfactant such as cetyltrimethylammonium bromide or the like can be used.

The crosslinking agent may be any one capable of forming a crosslinked structure between the monomer molecules used, and an N,N'-alkylene-bisacrylamide is preferably used. The carbon number of the alkylene group in the N,N'-alkylene-bisacrylamide is, though not specifically limited thereto, preferably 1 to 12, more preferably 1 to 4, even more preferably 1 to 2. A crosslinking agent where an oligoethylene-imine or an oligoethylene-glycol functions as a crosslinking agent chain in place of the alkylene group is also employable.

The solvent for the particle preparation liquid includes, though not specifically limited thereto, a polar solvent such as water, methanol, ethanol, isopropanol, acetonitrile, N,N-dimethylformamide, dimethyl sulfoxide, etc. A mixed solvent prepared by combining 2 or more of these polar solvents is also employable. Above all, use of water or a mixed solvent prepared by mixing water and any other polar solvent is preferred.

(Properties of Amino Group-Having Polymer Compound Particles)

The amino group-having polymer compound particles may be gel particles that have been swollen with a liquid or may be dry particles (solid particles), but are preferably gel particles. Regarding the gel particles, the liquid that the gel particles contain may dissolve gas, and therefore the amino group inside the gel particles can also contribute toward gas absorption. Accordingly, the gel particles can attain a large reversible gas absorption amount.

Preferably, the polymer compound particles have a particle size in a dry state of 5 nm to 10 μm.

Specifically, the hydrodynamic particle size of the polymer compound particles swollen in water is preferably ten nm to some tens μm as the hydrodynamic particle size thereof in water to be measured according to a dynamic light scattering method, more preferably 10 nm to 50 μm, even more preferably 20 nm to 10 μm. Of the polymer compound particles, the "particle size after swollen in water" indicates the particle size thereof measured after dried polymer compound particles have been immersed in water for 24 hours, and means the mean particle size thereof measured according to a dynamic light scattering method.

When the particle size in dry and the particle size after swollen of the polymer compound particles could fall within the above range, the reversible gas absorption amount per unit volume as well as the gas absorption rate and the gas desorption rate can be sufficiently increased.

The liquid to contain the gel particles includes, though not specifically limited thereto, a polar solvent such as water, methanol, ethanol, isopropanol, acetonitrile, N,N-dimethylformamide, dimethyl sulfoxide, etc. A mixed solvent prepared by combining two or more of these polar solvents is also employable. Above all, use of water or a mixed solvent prepared by missing water and any other polar solvent is preferred. Specifically, the gel particles are preferably hydrogel particles. The gel particles that are hydrogel particles can efficiently dissolve a gas inside the particles and can reversibly absorb a larger amount of a gas.

The water content in the gel particles is preferably 0.1 mL or more per gram of the solid content, more preferably 0.5 mL or more, even more preferably 1 mL or more. Also preferably, the water content in the gel particles is 20 mL or less, more preferably 10 mL or less, even more preferably 8 mL or less. By controlling the water content in the gel particles to fall within the above range, the gel particles can be prevented from being excessively swollen and, in addition, the gel particles can sufficiently dissolve a gas inside the particles and therefore the gas absorption amount and the gas desorption amount can be thereby enlarged.

Of the amino group-having polymer compound particles for use in the present invention, preferably, the gas absorption performance can vary in response to stimulation such as temperature change, etc. The factors for changing gas absorption performance include a change in the acid dissociation constant of a functional group, a change in a stereostructure, a change in a swelling degree, a change in hydrophilicity, a change in a water content, a change in a carbonate ion dissolution amount, a change in a hydrogen sulfide ion dissolution amount, etc. Of the amino group-having polymer compound particles, the gas absorption performance may change by any factor, but at least preferably, the gas absorption performance changes by the change in the acid dissociation constant of an ammonium ion that is a conjugated acid to an amino group in response to temperature change. In particular, it is preferable that the acid dissociation constant change is caused by gel swelling/shrink (volume phase transition) in response to temperature change, or coil-globule structure transition of a polymer in response to temperature change or hydrophilic/hydrophobic change in a molecule. In that manner and according to the mechanism shown in FIG. 1, the gas absorption performance of polymer compound particles can be greatly changed by a small temperature change, and the energy amount necessary for gas absorption and desorption can be thereby reduced.

The phase transition temperature of the polymer compound particles is preferably 10 to 95° C., more preferably 20 to 90° C., even more preferably 30 to 80° C. In this description, the "phase transition temperature" means a temperature at which the acid dissociation constant of an ammonium ion that is a conjugated acid of an amino group is equal to or smaller than the acid dissociation constant of carbonic acid, or a temperature at which the particle size of the polymer compound particles in water becomes smaller by 30% or more than the particle size thereof at 5° C. The phase transition temperature can be determined as follows. While the polymer compound particles are kept immersed in water at 5° C., the water temperature is raised up from 15° C. and at the same time, the pH of the aqueous solution of the polymer compound particles or the particle size thereof is successively measured at constant temperature intervals to determine the phase transition temperature. The particle size of the polymer compound particles can be measured according to a dynamic light scattering method.

<Gas Absorber>

The gas absorber of the present invention has a gel particle film of an amino group-having polymer compound and a carrier to support the gel particle film.

The gel particle film for use in the present invention is a film that contains gel particles prepared by swelling solid particles of an amino group-having polymer compound with water. The gel particle film may be identified as follows. Fluorescence-modified gel particles are added to visualize the gel particle film, and the film is observed with a focal laser microscope. Fluorescence modification of the gel particles can be attained by introduction of 4-acrylaminofluorescein or the like.

The gel particle film may be a particles-deposited film where gel particles are deposited in layers on a carrier, or may also be in the form of a layer where gel particles have stepped between the fibers constituting the carrier or have entered the voids of the fibers. For the description and the preferred range of the amino group-having polymer compound and the gel particles thereof, the description and the preferred range of the amino group-having polymer compound and the gel particles thereof in the gas absorption material can be referred to.

The gel particle film may be formed, for example, by applying a particle solution prepared by dissolving amino group-having polymer compound particles in a polar solvent, onto a carrier, and drying it thereon to form a film of solid, polymer compound particles, then adding water to the film of the polymer compound particles to swell the film. At this time, a polymerizable compound and a polymerization initiator may be added to the particle solution, and the polymerizable compound may be polymerized after coating and drying, and thereafter water may be added to swell the resultant film. For the polymerizable compound to be added, the description of a stabilizer to be mentioned below may be referred to. The polymerization initiator may be any one capable of initiating polymerization of the polymerizable compound, and may be a photopolymerization initiator or a thermal polymerization initiator. A photopolymerization initiator is preferred. In the case where a photopolymerization initiator is used, the polymerization is initiated through irradiation with active energy rays such as UV rays, etc. Through such polymerization, a gel particle film that has high stability and is not swollen excessively can be formed.

As the polar solvent for the particle solution, any and every polar solvent exemplified as that to be added to the gel particles can be used, and above all, use of water or a mixed solvent of water and any other polar solvent is preferred. The water content in the gel particle film is preferably 10% by mass or more relative to the total amount of the gel particle film, and is more preferably 50 to 2000% by mass.

The thickness of the gel particle film is, though not specifically limited thereto, preferably 1 to 1000 µm, more preferably 10 to 600 µm, even more preferably 20 to 400 µm. By controlled the thickness of the gel particle film to fall within the above-mentioned range, the reversible gas absorption amount per unit volume can be made to be a sufficient amount and the gas absorption and desorption can be attained at a high speed. In the case where the gel particles form a layer, having stepped between the fibers constituting the carrier or into the voids therebetween, the thickness of the gel particle layer on the surface of the fibers or on the surface of the voids corresponds to the thickness of the gel particle film.

Preferably, the gel particle film has a carbon dioxide gas desorption rate of 0.1 mmol/m$^2$/sec or more, more preferably 0.15 mmol/m$^2$/sec or more, even more preferably 0.2 mmol/m$^2$/sec. Also preferably, the film has an absorption rate of 0.05 mmol/m$^2$/sec or more, more preferably 0.1 mmol/m$^2$/sec or more, even more preferably 0.2 mmol/m$^2$/sec or more.

In this description, the "carbon dioxide gas absorption rate of the gel particle film" may be determined by measuring the amount of the outlet gas, carbon dioxide in applying a stream of 10% carbon dioxide-containing nitrogen gas (mixed gas) humidified at 60° C., onto the surface of the gel particle film, through gas chromatography or using a carbon dioxide densitometer. The desorption speed and the absorption speed are the results of the gel particle film in application of 5 mol % DMAPM thereto, and the values are further larger in the case where the amount of DMAPM is large or in the case where a promoter is added.

[Other Component than Amino Group-Having Polymer Compound Particles]

The gel particle film may contain any other polymer compound and additive than the amino group-having polymer compound.

The other polymer compound than the amino group-having polymer compound is, though not specifically limited thereto, preferably a polymer compound that may react to stimulation such as temperature change, etc. The reaction to stimulation includes a change in the acid dissociation constant of a functional group, a change in a stereostructure, a change in a swelling degree, a change in hydrophilicity, a change in a water content, a change in a carbonate ion dissolution amount, a change in a hydrogen sulfide ion dissolution amount, etc.

The additive includes a film stabilizer, an absorption promoter, a desorption promoter, etc.

The film stabilizer includes a polymer compound, a polymerizable molecule (polymerizable compound), a crosslinking agent such as a titanium-base crosslinking agent, a primary amine, a secondary amine, etc. As the polymer compound among these, a polymer compound having a primary amino group such as polyvinylamine or the like, a polymer compound having a secondary amino group, a polymer compound having a tertiary amino group, a polymer compound having plural kinds of a primary amino group, a secondary amino group and a tertiary amino group, a polyvinyl alcohol, a polyethylene, a polyvinyl alcohol/polyethylene copolymer and others are preferably used.

In the case where a polymerizable molecule is used as the film stabilizer, the polymer compound formed through polymerization of the molecule in the gel particle film also functions as a film stabilizer. Accordingly, even after addition of water or after gas absorption/desorption after the film formation, the film is not swollen excessively and can readily maintain a uniform film condition. The polymerizable molecule includes a monomer having a polymerizing group, and for example, an acrylic monomer may be mentioned as an example. Above all, an acrylamide and an acrylamide derivative are preferably used. For example, there are mentioned an alkylacrylamide, a substituted or unsubstituted aminoalkylacrylamide, an acrylamide derivative having two polymerizing groups, etc. Among these, a substituted aminoalkylacrylamide and an acrylamide derivative having 2 polymerizing groups are preferably used. Preferably, a substituted aminoalkylacrylamide and an acrylamide derivative having 2 polymerizing groups are used as combined, and the molar fraction thereof is preferably (60 to 99)/(40 to 1), more preferably (80 to 99)/(20 to 1), even more preferably (90 to 99)/(10 to 1). Specific examples of the polymerizing group-having monomer include N-isopropylacrylamide (NIPAM), tert-butylacrylamide (TBAM), N,N-dimethylaminopropylmethacrylamide (DMAPM), N,N'-methylenebisacrylamide (BIS), acrylamide, etc. One alone or two or more of these polymerizable compounds may be used either singly or as combined. In the case where two or more kinds are used in combination, for example, a preferred example is a combination of N,N-dimethylaminopropylmethacrylamide (DMAPM) and N,N'-methylenebisacrylamide (BIS).

The content of the film stabilizer n the gel particle film is preferably 1 to 89% by mass relative to the total amount of the gel particle film.

The absorption promoter is a compound having a function of promoting absorption of an acid gas into the gel particle film. The desorption promoter is a compound having a function of promoting diffusion of an acid gas from the polymer compound particles. In the present invention, using an absorption/desorption promoter having both functions of the absorption promoter and the desorption promoter is preferred. The absorption promoter, the desorption promoter and the absorption/desorption promoter may additionally have a function of a film stabilizer. The total content of the absorption promoter, the desorption promoter and the absorption/desorption promoter in the gel particle film is preferably 1 to 20% by mass relative to the total amount of the gel particle film. The content of the absorption promoter in the gel particle film is preferably 0.1 to 12 M in terms the amine concentration thereof, more preferably 1 to 10 M, even more preferably 3 to 9 M.

As the absorption promoter, the desorption promoter and the absorption/desorption promoter, a low-molecular amine is preferably used. The molecular weight of the low-molecular amine is preferably 61 to 10000, more preferably 75 to 1000, even more preferably 90 to 500. The boiling point of the low-molecular amine is preferably 80° C. or higher, more preferably 120° C. or higher and even more preferably 150° C. or higher, as the amine of the type can be used repeatedly and is therefore practicable.

The low-molecular amine may contain any of a primary amino group, a secondary amino group and a tertiary amino group, and may contain plural amino groups. Preferably, the amine contains 1 to 3 amino groups. The secondary amino group and the tertiary amino group may be cyclic amino groups. Further, the low-molecular amine may contain any other functional group than an amine group, for example, may contain a hydroxyl group. The low-molecular amine preferably contains 0 to 2 hydroxyl groups. Preferred examples of the low-molecular amine include an amine having an amino group and a hydroxyl group, an amine having three amino groups, etc., and more preferred examples of the low-molecular amine include an amine having a secondary amino group and a hydroxyl group, etc. An amine having a secondary amino group and a hydroxyl group and having a boiling point of 150° C. or more is especially preferred since the amine of the type can exponentially increase especially the acid gas desorption amount in a high concentration range.

Specific examples of the low-molecular amine include the compounds represented by the following formulae. The absorption/desorption promoter used in (9) in Examples is also preferably used in the present invention.

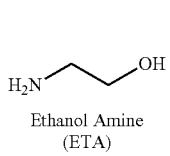
Ethanol Amine
(ETA)

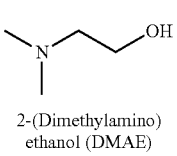
2-(Dimethylamino) ethanol (DMAE)

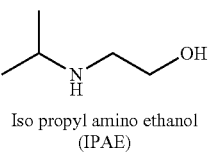
Iso propyl amino ethanol
(IPAE)

-continued

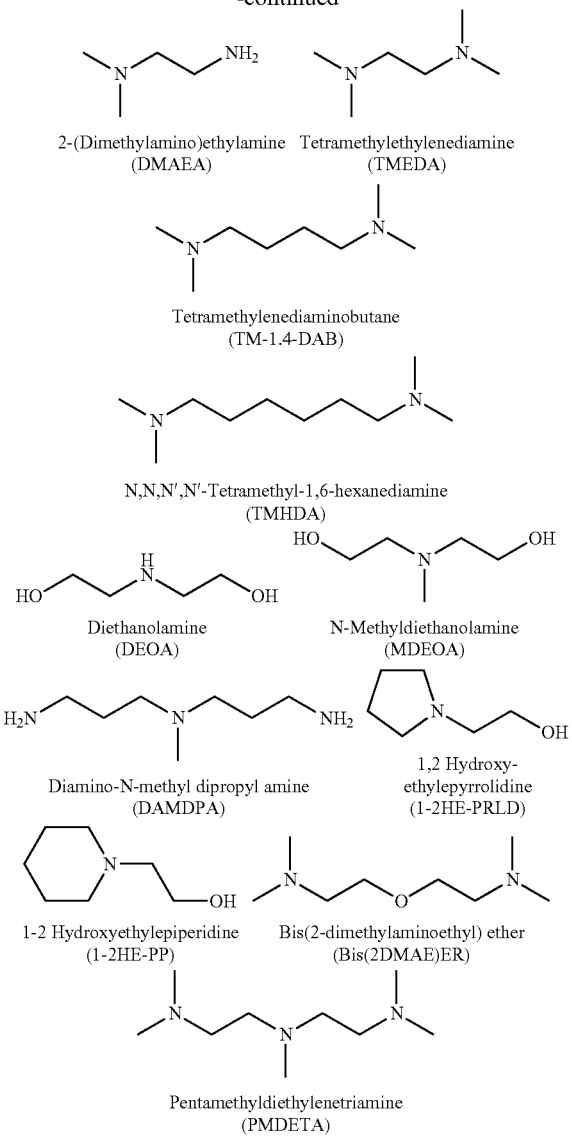

Among these, DMAE, IPAE, Bis(2DMAE)ER, 1-2HE-PRLD, 1-2HE-PP, TM-1,4-DAB, TMHAD, and PMDETA are preferably used as capable of increasing the acid gas desorption amount. Above all, IPAE, Bis(2DMAE)ER, 1-2HE-PP, TM-1,4-DAB, TMHAD, and PMDETA are more preferably used as they have a relatively high boiling point and as they hardly evaporate. Further preferably, IPAE, TM-1,4-DAB, TMHAD, and PMDETA are used as the acid gas desorption amount can be significantly increased by increasing the concentration thereof. Especially preferably, IPAE, TMHAD, and PMDETA are used as easily available. Most preferably IPAE is used since the compound can exponentially increase the acid gas desorption amount especially in a high-concentration region, and since the acid gas desorption amount can be increased even in a state where the amount of water is small relative to the amine.

One alone or two or more of the above-mentioned additives may be used either singly or as combined.

The gel particle film formed in the manner as above reversibly absorbs a gas under given conditions, and desorbs the gas in response to stimulation such as temperature change or the like, and further, the film reversibly absorbs a gas by restoring to the above-mentioned specific conditions, or by giving some other stimulation thereto. The gas that is reversibly absorbed by the gel particle film includes an acid gas such as carbon dioxide, hydrogen sulfide or the like, and water vapor, etc.

[Carrier]

The gas absorber of the present invention is characterized in that the gel particle film therein is supported by a carrier.

The gel film has a low flowability as compared with a liquid, and therefore hardly undergoes convection flow. Consequently, in the absorption process where the gel film absorbs an acid gas, the ion diffusion step is a rate limiting step, and ion diffusion into the depth of a few hundred μm or more from the film surface is limited, and as a result, the acid gas amount that can be absorbed by the gel film is thereby limited.

As opposed to the above, when a gel particle film is supported by a suitable carrier, diffusion of a gas being treated into the film inside via the voids between the particles or diffusion of an acid gas from inside the film can be realized as described above and, in addition, heat can be efficiently conducted to the gel particle film via the carrier and therefore the temperature of the entire gel particle film can change in a well-responsive manner depending on the external temperature change. In addition, through lamination with a carrier, a large quantity of a gel particle film having a thickness of a few hundred μM or less can be charged in a reactor having a fixed volume. As a result, the gas absorption speed and desorption speed of an acid gas or water vapor can be high and an acid gas can diffuse into the depth of the film, thereby realizing a large gas absorption amount. In addition, as supported by a carrier, the gel particle film hardly breaks and the shape of the gel particle film can be stably maintained. Further, a large amount of a gas can be reversibly absorbed in a reactor having a fixed volume.

As the carrier, a thin sheet or a fiber aggregate can be used.

In the present invention "thin sheet" is a tabular plate, sheet or foil, and the thickness thereof is 2 mm or less and 5 μm or more.

The material for the thin sheet preferably has a constant-pressure specific heat of 2500 KJ/(m$^3$K) or less, and preferably has a heat conductivity of 10 W/(mK) or more. The thin sheet having such thermal characteristics changes the temperature thereof in a well-responsive matter in accordance with external temperature change, and can efficiently conduct the temperature change to the entire gel particle film.

Here in this description, the "constant-pressure specific heat" is a value to be measured with a calorimeter such as a water calorimeter, a differential scanning calorimeter, etc. The "heat conductivity" is a value to be measured according to a laser flash method or a steady-state heat flow method.

As the thin sheet, a metal thin sheet (metal foil), a sheet of a carbon material, a carbon sheet, a resin film (polymer compound film) and the like can be used. Examples of the sheet of a carbon material include a graphite sheet, etc. Examples of the resin film include polyethylene, polypropylene, PET, polyimide, etc. As the thin sheet, an aluminum thin sheet, an iron thin sheet or a graphite sheet is preferably used as having a high heat conductivity. Alternatively, an aluminum thin sheet, a graphite sheet or a resin film is preferably used as having a low specific heat. The metal thin sheet includes a stainless steel thin sheet, an iron thin sheet, an aluminum thin sheet, a nickel thin sheet, etc., and among these, an iron thin sheet, an aluminum thin sheet and a nickel thin sheet are preferably used as having a relatively high heat conductivity, and using a nickel thin sheet is more preferred.

The thin sheet may be a tabular sheet having a homogeneous internal structure, or may also be a porous body or a honeycomb structure body. In the case of a porous body or a honeycomb structure body, a gel particle film may be filled into the pores thereof, and therefore heat of the thin sheet can be readily conducted to the gel particle film and the responsibility of the gas absorber to temperature change can be enhanced. In particular, a porous body of a foamed metal, a foamed nickel or a porous carbon has high heat conductivity to a gel particle film, and when this is used as a carrier, the responsibility of the gas absorber to temperature change can be largely increased. The pore size of the porous body of a foamed metal or the like is preferably 0.1 to 10 mm, more preferably 0.4 to 4 mm. The specific surface area thereof is preferably 100 to 10000 m$^2$/m$^3$, more preferably 200 to 6000 m$^2$/m$^3$. A carrier of a porous resin or a porous carbon is used as the porous carrier, the heat efficiency of the absorber can be increased as the carrier has a small heat capacity. The porous body to be used as the carrier preferably has a porosity of 1 to 99%, more preferably 10 to 99%, even more preferably 20 to 95%.

In this description, the "porosity of the thin sheet" means a porosity to be measured from the apparent volume and mass of the thin sheet and the density of the material.

The carrier may be a laminated formed by laminating a plurality of such thin sheets. In the laminate, all the thin sheets may be the same, a plurality of thin sheets differing in the material or the thickness may be combined.

The fiber aggregate is prepared by working a large number of fibers into a thin and wide tabular form. As the fiber aggregate, there are mentioned cloth, paper, etc. Above all, a porous aggregate such as a filter is preferably used. The cloth may be any of a woven cloth, a felt, a nonwoven fabric, etc., and one prepared by sintering a metal fiber felt can also be favorably used as the carrier. This is in the form of an aggregate where sintered fibers aggregate densely, and has good heat conductivity. For example, one prepared by sintering a felt of stainless steel fibers, or one prepared by sintering a felt of nickel fibers is preferably used. Above all, one prepared by sintering a felt of nickel fibers is especially preferably used.

The fibers for use in the fiber aggregate preferably have a constant-pressure specific heat of 2500 KJ/(m$^3$K) or less, and preferably has a heat conductivity of 10 W/(mK) or more. The fiber aggregate having such thermal characteristics changes the temperature thereof in a well-responsive matter in accordance with external temperature change, and can efficiently conduct the temperature change to the entire gel particle film.

The fibers for use for the fiber aggregate may be inorganic fibers or organic fibers, or may be composite fibers of inorganic fibers and organic fibers as combined. The inorganic fibers include metal fibers such as stainless steel fibers, aluminum fibers, nickel fibers, etc., and carbon fibers, etc. Nickel fibers are preferred as realizing high heat conductivity. The organic fibers include natural fibers of cotton, hemp, etc., and synthetic fibers of rayon, polyester, etc., and any of these are usable.

The diameter of the fibers is, though not specifically limited thereto, preferably 8 to 100 μm. Using the fiber, a gel particle film excellent in gas absorption performance and desorption performance can be obtained.

The carrier may be an integrated body prepared by layering a plurality of these fiber aggregates. In the integrated body, all the fiber aggregates may be the same, or a plurality of fiber aggregates that differ in the kind of the fibers, the fiber diameter, the density of the fibers or the like may be combined. The carrier may also be a laminate prepared by laminating a thin sheet a fiber aggregate.

In the case where a fiber aggregate is used as the carrier, the filling rate thereof with the gel particle film is preferably 10 to 100%, more preferably 15 to 80%, even more preferably 20 to 70%. Here, the filling rate of the gel particle film means the share of the gel particle film relative to the total volume of the gas absorber. With that, the gel particle film can efficiently attain gas absorption and desorption. In particular, when a sintered body is used, the gas absorption/ desorption performance of the gel particle film can be kept high even at a high filling rate. For example, even when the filling rate is 60% or more, the film can maintain high gas absorption/desorption performance.

The shape of the carrier is not specifically defined, and can be suitably selected in accordance with the intended use thereof. Specific examples of the shape of the carrier include a tabular sheet, a roll, etc. The planar form of the sheet or the cross-sectional form of the roll may be any of a polygonal shape such as a square, a rectangle, etc., or a true circle, an oval, etc.

<Gas Absorption Method>

The gas absorption method of the present invention is a method where the amino group in the gel particle film absorbs a gas. For the description of the gel particle film of an amino group-having polymer compound, the description of the gel particle film in the section of <Gas Absorber> hereinabove can be referred to.

Regarding the amino group inside the gel particle film, when the film is brought into contact with a gas at a specific temperature, the acid derived from the gas react with the base derived from the amino group in each gel particle to form a salt, and accordingly the amino group can efficiently absorb a gas.

Gas desorption from the gel particle film can be attained by raising the temperature of the gel particle film. When the temperature of the gel particle film is raised, the basicity inside the gel particle film lowers. In addition, the pKa of the conjugated acid of the amine inside the gel particle film lowers. Further, the hydrophobic interaction of the gel particles increases so that the gel particles shrink, that is, the gel particles undergo volume phase transition and therefore the steric hindrance around the amino group increases. As a result of the above, a gas is desorbed from the gel particle film. Subsequently, when the temperature of the gel particle film is lowered, the basicity inside the gel particle film increases. In addition, the pKa of the conjugated acid of the amine in the gel particle film increases. Further, the particles again swell and the gel particle film is restored to the state before phase transition.

The gel particle film that has been restored to a state having an increased basicity can again absorb a gas, and thereafter when the temperature is raised, the absorbed gas is desorbed according to the same mechanism as above. Subsequently, by repeating the temperature raising and lowering, a cycle of gas absorption and desorption is repeated as synchronized therewith. By repeating the gas absorption and desorption, for example, a specific gas can be separated and recovered from a large-volume exhaust gas.

For the detailed mechanism of the phase transition of gel particles and the gas absorption and desorption, FIG. 1 and the description of FIG. 1 in the section of "Gas Absorption Material" may be referred to.

In carrying out gas absorption and desorption according to the mechanism, it is important that the gas-absorbed gel particle film is heated until the basicity thereof lowers. In particular, it is important that the temperature is raised until the basicity comes to be the same as or lower than the pKa of carbonic acid. When the temperature increase is insufficient, the gas absorbed by the gel particle film could not be sufficiently desorbed and therefore in the subsequent process, the gas absorption rate, the gas desorption rate and the reversible absorption amount would be small. For example, in the case where the gel particles are gel particles of a (meth)acrylamide polymer, the temperature of the gel particle film in gas absorption is preferably 1 to 60° C., and the temperature of the gel particle film in gas desorption is preferably 40 to 200° C.

<Application of Gas Absorber>

The gas absorber of the present invention can absorb and desorb a gas such as carbon dioxide or the like at a high speed and has a large gas absorption amount, as described above, and is therefore favorably used as a gas absorber in an acid gas absorption device, an acid gas recovery device, a water vapor absorption device, a water vapor recovery device, etc. In addition, in the gas absorber of the present invention, the carrier can additionally function as a heat-conductive face of a heat exchanger or as a heat exchanger itself, and therefore the gas absorber can also effectively applied to a heat exchanger or a heat recovery device. In this case, for example, a gel film is arranged on the carrier surface that functions as a heat-conductive face (surface of the heat-conductive face).

In the following, a first embodiment and a second embodiment of a carbon dioxide gas recovery device are described as examples of an acid gas recovery device to which the gas absorber of the present invention is applied. FIG. 2 is a schematic view showing a carbon dioxide gas recovery device of the first embodiment, and FIG. 3 is a schematic view showing a carbon dioxide gas recovery device of the second embodiment.

As shown in FIG. 2, the carbon dioxide gas recovery device of the first embodiment has a heat exchanger 21, a desulfurization unit 22, a cylindrical gas absorber 23, and first to third pipes 24, 25 and 26 connected to these members. One end of the first pipe 24 is a gas inlet to introduce an exhaust gas (gas to be treated), and the other end thereof is connected to the desulfurization unit 22. One end of the second pipe 25 is connected to the desulfurization unit 22, and the other end thereof is to one side surface of the gas absorber 23. The third pipe 26 has a circulation route 26a connected to one side surface and the other side surface of the gas absorber 23, and a branched route 26b that branches from the circulation route 26a on the side of the one side surface of the gas absorber 23, and one end of the branched route 26a is a gas outlet to discharge a carbon dioxide gas therethrough. The connecting parts for the second pipe 25 and the third pipe 26 on one side surface of the gas absorber 23 are so arranged that they could sandwich therebetween the center part of the circular side surface almost on the same diameter. The heat exchanger 21 is connected to the midstream of the first pipe 24 and the midstream of the circulation route 26a.

The gas absorber 23 is formed of the gas absorber of the present invention. In this embodiment, the gas absorber 23 has carrier formed of a columnar honeycomb rotor produced by working a fiber aggregate into a honeycomb shape, and a gel particle film supported by the carrier, and is so planned as to be continuously rotationally driven around the center of the disc serving as a rotary axis. The gas absorber 23 is to have a temperature that is on the same level as the ambient temperature when the operation of the carbon dioxide gas device is OFF.

For recovering a carbon dioxide gas from an exhaust gas using the acid gas recovery device, every member is switched ON, and a high-temperature exhaust gas after dust collection is introduced from one end of the first pipe 24. The introduced exhaust gas passes through the first pipe 24 and is led into the desulfurization unit 22 having a cooling ability to cool down to 30° C. or so. Here, the desulfurization unit and the cooler may be different units. When passing through the first pipe 24, a part of the heat of the exhaust gas is conducted to the circulation route 26a of the third pipe 26 via the heat exchanger 21, and the gas inside the circulation route 26a is heated up to 75° C. or so. The exhaust gas introduced into the desulfurization unit 22 is desulfurized in the desulfurization unit 22, and then runs into the second pipe 25. The mixed gas having flowed into the second pipe 25 has a temperature of about 30° C., and is introduced into the gas absorber 23 at around the temperature. In the gas absorber 23, the temperature of the mixed gas is around 30° C., and therefore, carbon dioxide gas is efficiently absorbed by the gel particle film in the area where the mixed gas has been brought into contact with the film, while the other gas than carbon dioxide gas is discharged out of the gas absorber 23. On the other hand, the region of the gas absorber 23 having absorbed carbon dioxide moves toward the connecting part with the third pipe 26 through the rotation of the gas absorber 23, and is brought into contact with the gas introduced from the circulation route 26a of the third pipe 26. The gas introduced into the circulation route 26a is heated at around 75° C. through heat exchange with exhaust gas, and therefore in the region of the gas absorber 23 that has been brought into contact with the gas, the gel particle film undergoes phase transition and carbon dioxide gas is thereby desorbed. A part of the desorbed carbon dioxide gas flows into the branched route 26b of the third pipe 26, and is discharged out from the gas outlet of the branched route 26b, and recovered. The other part of the adsorbed carbon dioxide gas flows into the circulation route 26a of the third pipe 26. The carbon dioxide having flowed into the circulation route 26a is heated with the heat exchanger 21 arranged along the circulation route 26a, and then again introduced into the as absorber 23 and the heat thereof is utilized for heating the gel particle film.

As described above, in the carbon dioxide gas recover device of the first embodiment, the heat of the exhaust gas is reused to heat the gas absorber, thereby switching the state to absorb an acid gas to the other state to desorb the gas. In this embodiment, the heat of exhaust gas is effectively utilized and therefore the energy consumption in the carbon dioxide gas separation and recovery process can be significantly reduced. In the case where the temperature of the exhaust gas and the absorber could not be controlled to a temperature suitable for absorption and desorption of carbon dioxide, an external heat exchanging mechanism or an additional heating mechanism may be added to the pipeline and to the absorber for improving the temperature control.

Next, a second embodiment of the carbon dioxide gas recovery device is described.

As shown in FIG. 3, the acid gas recovery device of the second embodiment has a first heat exchanger 31 and a second heat exchanger 32, a desulfurization unit 33, a first tank 34 and a second tank 35, and a first pipe 36 and a second pipe 37 connected to each of these members. Of the first pipe 36, one end is a gas inlet for introducing an exhaust gas (gas to be treated), and the other end is connected to the desulfurization unit 33 having a cooling capacity. Here, the desulfurization unit and the cooler may be different units. The second pipe 37 has a main route 37a whose one end is connected to the desulfurization unit 33, and has a first route 37b and a second route 37c branched at the other end of the main route 37a. The first route 37b is communicated with the main route 37a via one end thereof, and the other end thereof is connected to the first tank 34. The second route 37c is communicated with the main route 37a via one end thereof, and the other end thereof is connected to the second tank 35. Around the other end of each of the first route 37b and the second route 37c, valves (not shown) for opening and closing the routes 37b and 37c are arranged. The first heat exchanger 31 is connected to the first midway of the first pipe 36 and to the first tank 34, and the second heat exchanger 32 is connected to the second midway of the first pipe 36 and to the second tank 35.

In the carbon dioxide gas recovery device of the second embodiment, gel particle films 38 and 39 are applied to the heat-exchange face of the first heat exchanger 31 in the first tank 34, and to the heat-exchange face of the second heat exchanger 32 in the second tank 35. In this embodiment, the first heat exchanger 31 in the first tank 34 and the second heat exchanger 32 in the second tank 35, and the gel particle films 38 and 39 arranged inside these tanks each constitute the gas absorber of the present invention, and function as an absorption tower and a desorption tower for carbon dioxide gas. The gel particle films 38 and 39 in these tanks 34 and 35 each have a temperature close to the ambient temperature (around 30° C.) when the carbon dioxide gas device is OFF.

For recovering carbon dioxide gas from an exhaust gas using the carbon dioxide gas recovery unit, first, the valve of the first route 37b of the second pipe 37 is opened, the valve of the second route 37c of the second pipe 37 is closed, the first heat exchanger 31 is switched OFF and the second heat exchange 32 is switched ON. In this state, the first tank 34 functions as an absorption tower. Specifically, in this state, when a high-temperature exhaust gas after dust collection is introduced from one end of the first pipe 36, the introduced exhaust gas passes through the first pipe 36 and is introduced into the desulfurization unit 33. In passing through the first pipe 36, a part of the heat of the exhaust gas is conducted to the second tank 35 via the second heat exchanger 32, and the exhaust gas is thereby cooled. The exhaust gas introduced into the desulfurization unit 33 is desulfurized in the desulfurization unit 33 having a cooling capacity. After further cooled, this flows into the main route 37a of the second pipe 37. The mixed gas having flowed into the main route 37a is at around 30° C., and at around the temperature, the gas is introduced into the first tank 34 via the main route 37a and the first route 37b. In the first tank 34, the temperature of the mixed gas is around 30° C., and therefore carbon dioxide can be efficiently absorbed by the gel particle film 38, and the other gas than carbon dioxide is discharged out through the gas outlet arranged in the first tank 34.

After the gel particle film 38 has fully absorbed carbon dioxide, the valve of the first route 37b of the second pipe 37 is closed, the valve of the second route 37c of the second pipe 37 is opened, the first heat exchanger 31 is switched ON, and the second heat exchanger 32 is switched OFF. Accordingly, the heat of the exhaust gas passing through the first pipe 36 is conducted to the first tank 34 and the gel particle film 38 via the first heat exchanger 31. The gel particle film 38 inside the first tank 34 is heated up to around 75° C. by the heat from the first heat exchanger 31, and desorbs carbon dioxide gas. The desorbed carbon dioxide gas is discharged out through the gas outlet arranged in the first tank 34 and is recovered. On the other hand, into the second tank 35, a mixed gas at around 30° C. that has flowed into the second pipe 37 through the same route as above is introduced via the second route 37c, and carbon dioxide is absorbed by the gel particle film 39 set inside the tank 35. Specifically, in this state, the first tank 34 functions as a desorption tower and the second tank 35 as an absorption tower, and absorption and desorption of carbon dioxide gas is carried out simultaneously.

After carbon dioxide gas desorption from the gel particle film 38 and carbon dioxide gas absorption by the gel particle film 39 have been sufficiently carried out, as shown in FIG. 3, the valve of the first route 37b of the second pipe 37 is opened, the valve of the second route 37c of the second pipe 37 is closed, the first heat exchanger 31 is switched OFF, and the second heat exchanger 32 is switched ON, and in that manner, the first tank is changed to function as an absorption tower and the second tank is to function as a desorption tower. Accordingly, in each tower opposite to that before the switching, carbon dioxide gas absorption and desorption is carried out simultaneously. Further, by repeating the switching operation, absorption and desorption of carbon dioxide gas from an exhaust gas can be carried out continuously, and carbon dioxide gas can be efficiently separated and recovered from a large quantity of an exhaust gas.

As described above, also in the carbon dioxide gas recovery device of the second embodiment, the heat of an exhaust gas is reused for phase transition of the gas absorber for switching from the state of absorbing an acid gas to the state of desorbing the gas. Accordingly, as compared with a conventional carbon dioxide gas separation and recovery process, the energy use efficiency can be greatly increased in this device. In the case where the temperature of the exhaust gas and the absorber could not be controlled to be a temperature suitable for carbon dioxide absorption and desorption in the second embodiment, an external heat exchanging mechanism or an additional heating mechanism may be added to the pipeline and the absorber for improvement of temperature control.

EXAMPLES

The characteristic features of the present invention are described more concretely with reference to Examples and Comparative Examples given hereinunder. The material used, its amount and ratio, the details of the treatment and the treatment process in the following Examples may be suitably modified or changed not overstepping the spirit and the scope of the invention. Accordingly, the scope of the present invention should not be limitatively interpreted by the Examples shown below.

[1] Synthesis of Amine-Containing Gel Particles

Amino group-having polymer compound particles were synthesized in the manner mentioned below. In the following description, a gel of amino group-having polymer compound particles may be referred to as "amine-containing gel particles", and particles prepared by drying the "amine-containing gel particles" may be referred to as "amine-containing dry gel particles".

Synthesis Example 1

One liter of pure water was put into a 2-litere three-neck flask, heated up to 70° C., and a 2 mM surfactant (cetyltrimethylammonium bromide) and three kinds of monomers were dissolved therein so that the total monomer concentration could be 312 mM. The composition of the three kinds of monomers is 55 mol % N-(dimethylaminopropyl)methacrylamide, 43 mol % N-tert-butylacrylamide and 2 mol % N,N'-methylenebisacrylamide. Before use herein, N-(dimethylaminopropyl)methacrylamide was processed in an alumina column to remove the polymerization inhibitor therefrom. N-tert-butylacrylamide was previously dissolved in a small amount of methanol to be a solution thereof of 0.68 g/mL, and used here. While kept at 70° C., the mixture was stirred with a mechanical stirrer, and bubbled with nitrogen gas for 1 hour to remove oxygen from the system. A solution prepared by dissolving 700 mg of 2,2'-azobis(2-methylpropionamidine)dihydrochloride in 5 mL of pure water was added to the resultant monomer solution, and reacted in a nitrogen atmosphere at 70° C. for 3 hours. After the reaction, the precipitate was taken out through filtration, and dialyzed through a dialytic membrane (MWCO12-14.000, width: 75 mm, vol/length: 18 mL/mL (manufactured by Spectrum Laboratories Corporation] for 3 days to remove the unreacted monomer and the surfactant. From the dialyzed precipitate, the pair anions were removed using a strong-basic ion-exchange resin to give amine-containing gel particles. The material not treated for dialysis and ion exchange was tested in the same manner, and was confirmed to have nearly the same function. The particle size of the resultant amine-containing gel particles was 800 nm.

Synthesis Example 2

Amine-containing gel particles were produced in the same manner as in Synthesis Example 1, except that N-isoprpylacrylamide was used in place of N-tert-butylacrylamide and that the composition of the three kinds of monomers was changed to 5 mol % N-(dimethylaminopropyl)methacrylamide, 93 mol % N-isopropylacrylamide and 2 mol % N,N'-methylenebisacrylamide. The hydrodynamic particle diameter in a state of dispersion of the resultant amine-containing gel particles in water at 30° C. in a nitrogen atmosphere was around 200 nm, and was around 400 nm in the presence of 10% $CO_2$.

Synthesis Example 3

Amine-containing gel particles were produced in the same manner as in Synthesis Example 2, except that the concentration of the surfactant was changed to 0.16 mM. The hydrodynamic particle diameter in a state of dispersion of the resultant amine-containing gel particles in water at 30° C. was around 600 nm.

Synthesis Example 4

A monomer solution was prepared in the same manner as in Synthesis Example 2, except that the composition of the three kinds of monomers was changed to 5 mol % N-[(3-dimehtylamino)propyl]methacrylamide, 93 mol % N-isopropylacrylamide and 2 mol % N,N'-methylenebisacrylamide, and that the total monomer concentration was to 1040 mM. A nitrogen gas was introduced into 2.4 mL of the solution for 10 minutes, and then an aqueous solution of an initiator, 2,2'-azobis(2-methylpropionamidine) dihydrochloride was mixed therein, and thereafter this was introduced onto the bottom of a stainless steel-made reactor for carbon dioxide absorption. A silicone rubber-made spacer (thickness 100 μm) additionally serving as a form was put on the reactor, and a glass sheet was set on the spacer so as to sandwich the monomer solution therebetween to thereby form a liquid film of the monomer solution having a thickness of 100 μm. In this state, this was heated at 70° C. to carry out polymerization for 2 hours. After 2 hours, the glass sheet and the spacer were removed, and a hydrogel film in a state of crosslinked amine-containing gel particles was obtained, sticking to the bottom of the stainless reactor. After dried, the film was observed with a scanning electronic microscope to determine the primary particle diameter of the gel particles in the resultant hydrogel film, and the primary particle diameter of the particles was a few tens to a few micrometers, and crosslinked structures formed between the particles were confirmed.

[II] Synthesis of Stabilizer

An amino group-having polymer compound serving as a stabilizer was synthesized as follows.

(Synthesis Example 5) Synthesis of Polyvinylamine 5.0 g of N-vinylformamide (NVF) purified through distillation was added to 44 mL of pure water, and while stirred in an oil bath at 60° C., this was bubbled with nitrogen for 30 minutes. Subsequently, 1.0 mL of an aqueous solution (19 mg/mL) of an initiator, 2,2'-azobis[2-(2-imidazolin-2-yl)propane] dihydrochloride (VA-044) [manufactured by Wako Pure Chemical Industries, Ltd.] was added thereto and reacted in a nitrogen atmosphere for 24 hours. Acetone was added to the solution after the reaction to precipitate the polymer, and the supernatant was removed. The resultant precipitate was dissolved in a solvent prepared by mixing pure water and ethanol in a ratio by volume of 3/1. Further, the process of polymer precipitation and supernatant removal with acetone, and dissolution in aqueous solution was repeated a few times to remove the unreacted monomer. A solution of the resultant precipitate was concentrated under reduced pressure with an evaporator, and then dried in vacuum to give a solid poly(NVF).

After dried, the solid was dissolved in an aqueous 2 N sodium hydroxide solution so that the polymer concentration therein could be 2% by mass, and stirred in an oil bath at 80° C. for 24 hours to give a transparent and viscous liquid. Hydrochloric acid was added to the liquid to form a hydrochloride, and the excessive hydrochloric acid was removed with an evaporator. The liquid was dialyzed through a dialytic membrane (MWCO12-14.000, width: 75 mm, vol/length: 18 mL/mL) [manufactured by Spectrum Laboratories Incorporation] for 3 days, and the solution amount in the dialytic membrane was measured. Subsequently, the whole amount was freeze-dried to give poly(vinylamine) hydrochloride (PVAm·HCl). The processing of the reaction in each step was confirmed by $^1$HNMR ($D_2O$). From this PVAm·HCl, the pair anion was removed using a strong-basic ion-exchange resin to give a polyvinylamine.

(Synthesis Example 6) Synthesis of Hydrophobized Polyvinylamine

To make PVAm·HCl synthesized in Synthesis Example 5 have temperature responsiveness, a carboxylic acid having a bulky hydrophobic site was condensed with the polymer. As the carboxylic acid, two kinds of isobutyric acid [manufactured by Sigma-Aldrich Co.] and pivalic acid [manufactured by Wako Pure Chemical Industries, Ltd.] each having an isopropyl group or a tert-butyl group were used. Condensed isobutyric acid is expressed as Isobutyl PVAm and condensed pivalic acid is as Pival PVAm. Specifically, the hydrophobized polyvinylamine was obtained according to the following process.

100 mg of PVAm·HCl (1.25 mmol-amine) was dissolved in 20 mL of MilliQ water. Triethylamine (TEA) and isobutyric acid or pivalic acid were added to the aqueous solution. At this time, pivalic acid was solid at room temperature, and therefore it was dissolved in 100 Liter of methanol and used. After stirred for 10 minutes, a condensing agent, 1-ethyl-3-(3-dimethylaminopropyl)carbodiimide hydrochloride (EDC) [TCI] or 4-(4,6-dimethoxy-1,3,5-triazin-2-yl)-4-methylmorpholinium chloride n-hydrate (DMT-MM) [manufactured by Wako Pure Chemical Industries, Ltd.] was added and stirred for 6 hours. After the reaction, the reaction liquid was dialyzed through a dialytic membrane (MWCO12-14,000, width: 45 mL, vol/length: 6.42 mL/cm) for 3 says. The condensation rate was calculated through $^1$HNMR ($D_2O$). The pair anion was removed from the dialyzed reaction liquid using a strong-basic ion-exchange resin to give the hydrophobized polyvinylamine.

[Evaluation of Gas Absorption Material]

Here, as gel particles, the amine-containing gel particles synthesized in Production Examples 2 to 4 were used.

(1) Investigation about Phase Transition of Amine-Containing Gel Particles

The amine-containing gel particles synthesized in Synthesis Example 2 were dissolved in water to prepare a particle solution (4 mg/mL).

The particle solution was heated in the presence of carbon dioxide or in the absence of carbon dioxide to check for a temperature-dependent particle size change of the amine-containing gel particles, and the results are shown in FIG. 4. In addition, the particle solution was made to absorb carbon dioxide at 20° C., then heated up to around 60° C. to desorb carbon dioxide, and again cooled down to 20° C. The pH change of the solution in the cycle is show in FIG. 5. The particle solution was kept at 30° C., 45° C., 60° C. and 75° C., and tested in a titration test with hydrochloric acid. The results are shown in FIG. 6. The particle solution was made to absorb carbon dioxide gas at 30° C., and then heated up to around 75° C. to desorb carbon dioxide. In the process, the time-dependent carbon dioxide desorption amount is shown in FIG. 7. Here, in measurement for FIGS. 5 and 7, the particle solution was made to absorb carbon dioxide gas by immersing a stainless steel-made reactor filled with the particle solution in a water tank at 20° C. or 30° C., followed by aerating a mixed gas of carbon dioxide gas and nitrogen gas (10/90) into the container for 240 minutes. For carbon dioxide gas desorption, the stainless steel-made container was immersed in a water bath at 60° C. or 75° C. The carbon dioxide gas desorption amount was determined by measuring the increase or decrease of carbon dioxide in the gas having passed through the desorption process. FIG. 7 also shows the results of the carbon dioxide gas desorption amount measured under the same condition but using N-[(3-dimethylamino)propyl]methacrylamide (low-molecular amine) or N-(dimethylaminopropyl)acrylamide homopolymer.

As shown in FIG. 4 and FIG. 5, the amine-containing gel particles change the particle size and the pH thereof depending on temperature. FIG. 6 confirms that the apparent pKa of the particle solution was about 8 at 30° C. and about 5.5 at 75° C. From these, it is confirmed that the amine-containing gel particles are temperature-responsive particles that undergo phase transition in response to temperature change. FIG. 7 confirms that the amine-containing gel particles efficiently desorb the absorbed carbon dioxide when heated at 75° C. An aqueous solution of a low-molecular amine having a similar structure and an aqueous solution of an N-(dimethylaminopropyl)acrylamide homopolymer not forming particles could not almost desorb carbon dioxide, which suggests that the amine-containing gel particles can efficiently desorb carbon dioxide as triggered by phase transition of the particles.

(2) Comparison in Gas Absorption/Desorption Characteristics Between Gel Particle Film and Homogeneous Gel Film Example 1

An aqueous solution of the amine-containing gel particles obtained in Synthesis Examples 2 to 4 was dried according to a freeze-drying method to prepare a methanol solution (10 mg/mL) thereof. The methanol solution was put into a stainless container, dried at 80° C., then water was added thereto to swell the particles, thereby producing various kinds of gel particle films each having a different thickness. The thickness of the gel particle films was controlled by changing the amount of the methanol solution to be put into the container.

Comparative Example 1

An ethanol solution of monomers having the same composition as that prepared in Synthesis Example 2 was put into a stainless steel-made container, degassed in a nitrogen atmosphere for 30 minutes, and then a DMF solution of benzoyl peroxide was added thereto. In a nitrogen atmosphere, this was reacted at room temperature for 6 hours or more to produce a polymer film. The polymer film was washed with water and then dried at 80° C. and water was added thereto to swell the film, thereby producing various kinds of homogeneous gel films each having a different thickness. The thickness of the homogeneous gel films was controlled by changing the amount of the monomer solution to be put into the container. Here, "homogeneous gel film" means a dense filmy membrane not containing particles.

The reactor where the gel particle film had been formed in Example 1 and the reactor where the homogeneous gel film had been formed in Comparative Example 1 were immersed in a water bath at 30° C., and a carbon dioxide-containing gas prepared by humidifying a mixed gas of carbon dioxide and nitrogen gas (10/90) in a humidifier at 60° C. was aerated into these containers for about 10 minutes at 300 mL/min, and after carbon dioxide absorption by the film was confirmed using an infrared carbon dioxide concentration meter, the containers were transferred into a water bath at 75° C. and kept therein for 3 minutes. During this, the carbon dioxide amount from the gas having passed through the container was quantified using an infrared carbon dioxide concentration meter, and from the change, increase or decrease of the amount, the carbon dioxide desorption rate and absorption rate were calculated.

The measured results of the carbon dioxide as desorption rate of the gel membrane film of Example 1 and the homogeneous gel film of Comparative Example 1 are shown in FIGS. 8 and 9, and the measured results of the carbon dioxide absorption rate are shown in FIG. 10. The numeral value with a unit of "nm" shown in FIGS. 8 to 10 is the particle size of the gel particles, "300-nm gel particle film" means a film of the gel particles synthesized in Synthesis Example 2, "1-μm gel particle film" means a film of the gel particles synthesized in Synthesis Example 3, and "crosslinked gel particle film" means a film of the gel particles synthesized in Synthesis Example 4. As shown in FIGS. 8 to 10, every gel particle film realized a large amount of carbon dioxide absorption and desorption as compared with the homogeneous gel film, which confirmed that using amino group-having polymer compound particles improved the carbon dioxide absorption performance and desorption performance of the film. The carbon dioxide desorption rate of the gel particle film is especially improved as compared with the carbon dioxide absorption rate thereof, and this can be presumed because in the carbon dioxide absorption process, the gel particles would swell greatly so that the voids between the particles would be small, while on the other hand, in the desorption process, the gel particles shrink and therefore the voids contributing toward gas desorption could be large.

[Evaluation of Gas Absorber]

For gas absorber evaluation, the amine-containing gel particles synthesized in Synthesis Example 1 were used as gel particles.

(3) Effect of Supporting Gel Particle Film on Various Thin Sheets as Carrier

As a carrier, a stainless steel thin sheet having a thickness of 0.1 mm or 0.3 mm (heat conductivity, about 16 W/(m·K)), an iron thin sheet having a thickness of 0.1 mm (heat conductivity, about 80 W/(m·K)), and a graphite sheet having a thickness of 0.1 mm (PGS Graphite Sheet EYGS182310 manufactured by Panasonic Corporation; heat conductivity, 600 to 800 W/(mK)) were prepared, and a holed silicone rubber sheet was airtightly attached to these carriers as a form. On the other hand, the amine-containing dry gel particles synthesized in Synthesis Example 1 were dissolved in methanol to prepare a particle solution (50 mg/3 mL). The particle solution was applied in the hole of the form of the carrier, and put in an incubator at 40° C. and dried under reduced pressure. The particle solution was applied also to the back surface of the carrier in the same manner, and dried with a drier at 80° C. for 30 minutes to produce a laminate formed of a carrier and a dry particle film. However, since the silicone rubber sheet as a form could not airtightly stick to the graphite sheet, the silicone rubber sheet was fixed with clips, and while heated on a hot plate at 80° C., the particle solution was applied and spread on the carrier using a brush. Subsequently, like the other carriers, the carrier coated with the particle solution was dried with a drier at 80° C. to produce a laminate. The weight of the dried laminate was measured. The weight of the supported, amine-containing dry gel particles was quantified, and then 4 equivalents of water (4 mL/g) was added thereto to gel the amine-containing dry gel particles. According to the process, a gas absorber having a gel particle film supported by a carrier was obtained. The thickness of the gel particle film of the resultant gas absorber was 37 μm.

Next, a reactor shown in FIG. 11 was prepared. The reactor has a pair of acryl plates 1, butyl rubber gaskets 2 separately arranged on the opposed faces of the pair of acryl plates 1, and plural screws 4 for fixing the pair of acryl plates 1 together, and is so configured that a gas absorber 3 could be sandwiched between the pair of butyl rubber gaskets 2. The upper acryl plate 1 of this reactor is provided with a gas inlet 5 and a gas outlet 6 formed therethrough, and a gas from a gas supply means (not shown) is supplied to the gas absorber 3 via the gas inlet 5, and is thereafter discharged out via the gas outlet 6.

In this experimental example, a gas absorber is fixed to the reactor shown in FIG. 11, and a carbon dioxide-containing gas is circulated (10 mL/min) therethrough to carry out a carbon dioxide absorption/desorption test. As the carbon dioxide-containing gas, nitrogen gas containing 10% carbon dioxide was humidified in a humidifier at 60° C., and the gas at 60° C. was used. For carbon dioxide absorption, the reactor was put in a water bath at 30° C., and for carbon dioxide desorption, the reactor was put in a water bath at 75° C. From the change, increase/decrease in the carbon dioxide amount in the gas having passed through the reactor, the desorption amount and the absorption amount of carbon dioxide in the gas absorber were calculated. The time-dependent change in the absorption amount and the desorption amount of carbon dioxide in each gas absorber is shown in FIGS. 12 and 13. In FIGS. 12 and 13, "SUS" means that the carrier is a stainless steel thin sheet, "Fe" means that the carrier is an iron thin sheet, and "C" means that the carrier is a graphite sheet. In FIG. 12, the reactor was put in a water bath at 75° C. in 0 minute and in 75 minutes after the start of the experiment and the carbon dioxide desorption amount was measured, and in 25 minutes and 100 minutes after the start of the experiment, the reactor was put in a water bath at 30° C. and the carbon dioxide absorption amount was measured. In FIG. 12, the desorption amount and the absorption amount of the gas absorber from the time of 0 minute, 25 minutes, 75 minutes and 100 minutes was graphed. In FIG. 13, the reactor was put in a water bath at 75° C. in 0 minute, 75 minutes and 140 minutes after the start of the experiment and the carbon dioxide desorption amount was measured, and in 30 minutes, 100 minutes and 170 minutes after the start of the experiment, the reactor was put in a water bath at 30° C. and the carbon dioxide absorption amount was measured. In FIG. 13, the desorption amount and the absorption amount of the gas absorber from the time of 0 minute, 30 minutes, 75 minutes, 100 minutes, 140 minutes and 170 minutes was graphed. The vertical axis of the graph in FIG. 12 and FIG. 13 indicates the carbon dioxide desorption amount per the mass of the amine-containing dry gel particles of the gas absorber, and the negative value of the desorption amount means carbon dioxide absorption.

In the case where a stainless steel tin sheet having a thickness of 0.1 mm (heat conductivity, about 16 W/m·K)) was used as a carrier, desorption of carbon dioxide in an amount of 25 mL per gram of the amine-containing dry gel particles took about 14 minutes; absorption of 25 mL carbon dioxide took about 26 minutes, and the maximum reversible carbon dioxide desorption/absorption amount per gram of the amine-containing dry gel particles was 31 to 38 mL (FIGS. 12, 13). On the other hand, when the thickness of the stainless steel thin sheet was changed to 0.3 mm, the desorption rate was accelerated by about 1.5 times and the absorption rate was by about 2 times as compared with those in using the stainless steel thin sheet having a thickness of 0.1 mm. Accordingly, it took only about 10 minutes to desorb 25 mL of carbon dioxide per gram of the amine-containing dry gel particles, and it took only about 13 minutes to absorb 25 mL of carbon dioxide (FIG. 12). Similarly, the reversible carbon dioxide desorption/absorption amount per gram of the amine-containing dry gel particles was increased up to 42 to 48 mL (FIG. 12). On the other hand, in the case where an iron thin plate having a relatively high heat conductivity (heat conductivity, about 80 W/(m·K)) was used as the carrier, the desorption rate was accelerated by about 1.8 times and the absorption rate was by 2.2 times, though the sheet had the same thickness of 0.1 mm. Accordingly, it took only about 8 minutes to desorb 25 mL of carbon dioxide per gram of the amine-containing dry gel particles, and it took only about 12 minutes to absorb 25 mL of carbon dioxide. Similarly, the reversible carbon dioxide desorption/absorption amount per gram of the amine-containing dry gel particles was 33 to 42 mL (FIG. 13). On the other hand, in the case where a graphite sheet having a thickness of 0.1 mm (PGS Graphite Sheet EYGS182310 manufactured by Panasonic Corporation; heat conductivity, 600 to 800 W/(mK)) was used, both the desorption rate and the absorption rate were accelerated by about 2.3 times as compared with those in using the stainless steel thin sheet having a thickness of 0.1 mm. Accordingly, it took only about 6 minutes to desorb 25 mL of carbon dioxide per gram of the amine-containing dry gel particles, and it took only about 10 minutes to absorb 25 mL of carbon dioxide. Similarly, the reversible carbon dioxide desorption/absorption amount per gram of the amine-containing dry gel particles was increased up to 60 mL (FIG. 13). Similarly, in the case where an aluminum thin sheet having a thickness of 0.1 mm was used, the desorption rate was accelerated by about 1.8 times and the absorption rate was by about 1.5 times as compared with those in using the stainless steel thin sheet having a thickness of 0.1 mm.

(4) Effect in Supporting Different Amount of Amine-Containing Gel Particle Film

A graphite sheet having a thickness of 0.1 mm (PGS Graphite Sheet EYGS182310 manufactured by Panasonic Corporation; heat conductivity, 600 to 800 W/(mK)) was used as a carrier, and the thickness of the amine-containing gel particle film to be supported was changed from 37 µm to 230 µm. In the case, the carbon dioxide reversible absorption amount per the inner volume of the reactor was increased from 208 mL/L to 1160 mL/L (FIG. 14). In FIG. 14, carbon dioxide was sufficiently absorbed at 30° C. to be in an equilibrium state, and thereafter the temperature was raised up to 75° C. for carbon dioxide desorption. From the start of desorption, 0 minute, carbon dioxide was desorbed, and in 30 minutes after the start of the experiment, the reactor was put in a water bath at 30° C. and the carbon dioxide absorption amount was measured. In FIG. 14, the desorption amount and the absorption amount of the gas absorber were graphed from the time of 0 minute and 30 minutes, and the vertical axis of the graph indicates the carbon dioxide desorption amount per the inner volume of the reactor. The negative value of the desorption amount means carbon dioxide absorption.

(5) Effect in Supporting Promoter-Containing Amine-Containing Gel Particle Film

A graphite sheet having a thickness of 0.1 mm (PGS Graphite Sheet EYGS182310 manufactured by Panasonic Corporation; heat conductivity, 600 to 800 W/(mK)) was used as a carrier, a 230-µm amine-containing gel particle film was supported by the carrier, and 1 M N,N',N"-pentamethyldiethylenetriamine was added thereto as a promoter. The carbon dioxide reversible absorption amount peer the reactor volume was increased from 1160 mL/L to 4000 mL/L.

(6) Effect of Various Fibers as Carrier in Supporting Gel Thin Film

FIG. 15 shows a stainless steel-made reactor used in this experimental example. The reactor has a space 11 having a volume of 60000 mm$^3$ (length 90 mm, width 150 mm, depth 5 mm), and thirteen current plates 12 were arranged inside the space 11 at intervals of 10 mm. The reactor additionally has a gas inlet 13 for introducing a gas from gas supply means (not shown) into the space 11, and a gas outlet 14 for discharging the gas from the space 11.

A given amount of amine-containing dry gel particles were dissolved in methanol, and stirred overnight. The concentration of the solution was so controlled as to be about 17 mg/mL. Next, as carriers, a stainless steel fiber felt cut in a size of 80 mm×8 mm×5 mm (by Nippon Seisen Co., Ltd., Naslon Felt 12-5-1500 and 8-5-1500, fiber diameter 12 μm and 8 μm, thickness 5 mm, basis weight 1500 g/m$^2$) and an aluminum fiber felt (fiber diameter 100 μm) were prepared. These carriers were fixed in the space 11 of a reactor shown in FIG. 15, put on a hot plate at 80° C. and heated thereon. A methanol solution of amine-containing dry gel particles was uniformly applied to the heated carriers, using a syringe. In the case where methanol vaporization was slow by heating from below, heat was given from above using a drier so as to evaporate methanol in order that the amine-containing dry gel particles could be uniformly supported. A given amount of water was added to the amine-containing dry gel particles supported by the carrier to gel them, thereby producing an amine-containing gel-supported material (gas absorber). The gas absorber was set inside the reactor of FIG. 15, and a carbon dioxide-containing gas was led to pass therethrough (10 mL/min) to carry out a carbon dioxide absorption/desorption test. A nitrogen gas containing 10% carbon dioxide was humidified in a humidifier at 60° C., and the resultant gas was used as the carbon dioxide-containing gas. For carbon dioxide absorption, the reactor was put in a water bath at 30° C., and for carbon dioxide desorption, the reactor was put in a water bath at 75° C. The gas having passed through the reactor was led to pass through a condenser at 5° C. to remove water from the gas, and the carbon dioxide gas amount in the gas was quantified at given time intervals through gas chromatography (trade name GC-TCD, manufactured by Shimadzu Corporation). From the change, increase/decrease in the carbon dioxide amount in the gas, the carbon dioxide absorption amount and desorption amount of the gas absorber were calculated. The time-dependent change in the carbon dioxide absorption amount and desorption amount of each gas absorber is shown in FIG. 16 to FIG. 23. FIGS. 16 to 19 are graphs of gas absorbers having Naslon Felt 12-5-1500 as the carrier. In FIGS. 20 to 23, "Alφ100" indicates a case using an aluminum fiber felt as the carrier; "susφ12" or "12-5-1500" indicates a case using Naslon Felt 12-5-1500 as the carrier, and "8-5-1500" indicates a case using Naslon Felt 8-5-1500 as the carrier. In FIGS. 16 to 23, the numeral value with a unit "mg/ml" indicates the amount of the amine-containing dry gel particles applied to coat the carrier. In FIGS. 16 to 23, in 0 minute, 71 minutes and 142 minutes after the start of the experiment, the reactor was put in a water bath at 75° C. and the carbon dioxide desorption amount was measured; and in 25 minutes and 96 minutes after the start of the experiment, the reactor was put in a water bath at 30° C. to measure the carbon dioxide absorption amount. In FIGS. 16 to 23, the desorption amount or the absorption amount of gas absorbers at the time of 0 minute, 25 minutes, 71 minutes, 96 minutes and 142 minutes are graphed. Among FIGS. 16 to 23, the vertical axis of the graph in FIGS. 16, 18, 20 and 22 indicates the carbon dioxide desorption amount per the fiber aggregate volume, and the numerical value indicated by the vertical axis of the other graphs is the same as the numerical value indicated by the vertical axis of FIG. 12.

In the case of using fibers as the carrier, it was known that the fiber thickness and the gel-supporting amount could have influences on the reversible absorption amount and the absorption rate. Specifically, when different amounts of amine-containing gel particles (added water amount, 4 mL/g) were applied to a stainless steel fiber felt (by Nippon Seisen Co., Ltd., Naslon Felt 12-5-1500, fiber diameter 12 μm, thickness 5 mm, basis weight 1500 g/m$^2$), and when the coating amount of the amine-containing dry gel particles was increased from 100 mg to 200 mg, the reversible carbon dioxide absorption amount increased by about 2 times, but when the coating amount was increased from 200 mg to 400 mg, the reversible carbon dioxide absorption amount inversely dramatically lowered (FIGS. 16, 17). On the other hand, when the amount of water to be added was varied while the amount of the amine-containing dry gel particles was kept constant, specifically when the amount of water added was reduced from 4 mL/g to 2 mL/g, the reversible carbon dioxide absorption amount slightly increased even though the amount of the amine-containing dry gel particles was large (FIGS. 18, 19). From the above results, it is known that limiting the gel filling rate including water to fall within a range of 15 to 40% or so is necessary for efficient reversible carbon dioxide absorption. When the fiber diameter was changed from 12 μm to 100 μm (aluminum fiber) at an optimized filling rate, the reversible carbon dioxide absorption performance was lowered though the heat conductivity of the material (aluminum) is high (FIGS. 20, 21). This may be considered because the fiber diameter increased so that the surface area of the fiber decreased, and therefore the thickness of the gel particle film would have increased. On the other hand, when the fiber diameter was changed from 12 μm to 8 μm, it was known that the desorption/absorption behavior changed little (FIGS. 22, 23). This indicates that use of fibers thinner than 100 μm could exhibit high performance since the absorption/desorption performance would not so much depend on the fiber diameter.

(7) Comparison Between Results of Gel Particle Film Supported by Carrier and Results not Supported by Carrier (Example of Formation and Evaluation of Gel Particle Film not Supported by Carrier)

2.4 g of amine-containing dry gel particles were dissolved in methanol and stirred overnight to prepare a methanol solution of amine-containing dry gel particles (particle solution). The above-mentioned stainless steel-made reactor (FIG. 15) was put on a hot plate at 80° C. and heated thereon, and the prepared particle solution was applied to the inner wall of the reactor with evaporating methanol. Specifically, ⅓ of the total solution amount was applied to the lower part of the stainless steel-made reactor, ⅓ of the total solution amount was to the lid part of the upper part, and ⅓ of the total solution was to the comb part of the lid. After the particle solution was dried, 4.8 mL of water was added to gel the film, thereby forming an amine-containing gel particle film on the inner wall of the reactor.

A carbon dioxide-containing gas was introduced into the reactor (50 mL/min) to carry out a carbon dioxide absorption/desorption test. As the carbon dioxide-containing gas, a gas prepared by humidifying a nitrogen gas containing 10% carbon dioxide with a humidifier at 60° C. was used. For carbon dioxide absorption, the reactor was put in a water bath at 30° C., and for carbon dioxide desorption, the reactor was put in a water bath at 75° C. The gas having passed through the reactor was led to pass through a condenser at 5° C. to remove water from the gas, and the carbon dioxide gas amount in the gas was quantified at given time intervals through gas chromatography (trade name GC-TCD, manufactured by Shimadzu Corporation). From the change, increase/decrease in the carbon dioxide amount in the gas, the carbon dioxide absorption amount and desorption amount of the gas absorber were calculated. The time-dependent change in the carbon dioxide absorption amount and desorption amount of the gel particle film is shown in FIG. 24.

(Example of Formation and Evaluation of Gel Particle Film Supported by Carrier)

2.4 g of amine-containing dry gel particles were dissolved in methanol and stirred overnight to prepare a methanol solution of amine-containing dry gel particles (particle solution). 12 sheets of stainless steel fiber felt (Naslon Felt, 12-5-1500/m$^2$) were loaded inside the stainless steel-made reactor (FIG. 15), and the reactor was put on a hot plate at 80° C. and heated thereon. The particle solution was uniformly applied to the felts using a syringe, in such a manner that 200 mg of the amine-containing dry gel particles could be supported by each felt in the reactor, and in this state, the reactor was left as such so as to evaporate methanol from the particle solution. In the case where methanol evaporation was slow, heat was given from the top using a drier and methanol was evaporated away so that the amine-containing dry gel particles could be uniformly supported. To these 12 carriers each supporting the amine-containing dry gel particles, water was added in an amount of 400 μL to each carrier (totaling 4.8 mL) to gel the particles, thereby producing a gas absorber having an amine-containing gel particle film supported by a carrier.

A carbon dioxide-containing gas was introduced into the reactor having a gas absorber formed therein (50 mL/min) to carry out a carbon dioxide absorption/desorption test. As the carbon dioxide-containing gas, a gas prepared by humidifying a nitrogen gas containing 10% carbon dioxide with a humidifier at 60° C. was used. For carbon dioxide absorption, the reactor was put in a water bath at 30° C., and for carbon dioxide desorption, the reactor was put in a water bath at 75° C. The gas having passed through the reactor was led to pass through a condenser at 5° C. to remove water from the gas, and the carbon dioxide gas amount in the gas was quantified at given time intervals through gas chromatography (trade name GC-TCD, manufactured by Shimadzu Corporation). From the change, increase/decrease in the carbon dioxide amount in the gas, the carbon dioxide absorption amount and desorption amount of the gas absorber were calculated. The time-dependent change in the carbon dioxide absorption amount and desorption amount of each gas absorber is shown in FIG. 24. In FIG. 24, "12-5-1500 felt" indicates a gas absorber using a stainless steel fiber felt (Naslon Felt 12-5-1500) as the carrier; and the numeral value with a unit "mg/ml" indicates the amount of the amine-containing dry gel particles applied to coat the carrier or the container. In FIG. 24, in 25 minutes, 96 minutes and 167 minutes after the start of the first desorption, the reactor was put in a water bath at 30° C. to measure the carbon dioxide absorption amount; and in 0 minute, 71 minutes and 142 minutes after the start of the experiment, the reactor was put in a water bath at 75° C. to measure the carbon dioxide desorption amount. In FIG. 24, the desorption amount or the absorption amount of the gas absorber at the time of 0 minute, 25 minutes, 71 minutes, 96 minutes, 142 minutes and 167 minutes are graphed. In FIG. 24, the numerical value on the vertical axis of the graph is the same as the numerical value on the vertical axis in FIG. 12.

The results of the experiments reveal that the gel particle film directly formed inside the reactor could reversibly absorb only 50 to 120 mL of carbon dioxide, but the gas absorber produced by arranging felts of stainless steel fibers having a fiber diameter of 12 μm inside the same type of the reactor so as to support the gel particle film therein, could reversibly absorb 98 to 130 mL of carbon dioxide. In addition, in the case where the gel particle film was direly formed in the reactor, it took 23 minutes to desorb 120 mL of carbon dioxide gas in the above-mentioned reversible absorption process, but as opposed to this, in the case where the gel particle film was supported by the stainless steel fiber felt, carbon dioxide desorption finished within 9 minutes. Similarly, the gel particle film directly formed inside the reactor took 45 minutes to absorb about 120 mL of carbon dioxide gas in the reversible absorption process, but in the case where the gel film was supported by the carrier of the stainless steel fiber felt, 120 mL of carbon dioxide gas was absorbed in 18 minutes.

As described above, it has been confirmed that, by using metal fibers as a carrier and by supporting a gel particle film by the carrier at a suitable filling rate, the mean reversible absorption amount can be increased by 1.3 times, the desorption rate can be by 2.6 times, and the absorption rate can be by 2.5 times.

Next, experiments were carried out using a felt of stainless steel fibers and a sintered metal fibers prepared by sintering a felt of stainless steel fibers.

On an iron plate heated at 80° C., a felt of stainless steel fibers (Naslon Felt, 12-5-2500/m$^2$) or sintered metal fibers prepared by sintering a felt of stainless steel fibers (SUS316L manufactured by Nippon Seisen Co., Ltd., basis weight 1600 g/m$^2$, fiber diameter 50 μm, porosity 89%) were put, and 550 μl of a solution prepared by dissolving the amine-containing gel particles obtained in Synthesis Example 1 in methanol to be 20 mg/mL was added thereto and dried. Subsequently, this was set in a reactor, and water in an amount of 4 equivalents relative to the amine-containing gel particles was added thereto. In every experiment, 3 samples where the filling rate of the gel particles was varied were prepared, and these were tested according to the same method as above to measure the carbon dioxide desorption amount and absorption amount. FIG. 25 includes graphs each showing the relationship between the gel filling rate and the carbon dioxide desorption amount and absorption amount. FIG. 25 confirms that in the case of using sintered metal fibers, the gel particles can maintain high carbon dioxide absorption/desorption performance even though the filling rate of the gel particles is high (for example, 60% or more).

Next, using sintered metal fibers prepared by sintering a felt of stainless steel fibers (fiber diameter 12 μm, 50 μm), foamed metals (manufactured by Sumitomo Metal Industries, Ltd., Celmet #4, #5, #7), and sintered nickel fibers (fiber diameter 40 μm), carbon dioxide absorption/desorption test were carried out according to the same method as above. In FIG. 26, the reactor was put into a water bath at 30° C. in 25 minutes and 96 minutes after the start of the first desorption to measure the carbon dioxide absorption amount; and in 0 minute and 71 minutes after the start of the experiment, the reactor was put into a water bath at 75° C. to measure the carbon dioxide desorption amount. In FIG. 26, the desorption amount or the absorption amount of the gas absorber from the time of 0 minute, 25 minutes, 71 minutes and 96 minutes is graphed. The numerical value that the vertical axis of the graph in FIG. 26 shows is the same as the numerical value shown by the vertical axis in FIG. 12. FIG. 26 indicates that foamed metals can be used equivalently to sintered metal fibers. In addition, it is confirmed that sintered nickel fibers are excellent in all the carbon dioxide absorption rate, absorption amount, desorption amount and desorption rate, and can be favorably employed.

In the case where 2.4 g of amine-containing dry gel particles were dissolved and uniformly applied to the inner wall of the reactor of FIG. 15 and dried thereon, and then 4.8 mL of water was added to form a gel particle film, only 50 to 120 mL of carbon dioxide could be reversibly absorbed, but in the case where four graphite sheets each having a thickness of 0.1 mm (PGS Graphite Sheet EYGS182310 manufactured by Panasonic Corporation, heat conductivity 600 to 800 W/(mK)) were laminated inside the space of reactor having nearly the same volume of about 60000 mm$^3$ (length 40 mm, width 170 mm, depth about 8.8 mm), and 2.4 g of gel particles were uniformly applied to both surfaces of each sheet (each 6800 mm$^2$ (length 40 mm, width 170 mm)), and 4.8 mL of water was added to support the gel film, 120 to 140 mL of carbon dioxide could be reversibly absorbed. In addition, in the case where the gel particle film was directly formed inside the reactor, it took 23 minutes to desorb 120 mL of carbon dioxide gas in the above-mentioned reversible absorption process, but as opposed to this, in the case where four graphite sheets each supporting the gel film were laminated, the carbon dioxide gas desorption could be finished within 15 minutes. Similarly, in the case where the gel particle film was directly formed inside the reactor, it took 45 minutes to desorb about 20 mL of carbon dioxide gas in the above-mentioned reversible absorption process, but in the case where four graphite sheets each supporting the gel film were laminated, the carbon dioxide gas desorption could be finished within 25 minutes.

As described above, when the gel particle film is supported by a carrier, graphite sheet, the mean reversible absorption amount could be increased by 1.5 times, the desorption rate could be by 1.5 times and the absorption rate could be by 1.8 times.

In the case where 2.4 g of amine-containing dry gel particles were dissolved in methanol and uniformly applied to the inner wall of the reactor of FIG. 15 and dried thereon, and then 4.8 mL of water was added to form a gel particle film, only 50 to 120 mL of carbon dioxide could be reversibly absorbed, but in the case where 2.4 g of amine-containing dry gel particles were dissolved in methanol and uniformly applied to the heat-conductive faces of 6 stainless thin sheets of a plate-type heat exchanger (UX-0005A-J-8 by Hisaka Works, Ltd., having 8 plates) having nearly the same gas flow channel volume of about 60000 mm$^3$ (length 40 mm, width 170 mm, depth about 8.8 mm), and then 4.8 mL of water was added so as to make the gel particle film supported by the sheets, 120 to 140 mL of carbon dioxide could be reversibly absorbed. In addition, in the case where the gel particle film was formed directly inside the reactor, it took 23 minutes to desorb 120 mL of carbon dioxide gas in the above-mentioned reversible absorption process, but in the case where 4 stainless thin sheets each supporting the gel film were laminated, the carbon dioxide gas desorption could be finished within 14 minutes. Similarly, in the case where the gel particle film was formed directly inside the reactor, it took 45 minutes to desorb about 120 mL of carbon dioxide gas in the reversible absorption process, but in the case where 4 stainless thin sheets each supporting the gel film were laminated, the carbon dioxide gas desorption could be finished within 24 minutes.

As described above, when the gel particle film is supported by a stainless thin sheet as a carrier, the mean reversible absorption amount could be increased by 1.5 times, the desorption rate could be by 1.6 times and the absorption rate could be by 1.9 times.

In addition, 3.9 g of the amine-containing dry gel particles obtained in Synthesis Example 1 were dissolved in methanol and uniformly applied to the heat-conductive faces (18000 mm$^2$ each) of 6 stainless thin sheets of a plate-type heat exchanger (UX-0005A-J-8 by Hisaka Works, Ltd., having 8 plates), and then 4.8 mL of water was added so as to make the gel particle film supported by the sheets. Also in this case, 10.9% $CO_2$-containing nitrogen gas was introduced to run therethrough at 200 mL/min, thereby carrying out carbon dioxide desorption and absorption. The reactor was put in a water bath at 30° C. in 25 minutes, 96 minutes and 167 minutes after the start of the first desorption to measure the carbon dioxide absorption amount, and in 0 minute, 71 minutes and 142 minutes, the reactor was put in a water bath at 75° C. to measure the carbon dioxide desorption amount. In FIG. 27, the desorption amount and the absorption amount of the gas absorber from the time of 0 minute, 25 minutes, 71 minutes, 96 minutes, 142 minutes and 167 minutes are graphed. The numeral value expressed by the vertical axis of the graph in FIG. 27 is the same as the numerical value expressed by the vertical axis in FIG. 12. Extremely good results were obtained in point of the carbon dioxide absorption rate, absorption amount, desorption amount and desorption rate.

FIG. 28 shows a vapor pressure change in changing the temperature of the water bath in a range of 30 to 75° C. The results in FIG. 28 show that the gel particle film reversibly absorbed water vapor along with carbon dioxide.

(8) Investigation for Gel Film Stabilization Method

A gel particle film of amine-containing gel particles alone highly absorbs water, and depending on the condition in repeated use, there may be a possibility that the film thickness may increase and the gas absorption/desorption rate as well as the reversible absorption amount may lower owing to clogging of the gas flow channel. Further, the gel particle film may become fluidized and may flow out of the carrier surface. For solving these problems, a stabilizer is added to the gel particle film, and a condition for obtaining a stable film even when the amount of water added is large is investigated.

(8-1) Stabilization of Amine-Containing Gel Particle Film with Polyvinyl Alcohol/Polyethylene Copolymer as Stabilizer 33% by mass or 50% by mass (as a mass fraction of the solid after removal of dispersant) of a polyvinyl alcohol/polyethylene copolymer as a stabilizer was added to an amine-containing gel particle film formed of amine-containing gel particles, and an excessive amount of water was added, and the behavior of the gel particles was observed. Specifically, the following experiment was carried out.

First, amine-containing dry gel particles labeled with a fluorochrome (dansyl group), unlabeled amine-containing dry gel particles and a stabilizer, polyvinyl alcohol/polyethylene copolymer were dissolved in a solvent to prepare a particle solution, the solution was applied to the inner surface of a glass vial in such a manner that the coating amount with the dry gel particles could be 113 mg/m$^2$, and dried in an oven at 80° C. for 1.5 hours to form a gel particle film. The polyvinyl alcohol/polyethylene copolymer used here is EVOH (E29) (manufactured by The Nippon Synthetic Chemical Industry Co., Ltd., polyethylene copolymerization ratio: 29%) or EVOH (E44) (manufactured by The Nippon Synthetic Chemical Industry Co., Ltd., polyethylene copolymerization ratio: 44%). In addition, a gel film was formed inside a glass vial in the same manner as above except that the stabilizer was not used. An excessive amount (10 mL/20 mg polymer) of water was injected into each glass vial and left as such for 48 hours, and then the amount of the amine-containing gel particles dissolved out from the gel particle film into the water layer was calculated from the amount of the fluorochrome. As a result, the amine-containing gel particle film to which the stabilizer had not been added completely dissolved, and emitted a strong fluorescence over the detection limit. In the case where the polyvinyl alcohol/polyethylene copolymer (EVOH (E29)) having a polyethylene copolymerization ratio of 29% was used as the stabilizer, the dissolution amount of the amine-containing gel particle film was reduced to a half or less by addition of 33% by mass of the stabilizer, as compared with the case where the stabilizer was not added. The gel particle film to which 50% by mass of the stabilizer had been added was almost completely prevented from dissolving out, and the amount of the fluorochrome-labeled amine-containing gel particles dissolved out in water was less than the detection limit. On the other hand, it was known that, by adding 33% by mass or 50% by mass of the stabilizer (EVOH (E44)) where the polyethylene polymerization ratio was 44%, the amount of the fluorochrome to dissolve out in the water layer could be suppressed to less than the detection limit. From the above, it is known that adding a polymer having a high polyethylene content and having a high crystallinity as a stabilizer is effective for preventing amine-containing gel particles from dissolving out at room temperature. Further, the carbon dioxide absorption amount and desorption amount of the gel particle film produced under the same condition were determined, using the reactor of FIG. 15. FIG. 29 shows the time-dependent change in the carbon dioxide desorption amount from the gel particle film, and FIG. 30 shows the time-dependent change in the carbon dioxide absorption amount by the gel particle film. In FIGS. 29 and 30, the vertical axis indicates the carbon dioxide desorption amount or absorption amount per unit mass of the amine-containing dry gel particles. As shown in FIGS. 29 and 30, both the carbon dioxide absorption amount and the desorption amount of the stabilizer-added gel particle film were equal to those of the stabilizer-free gel particle film. However, regarding the absorption rate, when the amount of the stabilizer to be added is increased, the rate may lower in some degree.

As described above, it is confirmed that the dissolution of the amine-containing gel particles at room temperature can be dramatically prevented by addition of the polyvinyl alcohol/polyethylene copolymer. When the temperature is repeatedly changed between 75° C. and 30° C. in an environment where water exists, and when the carbon dioxide desorption/absorption is repeated, the film stability may lower under some conditions, and the gel particle film may be broken as the case may be. Consequently, the present inventors have investigated a method for producing a gel particle film capable of stably maintaining the morphology thereof even in an environment where the temperature and the carbon dioxide absorption amount vary greatly.

Given amounts of a stabilizer (EVOH (E44)) and amine-containing dry gel particles were dissolved in a mixed solvent of isopropanol and water (6/4 by volume in mixing), and applied to a glass vial, and stirred at 60° C. for 4 hours. A titanium-base crosslinking agent diluted with the same solvent (TC-310 or TC-400 manufactured by Matsumoto Fine Chemical Co., Ltd.) was added to the stabilizer-containing particle solution in such a manner that the ratio by mass of the crosslinking agent could be about ⅛ of the stabilizer (EVOH (E44)), and stirred for 1 hour, and then dried with a hot air drier at 60° C. for 12 hours to form a particle film. Subsequently, this was heat-treated at 110° C. or 150° C. for 1 hour to stabilize the particle film. 200 equivalents of water was added to the particle film to gel it, and left at room temperature for 12 hours. As a result, the gel particle film that had gelled after the heat treatment at 110° C. was stabilized in some degree by addition of the stabilizer in an amount 9% by mass or more (as the mass fraction of the solid after removal of dispersant) or more, but a phenomenon that the film was fragmented and peeled from the glass vial was observed (FIG. 31(A)). On the other hand, the gel particle film that had gelled after the heat treatment at 150° C. did not break even after left at room temperature for 12 hours, and it was confirmed that the film could be fully stabilized by addition of the stabilizer in an amount of 3% by mass (as the mass fraction of the solid after removal of dispersant). In addition, a phenomenon of gel particle film dissolution was almost completely prevented (FIG. 31(B)). Further, when the temperature was changed between 75° C. and 30° C. in the presence of 10% carbon dioxide, the gel particle film that had been processed with the titanium-base crosslinking agent (TC-400) for crosslink formation therein was observed to swell owing to addition of 6% by mass or 33% by mass of the stabilizer (as the mass fraction of the solid after removal of dispersant), and the gel particle film to which the titanium-base crosslinking agent (TC-310) had been added was observed to swell owing to addition of 6% by mass of the stabilizer (as the mass fraction of the solid content after removal of dispersant) but film fragmentation or breaking was not observed (FIG. 31(C)). The gel particle film crosslinked with TC-310 and added with 33% by mass (as the mass fraction of the solid after removal of dispersant) of the stabilizer did not show any significant change in the swelling degree even after 2 cycles of temperature change. Further, the gel particle film crosslinked with TC-310 and added with 33% by mass (as the mass fraction of the solid after removal of dispersant) of the stabilizer was evaluated in point of the reversible carbon dioxide absorption performance thereof using the reactor of FIG. 15, and as a result, as compared with the stabilizer-free gel particle film, the carbon dioxide absorption amount and desorption amount of the film lowered by 10% or so, but almost no negative influence on the desorption rate and the absorption rate was confirmed (FIG. 32). In FIG. 32, "EVOH & TC-310" indicates the film crosslinked with TC-310 and added with the stabilizer EVOH (E44). "No addition" indicates the film crosslinked with TC-310 but not added with the stabilizer EVOH (E44). In FIG. 32, the reactor was put in a water bath at 30° C. in 14 minutes, and 74 minutes after the start of the experiment, and the carbon dioxide absorption amount was measured; and the reactor was put in a water bath at 75° C. in 0 minute and 60 minutes after the start of the experiment and the carbon dioxide desorption amount was measured. In FIG. 32, the desorption and absorption amount of the gas absorber from the time of 0 minute, 14 minutes, 60 minutes and 74 minutes are graphed. The numerical value indicated by the vertical axis of the graph of FIG. 32 is the same as the numerical value indicated by the vertical axis in FIG. 12.

(8-2) Stabilization of Gel Particle Film with Polyvinylamine as Stabilizer

In addition to the polyvinyl alcohol/polyethylene copolymer, polyvinylamine was investigated as a stabilizer for gel particle films.

An aqueous solution of amine-containing gel particles and an aqueous solution of polyvinylamine were mixed in various ratios by mass, stirred for 3 days, applied to glass vials, dried in vacuum at 40° C., and then dried at 80° C. under normal pressure for 1 hour. Accordingly, an amine-containing dry gel particle film was formed inside the glass vials. 4 equivalents of water was added to the amine-containing dry gel particle film to give a gel particle film, then a 10% carbon dioxide gas-containing gas was circulated at room temperature and carbon dioxide was thus dissolved. Next, the gel particle film was heated up to 75° C. and left as such for 12 hours in the presence of a 10% carbon dioxide-containing gas. Through the treatment, the film was checked as to whether or not the primary amines in the polyvinylamine could be crosslinked with carbon dioxide and the film could be thereby stabilized. 200 parts by mass of water was injected into the glass vial, left as such for 1 hour and thereafter the film was checked for the stability. As a result, it was known that the gel particle film added with 9% by mass or more (as the mass fraction of the solid after removal of dispersant) of polyvinylamine was relatively stable. The stability of the films left at room temperature in the presence of a 10% carbon dioxide-containing gas for 12 hours, in place of heating up to 75° C. and leaving as such in the presence of a 10% carbon dioxide-containing gas for 12 hours, did not improve. This suggests that the carbon dioxide dissolved in the film caused crosslinking reaction at 75° C. to stabilize the film.

(8-3) Stabilization of Gel Particle Thin Film with Polymerizable Compound as Stabilizer Using a polymerizable compound as a stabilizer for a gel particle film, stabilization of the gel particle film through polymerization of the compound in the presence of a polymerization initiator was investigated.

100 mg of the amine-containing gel particles obtained in Synthesis Example 1 were dissolved in 6 mL of methanol. 95 parts by mass of N,N-dimethylaminopropylmethacrylamide (DMAPM) and 5 parts by mass of N,N'-methylenebisacrylamide (BIS) were dissolved in methanol to prepare a methanol solution having a concentration of 0.05 mg/mL. Further, a methanol solution of a polymerization initiator (IRGACURE 184) was prepared, and these three kinds of methanol solutions were mixed. Regarding the mixing ratio, the three were so mixed that the total amount of DMAPM and BIS could be 56 parts by mass relative to 100 parts by mass of the amine-containing gel particles. The polymerization initiator was so mixed that its amount could be 1/60 by mol relative to the monomer. The mixture solution was cast into a stainless reactor, then gradually dried at room temperature, and next dried in a thermostat bath at 35° C. Subsequently, this was polymerized through irradiation with UV rays. Further, water was added to give a gel particle film having a uniform filmy appearance. According to this production method, even when the amount of water added was increased, the mixture swelled only partly, and a gel particle film having an almost uniform filmy appearance could be obtained.

According to the same method as above, a carbon dioxide absorption/desorption test was carried out. In FIG. 33, the reactor was put in a water bath at 30° C. in 25 minutes, 96 minutes and 167 minutes from the start of the first desorption and the carbon dioxide absorption amount was measured, and the reactor was put in a water bath at 75° C. in 0 minute, 71 minutes and 142 minutes from the start of the experiment, and the carbon dioxide desorption amount was measured. In FIG. 33, the absorption amount or the desorption amount of gas absorbers from the time of 0 minute, 25 minutes, 71 minutes, 96 minutes, 142 minutes and 167 minutes are graphed. The numerical value on the vertical axis of the graph is the same as the numerical value on the vertical axis in FIG. 12. FIG. 33 shows that the resultant gel particle films attained extremely high absorption rate, absorption amount, desorption amount and desorption amount. After the measurement, the gel particle films did not swell so much and were stable.

In the above experiment, a mixture of DMAPM/BIS/NIPAM=55/5/45 was used in place of DMAPM/BIS=95/5 as the polymerizable compound, and a gel film was produced in the same manner. The film was tested for carbon dioxide absorption and desorption and the film appearance was checked. Here, NIPAM is N-isopropylacrylamide. The desorption amount and the absorption amount of the gas absorber were graphed and the results are shown in FIG. 34. As shown in FIG. 34, the gas absorbers attained good absorption rate, absorption amount, desorption amount and desorption rate. Even when a large amount of water was added in forming the gel film, the film still kept a uniform state. After the gas absorption/desorption test, the gel particle films did not swell so much and were stable.

In the above experiment, a mixture of DMAPM/BIS/NIPAM=30/5/65 was used in place of DMAPM/BIS=95/5 as the polymerizable compound, and a gel film was produced in the same manner. The film was tested for carbon dioxide absorption and desorption and the film appearance was checked. The desorption amount and the absorption amount of the gas absorber were graphed and the results are shown in FIG. 35. As shown in FIG. 35, the gas absorbers attained good absorption rate, absorption amount, desorption amount and desorption rate. Even when a large amount of water was added in forming the gel film, the film still kept a uniform state. After the gas absorption/desorption test, the gel particle films did not swell so much and were stable.

Further, in the above experiment, the solvent was changed from methanol to water but the polymerizable compound of DMAPM/BIS=95/5 was not changed, and the polymerization initiator was changed to 2-hydroxy-4'-(2-hydroxyethoxy)-2-methylpropiophenone to produce a gel film, and the gel film was tested for carbon dioxide absorption/desorption to confirm the filmy condition thereof. The desorption amount and the absorption amount of the gas absorber were graphed and the results are shown in FIG. 36. As shown in FIG. 36, the gas absorbers attained good absorption amount and desorption amount, but the absorption rate and the desorption rate were somewhat slow. Even when a large amount of water was added in forming the gel film, the film still kept a uniform state. After the gas absorption/desorption test, the gel particle films did not swell so much and were stable.

(9) Effect of Addition of Absorption/Desorption Promoter

Various low-molecular compounds were added to gel particle films as an absorption/desorption promoter, and the effect thereof for the gel films to improve the carbon dioxide absorption amount, absorption rate, desorption amount and desorption rate was investigated.

A gel particle film was formed inside the reactor shown in FIG. 15, and a low-molecular compound represented by the following formulae was added to the gel particle film; or amine-containing dry gel particles were put into the reactor, and water, PMDETA containing little water, or an aqueous solution of PMDETA was added thereto. With that, under the same condition as that employed in measurement for FIG. 16, one cycle of carbon dioxide absorption and desorption was carried out, and the time-dependent change in the carbon dioxide absorption amount and desorption amount was checked. The results are shown in FIGS. 37 to 42. In FIG. 37 to FIG. 40, "GP+H2O" indicates a gel particle film not containing a low-molecular compound represented by the following formulae, and the others indicate gel particle films added with the low-molecular compound shown in the drawings at an amine-equivalent concentration of 3 N or 13% by mass. In FIGS. 41 to 42, "GP+H2O" indicates amine-containing dry gel particles added with water; "GP+PMDETA" indicates amine-containing dry gel particles added with PMDETA containing little water; and the others indicate amine-containing dry gel particles added with an aqueous solution of PMDETA having an amine-equivalent concentration of 1 N, 3 N or 10 N.

FIGS. 37 to 42 confirm that, in the gel particle films added with an amine compound, especially imino-bis(N,N-dimethylpropylamine) (IBDPA) or N,N',N''-pentamethyldiethylenetriamine (PMDETA), the absorption rate, the absorption amount, the desorption amount and the desorption rate exponentially improved. In this case, when the amine compound concentration is too high, the amount of water relative to the amine is too much and accordingly, the absorption amount tends to adversely lower. This suggests that, for improving the absorption performance, presence of a suitable amount of water is important (FIGS. 41, 42). Preferably, water is present in an amount of 5 molar times or more relative to the amine, more preferably in an amount of 8 molar times or more, even more preferably 10 molar times or more. In the gel particle films added with the amine compound under the optimum condition, both the absorption amount and the desorption amount increased by 3 to 4 times than those in the gel particle films not added with a promoter (FIGS. 41, 42).

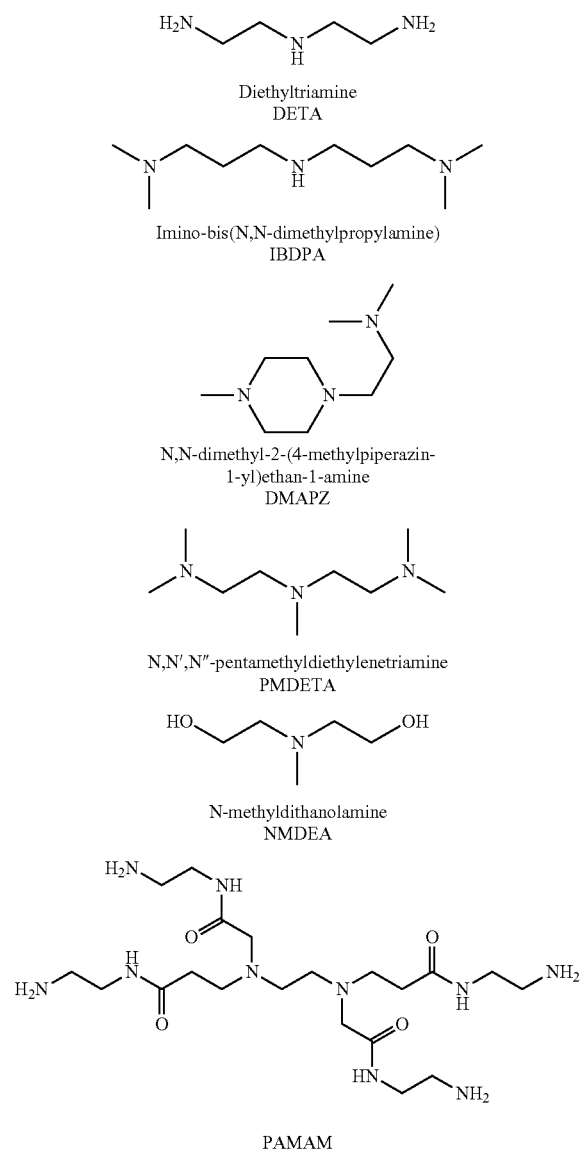

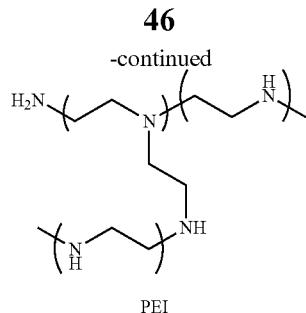

PEI

Various low-molecular amines were added to gel particle films as a desorption promoter, and the effect thereof for the gel films to improve the carbon dioxide desorption amount was checked.

A methanol solution of the amine-containing gel particles obtained in Synthesis Example 1 (100 mg/6 mL) was injected into a stainless container, dried at 80° C., and then the stainless container was cooled with ice from the outside thereof to form a dry Nanogel film. 400 µL of an aqueous 3 N amine solution was uniformly dropwise added to the dry Nanogel film. The gel particle film thus obtained in that manner was subjected to one cycle of carbon dioxide absorption and desorption under the same condition as that employed in measurement for FIG. 16, and the carbon dioxide desorption amount was thus measured. Various low-molecular amines were used to measure the desorption amount, and the results are shown in FIG. 43. FIG. 43 confirms that adding a low-molecular amine promotes desorption.

Gel particle films were produced in the same manner in other two cases where 400 µL of an aqueous 6 N amine solution was added and where 800 µL of an aqueous 8 N amine solution was added, and these films were tested for the carbon dioxide desorption amount. The results are shown in FIG. 44. As shown in FIG. 44, when the concentration of the amine TMDAH is too high, the carbon dioxide desorption amount tends to lower, but it is confirmed that amines of PMDETA and IPAE realize a high carbon dioxide desorption amount even at a high amine concentration. In particular, IPAE realizes a significantly high carbon dioxide desorption amount at a high amine concentration, and exhibits a dramatically excellent effect. The condition of a high amine concentration means a condition where the amount of water is small relative to the amine, but even in such a condition where the amount of water is small, IPAE realizes a significantly high carbon dioxide desorption amount.

INDUSTRIAL APPLICABILITY

According to the present invention, a gas absorber capable of efficiently absorbing and desorbing an acid gas such as carbon dioxide or the like or a water vapor gas in response to external temperature change. The gas absorber can be effectively used in a separation/recovery process for an acid gas in CCS, or in a separation process for an acid gas from a fuel gas, and the industrial applicability thereof is extremely high.

REFERENCE SIGNS LIST

1 Acryl Plate
2 Butyl Rubber Gasket
3 Gas Absorber
4 Screw
5 Gas Inlet

6 Gas Outlet
11 Space
12 Current Plate
13 Gas Inlet
14 Gas Outlet
21 Heat Exchanger
22, 33 Desulfurization Unit
23 Gas Absorber
24 First Pie
25 Second Pipe
26 Third Pipe
26a Circulation Route
26b Branched Route
31 First Heat Exchange
32 Second Heat Exchanger
34 First Tank
35 Second Tank
36 First Pipe
37 Second Pipe
37a Main Route
37b First Route
37c Second Route
38, 39 Gel Particle Film

The invention claimed is:

1. A gas absorption material, comprising particles of a polymer compound containing amino groups and an amine-containing compound having a molecular weight of 61 to 10000, wherein the polymer compound containing amino groups reversibly absorbs and desorbs an acid gas.

2. The gas absorption material according to claim 1, wherein the polymer compound particles are hydrogel particles.

3. The gas absorption material according to claim 1, which is for absorbing an acid gas from a gas containing a water vapor and an acid gas.

4. The gas absorption material according to claim 1, wherein the polymer compound that constitutes the polymer compound particles is a polymer of a monomer component containing an amino group-having monomer.

5. The gas absorption material according to claim 1, wherein the particle size of the polymer compound particles in a dry state is 5 nm to 10 μm.

6. The gas absorption material according to claim 1, wherein the polymer compound particles undergo phase transition by temperature change, and
the phase transition temperature of the polymer compound particles falls within a range of 10 to 95° C.

7. The gas absorption material according to claim 1, wherein the hydrodynamic particle size of the polymer compound particles that have been swollen and dispersed in water is 10 nm to 50 μm.

8. The gas absorption material according to claim 1, which is for gas absorption and desorption.

9. A gas absorber, comprising a gel particle film of a gas absorption material comprising a polymer compound containing amino groups, and a carrier for supporting the gel particle film, wherein the polymer compound containing amino groups reversibly absorbs and desorbs an acid gas.

10. The gas absorber according to claim 9, wherein the carrier is a thin sheet or a roll.

11. The gas absorber according to claim 10, wherein the thin sheet is a metal foil.

12. The gas absorber according to claim 10, wherein the thin sheet is a carbon material.

13. The gas absorber according to claim 10, wherein the thin sheet is a resin film.

14. The gas absorber according to claim 9, wherein the carrier is a fiber aggregate.

15. The gas absorber according to claim 14, wherein the fiber aggregate contains inorganic fibers.

16. The gas absorber according to claim 15, wherein the inorganic fibers are metal fibers.

17. The gas absorber according to claim 16, wherein the metal fibers contain at least any of stainless steel fibers and aluminum fibers.

18. The gas absorber according to claim 16, wherein the metal fibers contain nickel fibers.

19. The gas absorber according to claim 16, wherein the metal fibers are sintered metal fibers.

20. The gas absorber according to claim 15, wherein the inorganic fibers are carbon fibers.

21. The gas absorber according to claim 14, wherein the fiber aggregate contains organic fibers.

22. The gas absorber according to claim 21, wherein the fiber aggregate is paper.

23. The gas absorber according to claim 9, wherein the carrier is a porous substance.

24. The gas absorber according to claim 23, wherein the porous substance is a foamed metal.

25. The gas absorber according to claim 9, wherein the surface of the carrier functions as a heat-conductive face of a heat exchanger.

26. The gas absorber according to claim 9, wherein the gel particle film further contains a film stabilizer.

27. The gas absorber according to claim 26, wherein the film stabilizer contains a crosslinking agent.

28. The gas absorber according to claim 9, wherein the gel particle film contains an absorption promoter.

29. The gas absorber according to claim 9, wherein the gel particle film contains an amine-containing compound having a molecular weight of 61 to 10000.

30. The gas absorption material according to claim 1, wherein the amine-containing compound satisfies at least one of the following conditions A and B:
Condition A
The amine-containing compound contains plural amino groups, and at least one of the plural amino groups is a tertiary amino group or a cyclic amino group; and
Condition B
The amine-containing compound contains a secondary amino group and plural hydroxyl groups.

31. The gas absorber according to claim 9, wherein the thickness of the gel particle film is 1 μm to 300 μm and the gel particle film contains an amine-containing compound having a molecular weight of 61 to 10000, and wherein the amine-containing compound satisfies at least one of the following conditions C, D and E:
Condition C
The amine-containing compound contains plural amino groups;
Condition D
The amine-containing compound contains a cyclic amino group; and
Condition E
The amine-containing compound contains an amino group and a hydroxyl group.

* * * * *